US009813657B2

(12) United States Patent
Chiu et al.

(10) Patent No.: US 9,813,657 B2
(45) Date of Patent: Nov. 7, 2017

(54) METHOD AND SYSTEM FOR CONTROLLING A DISPLAY SYSTEM

(71) Applicant: SMART TLCD LIMITED, Hong Kong (CN)

(72) Inventors: Jason Felix Tsz-Kiu Chiu, Hong Kong (CN); Ka Leung Sin, Hong Kong (CN)

(73) Assignee: SMART TLCD LIMITED, Hong Kong (CN)

( * ) Notice: Subject to any disclaimer, the term of this patent is extended or adjusted under 35 U.S.C. 154(b) by 0 days.

(21) Appl. No.: 14/715,240

(22) Filed: May 18, 2015

(65) Prior Publication Data
US 2015/0334336 A1 Nov. 19, 2015

Related U.S. Application Data

(63) Continuation-in-part of application No. 14/535,195, filed on Nov. 6, 2014.

(30) Foreign Application Priority Data

May 16, 2014 (CN) .......................... 2014 1 0209256

(51) Int. Cl.
*H04N 5/44* (2011.01)
*G06F 3/147* (2006.01)
(Continued)

(52) U.S. Cl.
CPC .......... *H04N 5/4403* (2013.01); *A47F 11/06* (2013.01); *G06F 3/147* (2013.01); *G09G 5/12* (2013.01);
(Continued)

(58) Field of Classification Search
CPC .......... H04N 5/4403; H04N 5/57; H04N 5/60; H04N 5/64; H04N 5/66; G06F 3/147;
(Continued)

(56) References Cited

U.S. PATENT DOCUMENTS 1,589,432 A * 6/1926 Sapp ...................... A63H 13/00
40/411
3,476,385 A 11/1969 Foy
(Continued)

FOREIGN PATENT DOCUMENTS

| CN | 1739426 A | 3/2006 |
|----|-----------|--------|
| CN | 101438908 A | 5/2009 |

(Continued)

*Primary Examiner* — Michael Teitelbaum
(74) *Attorney, Agent, or Firm* — Bowen Liu; David Lewis

(57) ABSTRACT

A control system and a method that controls a display system are provided. The control system receives sensing signals from one or more sensors and controls the display of items based on the sensing signals received. In an embodiment, the control system controls at least a display panel that plays multimedia content. In an embodiment, the control system controls the movement of items on display in accordance with the multimedia played on the display panel. In an embodiment, the control system controls lighting effects within a display area containing the item on display during the display. In an embodiment, the control system controls audio media that is played during the display.

50 Claims, 27 Drawing Sheets

(51) Int. Cl.
*G09G 5/12* (2006.01)
*H04N 5/60* (2006.01)
*H04N 5/66* (2006.01)
*A47F 11/06* (2006.01)
*H04N 5/57* (2006.01)
*H04N 5/64* (2006.01)

(52) U.S. Cl.
CPC ............... H04N 5/60 (2013.01); H04N 5/66 (2013.01); *G09G 2354/00* (2013.01); *G09G 2370/06* (2013.01); *H04N 5/57* (2013.01); *H04N 5/64* (2013.01)

(58) Field of Classification Search
CPC .. G09G 5/12; G09G 2354/00; G09G 2370/06; A47F 11/06
See application file for complete search history.

(56) References Cited

U.S. PATENT DOCUMENTS

| | | | |
|---|---|---|---|
| 2009/0134802 A1 | 5/2009 | Oketani et al. | |
| 2013/0207896 A1* | 8/2013 | Robinson | G06F 3/013 345/158 |
| 2014/0009720 A1* | 1/2014 | Huang | G02F 1/133603 349/61 |
| 2014/0321024 A1 | 10/2014 | Smoot | |
| 2015/0002747 A1 | 1/2015 | Lee et al. | |
| 2015/0124164 A1 | 5/2015 | Sin et al. | |
| 2016/0202786 A1 | 7/2016 | Lee et al. | |

FOREIGN PATENT DOCUMENTS

| | | |
|---|---|---|
| CN | 201617521 U | 11/2010 |
| CN | 101912213 A | 12/2010 |
| CN | 202230679 U | 5/2012 |
| CN | 102819989 A | 12/2012 |
| CN | 202816284 U | 3/2013 |
| CN | 103282951 A | 9/2013 |
| CN | 103504881 A | 1/2014 |
| CN | 103622392 A | 3/2014 |
| CN | 102819989 B | 5/2015 |
| DE | 202006019314 U1 | 4/2007 |
| WO | WO 2013/048146 A2 | 4/2013 |
| WO | WO 2013/069977 A1 | 5/2013 |

* cited by examiner

METHOD AND SYSTEM FOR CONTROLLING A DISPLAY SYSTEM

CROSS-REFERENCE TO RELATED APPLICATIONS

This application claims priority benefit of Chinese Patent Application Number CN 201410209256.3, entitled "METHOD AND SYSTEM FOR CONTROLLING A DISPLAY SYSTEM," filed on May 16, 2014, by Jason Felix Tsz-Kiu Chiu, Ka-Leung Sin, and Yu-Ching Leung; this application is also a continuation-in-part of U.S. patent application Ser. No. 14/535,195, entitled "A DISPLAY SYSTEM," filed on Nov. 6, 2014, by Jason Felix Tsz-Kiu Chiu and Ka-Leung Sin, which in turn claims priority to Chinese Patent Application Number CN 201310545557.9, entitled "A DISPLAY SYSTEM." All of the above patent applications and documents are incorporated herein by reference.

FIELD

The present specification relates to a display system and a control system and method.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In the evolution of display panels, one direction is related to transparent display panels. Current display panel technologies include transparent liquid-crystal display (TLCD), organic light-emitting diode (OLED), plasma display panel, as well as transparent holographic rear projection film. Samsung announced that sample products of 22" TLCD were produced from March 2011. Samsung also produced TLCD of larger sizes (e.g., 46" in size).

One of the applications of transparent display panels is to build transparent showcases. Current showcases may use one transparent display panel on a side of the showcase to display merchandise inside the showcase to those of the public that face the transparent display panel.

In showcases, the movements of display items are very limited (e.g., currently only rotational movement on a turntable), which limit the display of items and the multimedia played on the display panels. For example, if the display item is placed on the left side of the showcase and needs to be seen through the left part of display panel, the video played on the left side of display panel, if any, would have to be in light color to make the left part of the display panel transparent or semi-transparent. Thus, the part of display panel that shows the video in full color thus would be limited to the right part of display panel that is opaque. Even if a turntable is used to rotate the display item, movement of item is limited to rotation on the turntable. Furthermore, current showcases may not recognize the use of light effects to enhance the presentation of the display items. The use of current showcases is limited to display merchandise or products, without showing combinations of movements of items and display of performances (e.g., processes such as tours or shows on stage). This specification recognizes the needs to improve the showcases or display systems with the use of display panels to create a more attractive presentation of exhibitions or performances.

Some showcases have been disclosed in China Patent Application number CN 201210315770.6 and China Patent Application number CN201220495946.6, which are hereby incorporated by reference.

SUMMARY

In view of the above deficiencies, in at least one embodiment a multifunctional display system and a system and method for controlling the display system are provided for achieving accurate control of the display system and enhancing the attractiveness and effect of the presentation of exhibitions and/or performances.

In at least one embodiment, the control system includes at least a control device for controlling one or more modules of the display system. In this specification, the terms "module" and "system" are used interchangeably and may be substituted one for the other to obtain different embodiments. In at least one embodiment, the control device controls one or more display systems. In at least one embodiment, the display system includes at least a display module and/or an audio module for playing multimedia content under the control of a multimedia controller. In this specification, the terms "control device," "controller," "microcontroller," and "microprocessor" are used interchangeably, and may be substituted one for the other to obtain different embodiments. In at least one embodiment, the term "controller" is generic to microcontrollers and microprocessors. In at least one embodiment, the display system includes a lighting module for illumination and/or adjusting lighting effects. In at least one embodiment, the display system includes a motion module for moving display items and/or performers.

In at least one embodiment, the control device includes at least a human-machine interface module that receives sensing signals from at least a sensor and transmits the sensing signals to a control circuit, a power controller, and/or a drive circuit of the control device.

In at least one embodiment, the control circuit of the control device receives the sensing signals from the human-machine interface module and accordingly controls the multimedia controller, the power controller, and/or the drive circuit, which in turn sends instructions to the display module, the audio module, the lighting module, and/or the motion module for controlling the operation of the display system. In at least one embodiment, the control circuit includes one or more microcontrollers to process signals and/or execute instructions. In at least one embodiment, the control circuit may process digital and/or analog signals, and/or may convert one type of signal to another type.

In at least one embodiment, the power controller receives instructions and/or the sensing signals from the control circuit and/or the human-machine interface module, and accordingly controls the power supply to the modules of the display system. In at least one embodiment, the control device is connected to a power supply that provides electric power to the modules of the display system. In at least one embodiment, the power controller includes electric converters and/or electrical switches for controlling the power supply.

In at least one embodiment, the drive circuit receives instructions and/or the sensing signals from the control circuit and/or the human-machine interface module, and accordingly controls devices (e.g., motors) of the motion module for moving the display items. In at least one embodiment, the drive circuit also controls the movement of the devices of the lighting module for adjusting the beaming angle and/or changing the color of the light. In at least one embodiment, the drive circuit includes a plurality of circuits that individually control the power supply and/or the operation of different devices.

In at least one embodiment, the display system includes at least a multimedia controller that receives instructions from the control circuit and controls the display of multimedia content (e.g., video content, audio content, etc) via the display module and/or the audio module. In at least one embodiment, the control circuit sends instructions for the multimedia controller to access and retrieve multimedia content stored in a multimedia database. In at least one embodiment, the multimedia controller is connected to at least one display module for playing video content retrieved from the multimedia database on one or more display panels. In at least one embodiment, the display panels are grouped into different groups for playing the same or different video content. In at least one embodiment, the display module includes at least a display controller for controlling and coordinating the video content played on one or more display panels and/or modulating the transparency of the display panels.

In at least one embodiment, the display system includes an audio module that includes at least an audio controller, an audio signal amplifier, and one or more loudspeakers for playing audio content. In at least one embodiment, the multimedia controller is connected to the audio module for controlling the play of audio content that is retrieved from the multimedia database.

In at least one embodiment, one or more sensors transmit digital and/or analog sensing signals via the human-machine interface module to the control device using wired or wireless connections. In at least one embodiment, the sensors include at least a sensor that detects the user's interaction with the display system or the user's input information. In at least one embodiment, the sensing information caused by the interaction of the user is transmitted to the control circuit that generates control instructions based on the sensing information received, and transmits the control instructions to the modules and/or devices for controlling the operation of the display system. Additionally or alternatively, the sensors include at least a feedback sensor that detects the actual operation status of the modules and/or devices and provides feedback information to a closed loop control system for adjusting and accurately controlling the operation of the display system.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

It should be understood that specific embodiments described herein are only used to explain at least one embodiment but not used to limit the present invention.

Figure 1:
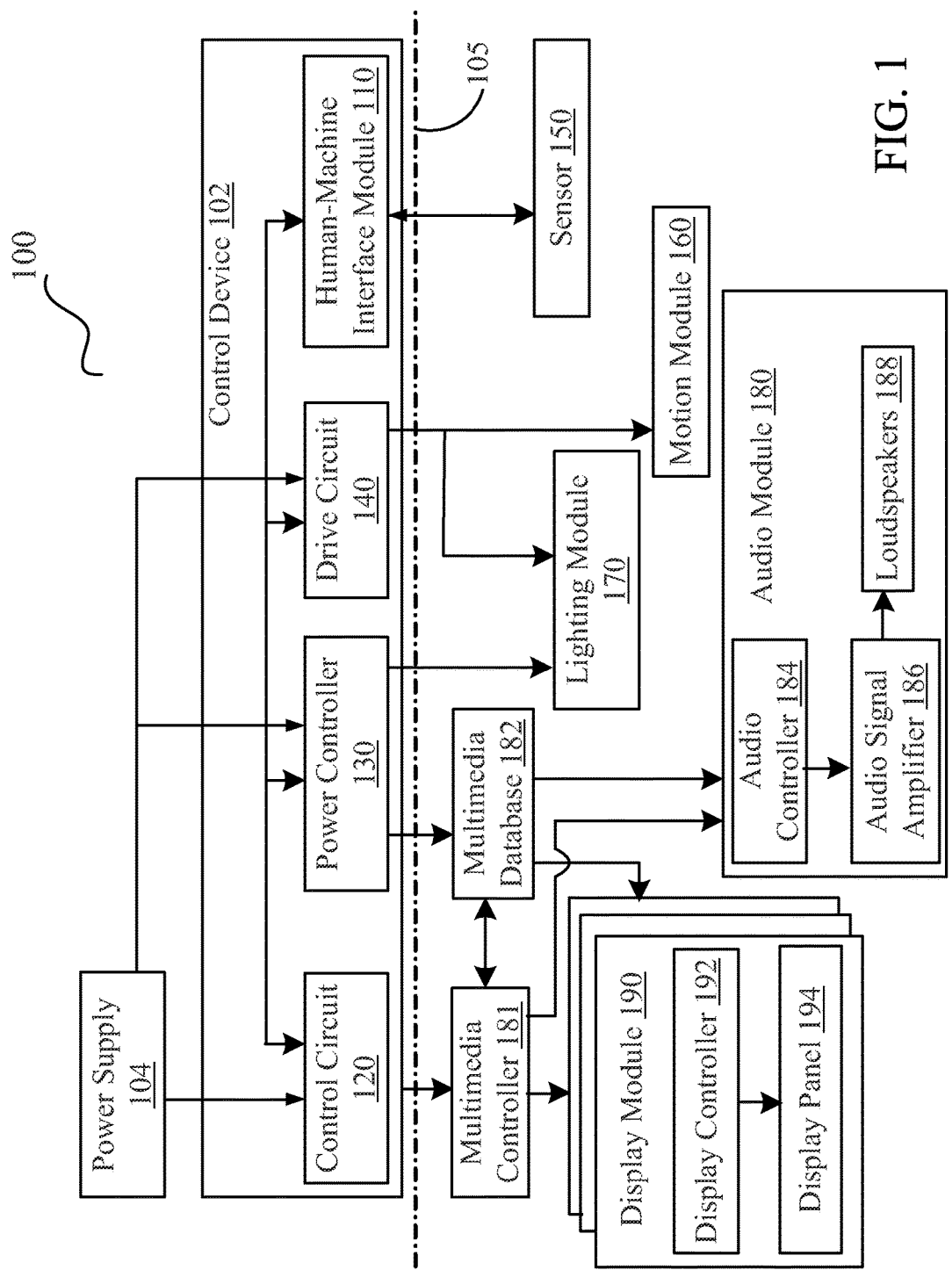
FIG. 1 shows a block diagram of an embodiment of a display system including a control device.

FIG. 1 shows a block diagram of an embodiment of a display system 100 including a control device. The display system 100 includes at least a control device 102. FIG. 1 further includes a line 105. Control device 102 may include at least a human-machine interface module 110, a control circuit 120, a power controller 130, and a drive circuit 140. The display system also includes a power supply 104, a sensor system 150, a motion module 160, a lighting module 170, an audio module 180, a multimedia controller 181, and a multimedia database 182. The audio module 180 includes at least an audio controller 184, an audio signal amplifier 186, and one or more loudspeakers 188. The display system further includes one or more display modules 190 that include at least a display controller 192 and at least one display panel 194. In other embodiments, display system 100 may not have all of the elements or features listed and/or may have other elements or features instead of, or in addition to, those listed.

Display system 100 with the control device provides a multifunctional system for controlling the display of items and/or performances in combination with and optionally synchronized with multimedia content that are played on at least one display panel. In at least one embodiment, display system 100 may be used to display at least a product, a device, a human being, an animal, or anything that may be displayed. In an embodiment, display system 100 may be used in exhibition of items or during a performance on a stage (e.g., with live performers). For example, display system 100 may display a pot of flowers, a bottle of wine, a model of a house, a model of an airplane, a model of boat or raft traveling along a river, a human performer, a rabbit, or any combination thereof. In another example, display system 100 may display a process, a badminton game, a tug of war game, a musical performance, another type of performance, a puppet show, a tour, and/or a driving experience (for example, the driving experience may include a jeep and/or the driving of a jeep). In at least one embodiment, multiple display items and/or performers may be displayed in display system 100. In at least one embodiment, display items or performers may be placed in a display space and viewers may or may not see display item (or performers) through the display panel (depending on whether display panel is in the transparent or opaque state of display panel). In another embodiment, display items (or performers) may be stored in a concealed space temporarily until being displayed. In at least one embodiment, the display items or performers may be moved using motors and other devices (e.g., a turntable, a vehicle, a track, a platform, etc.) of a motion module. In at least one embodiment, the lighting effects may be controlled by adjusting the light (e.g., by changing the brightness, colors, angles of a beam of light, etc.) that illuminate the display item and/or display space. In at least one embodiment, audio media may be played via speakers and audio effects (e.g., volume) may be adjusted. In at least one embodiment, a user may interact with the exhibition or performance using a touch screen and/or sensors, and the signals from the touch screen and/or sensors are transmitted to a control device that controls the display process and/or effects (e.g., movement of items, lighting effects, multimedia content played on the display panel, audio effects) based on the signals received.

In at least one embodiment, display system 100 includes one or more display modules that have at least one display panel for playing multimedia content while allowing viewers to see through the display panel to observe items and/or performers in a display space. In at least one embodiment, display system 100 includes a control device that receives sensing signals from sensors via a human-machine interface module and accordingly controls the modules and/or devices of the display system to achieve a synchronized exhibition (e.g., to control the movement of display items and/or the lighting effects in coordination with the multimedia played on the display panel). Throughout this specification, the terms "signals," "data," and "information" are used interchangeably, and may be substituted one for the other to obtain different embodiments. In at least one embodiment, the control device is powered by a power supply, which may also provide electric power to the modules and/or devices of the display system 100. In at least one embodiment, the control device includes a control circuit that receives and processes sensing signals and generates control instructions to control at least a multimedia controller, a power controller, and/or a drive circuit. Throughout this specification, the terms "control instruction," "instruction" and "control command" are used interchangeably, and may be substituted one for the other to obtain different embodiments. In at least one embodiment, the multimedia controller controls playing of multimedia content via at least a display module and/or an audio module, which multimedia may be retrieved from a multimedia database. In at least one embodiment, the drive circuit of the control device controls a motion module to move the display items and/or adjust beaming angle or color of the light. Additionally or alternatively, the power controller of the control device controls a lighting module for controlling the on-and-off of lights and adjusting lighting effects. The power controller may also control the power supply to other modules of the display system. For at least one embodiment, the manners of the operation of the display system 100 were discussed in conjunction with U.S. patent application Ser. No. 14/535,195, which is incorporated herein by reference. Throughout this specification, the terms "in combination with," "in accordance with," "in coordination with," and "synchronized with" are used interchangeably, and may be substituted one for the other to obtain different embodiments.

In at least one embodiment, display system 100 allows a user to participate in the exhibition via interacting with at least one sensor. For example, a user wants to move a display item or change the display by swiping or touching on a touch screen or pressing on a pressure sensor. The sensor senses the movement and/or operation of the user and sends the sensing signals to the control device via the human-machine interface module. In at least one embodiment, the sensing signal is transmitted to the control circuit of the control device. Optionally or alternatively, the signal is transmitted to the power controller and/or the drive circuit. Based on the sensing signals caused by the presence and/or action of the user, the control circuit generates control commands and sends to the multimedia controller, power controller, and/or the drive circuit. Based on the control commands, a display item is moved by the motion module and/or the lighting effects are adjusted by the lighting module in coordination with the playing or changing of multimedia content on the display panel.

Control device 102 is device, which when activated controls and coordinates the modules of the display system 100 automatically and/or in response to external signals. In at least one embodiment, the control device receives external signals from external devices (e.g., sensing signals from sensors, signals from a remote controller or mobile device, etc) and process the signals to generate control instructions for controlling the display system 100. In at least one embodiment, the control device 102 includes at least a human-machine interface module, a control circuit, a power controller, and/or a drive circuit. In at least one embodiment, the control device 102 may be connected to a multimedia controller, a multimedia database, a display module, an audio module, a lighting module, and/or a motion module of the display system 100 via wired or wireless connections. In at least one embodiment, the control devices controls the movement of display items and/or the lighting effects in coordination with the multimedia played on the display panels to achieve a synchronized display.

In at least one embodiment, the control device 102 is connected with a power supply that provides electricity to the control device 102. In at least one embodiment, the control device 102 controls the power supply to the modules and/or devices of the display system 100. In one embodiment, the control device 102 also controls conversions of the electricity (e.g., alternating current (AC) to direct current (DC), or DC to AC), redistribution of electrical power (e.g., different devices requires different voltages/currents, etc.), and/or the intensity of the power supply. Although in FIG. 1, the power supply is external to the control device 102, in at least one embodiment, the control device 102 includes a built-in power supply, which supplies power to the control device 102 and/or external devices that are connected to the control device 102. In at least one embodiment, the built-in power supply provides DC and/or AC as electric power.

In at least one embodiment, control device 102 includes hardware, such as signal generators, transmitters, and/or receivers for communicating and transmitting signals. Additionally or alternatively, control device 102 includes a memory system and processor system. In at least one embodiment, the control device 102 includes algorithms and/or circuitry for sending and/or receiving data, signal processing, computing, logic operations, and/or generating control commands. In an embodiment, the logical operations that are used by the control device 102 (to process sensing signals received from the sensors) may include computing operations involving the use of logical functions that are applied to the input signals of a particular logic circuit of the control device 102. In at least one embodiment, the logical operations used by the control device 102 may include fuzzy logic control, proportional-integral-differential control, artificial neural network control, etc. In an embodiment, the fuzzy logic of control device 102 is a many-valued logic performing an approximate reasoning, rather than fixed and exact logic reasoning. The fuzzy logic variables of control device 102 may have a truth value that ranges in degree between 0 and 1. In one embodiment, the fuzzy logic of control device 102 may include variable representing degrees of truth, where the truth value may range between completely true and completely false. In an embodiment, the control device 102 may include a fuzzy control system, which is a control system based on fuzzy logic, which analyzes analog input values in terms of logical variables having a continuous range of values between 0 and 1, in contrast to classical or digital logic, which operates on discrete values of either 1 or 0 (true or false, respectively). Additionally or alternatively, the control device 102 includes Proportional-Integral-Differential (PID) system that is a control loop feedback mechanism (controller) that calculates an error value as the difference between a measured process variable and a desired setpoint. In one embodiment, the PID controller of the control device 102 attempts to minimize the error by adjusting the process through use of a manipulated variable. The PID controller of the control device 102 may include three separate parameters, which determine the weight given to the proportional, the integral, and derivative values in determining the degree to which the input signal is adjusted. The proportional signal may be a signal that is proportional to the present error. The integral signal integrates the error over time and gives an indication of the accumulation of past errors. The differential signal is a prediction of future errors, based on current rate of change in the signal. The weighted sum of the proportional, integral, and differential signals is used to adjust the process. The weights assigned to each signal may be determined by an operator of the system. Additionally or alternatively, the control device 102 may include Artificial Neural Networks (ANNs), which may include a statistical learning algorithm and/or network of computing elements (e.g., variable resistors and/or transistors having variable weights) that estimate or approximate the response functions, which compute a response to input from the human-machine interface module and/or feedback from the sensor system. The computing elements (which may also be referred to as neurons) of the neural networks to control the display system 100 may compute values from inputs, and are capable of machine learning, by adjusting weights of responses of the computing elements as well as pattern recognition due to the adaptive nature of the ANNs, which may be used to recognize patterns that result in a particular type of response (e.g., to determine features that draw most interest from a user interacting with display system 100.

In one embodiment, the control device 102 is a stand-alone device. Additionally or alternatively, the control device 102 includes programs that may run on different computers, and/or may include multiple devices that are installed in different components of the display system 100. In other embodiments, the control device 102 may include other structures and/or devices.

Line 105 is a dotted line, below which are the modules and/or devices for playing multimedia and/or adjusting display effects, while above line 105 are the control device 102 and power supply 104 that control and coordinate the display. In at least one embodiment, the line 105 is not a physical barrier or structure.

Power supply 104 supplies electrical power to the display system 100 and to the control device 102. In at least one embodiment, power supply 104 is external to control device 102 (while in other embodiments power supply 104 may be internal to control device 102 or located elsewhere within the systems of this specification). In at least one embodiment, the power supply 104 may be an alternating current (AC) or direct current (DC) power outlet that provides AC or DC electric power to one or more electrical devices of the display system 100. In at least one embodiment, the power supply 104 supplies AC electric power including single-phase electric power or using a polyphase system.

In one embodiment, the single-phase electric power is the distribution of alternating current electric power using a system in which all the voltages of the supply vary in unison. In one embodiment, the polyphase system is a means of distributing AC electrical power. In one embodiment, the polyphase systems have three or more energized electrical conductors carrying alternating currents with a definite time offset between the voltage waves in each conductor. In one embodiment, the power supply 104 may include a device that converts the form of electrical power to meet the requirement of the electrical devices. Specifically, in an embodiment in which the power supply 104 is a polyphase system, alternating-current electrical power is distributed by power supply 104 to the components of display system 100 via three or more energized electrical conductors carrying alternating currents with a time offset between the voltage waves in each conductor. Power supply 104 may use a polyphase system to deliver power to one or more of the electrical motors of display system 100. For example, a three-phase power system may transmit power to the motors. An advantage of using a three phase power transmission (using three conductors, as opposed to a single phase power transmission, which uses two conductors), for delivering, power to the components of display system 100 is that, since the remaining conductors act as the return path for any single conductor, the power transmitted by a balanced three phase system is three times that of a single phase transmission but only one extra conductor is necessary.

In at least one embodiment, the power supply 104 provides electrical power to the control circuit, power controller, drive circuit, and/or human-machine interface module of the control device 102. In at least one embodiment, the control circuit, the power controller, the drive circuit, and the sensors are respectively connected to the power supply 104 via the human-machine interface module. Additionally or alternatively, the power supply 104 can provide power to the multimedia controller, multimedia database, display module, audio module, sensor, lighting module, and/or motion module of the display system 100. In at least one embodiment of the display system 100 requiring a large amount of electrical energy during the exhibition or performance, one or more power supplies, depending on the location and/or arrangement of the display system 100, may be used to provide electrical power to different modules and/or devices of the display system 100. In at least one embodiment, the power supply 104 is connected to the control device 102 and/or other devices of the display system 100 via power cords.

Human-machine interface module 110 is a module, which when activated/turned on provides an interface that allows interaction between a human being and a machine. In at least one embodiment, the human-machine interface module 110 receives signals from the sensors or other external devices, and transmits the signals to the control circuit, power controller, and/or drive circuit of the control device 102 for controlling the display system 100. In at least one embodiment, the human-machine interface module 110 is connected to one or more sensors and/or external devices, via wired or wireless connections.

In this specification, the term "module" is to be understood as being generic to software, hardware modules, and combinations of software and hardware modules. In at least one embodiment, the human-machine interface module 110 includes hardware, such as signal generators, transmitters, and/or receivers for communicating and transmitting signals. In one embodiment, human-machine interface module 110 includes connection ports for connecting to cables of external devices. In one embodiment, human-machine interface module 110 includes wireless devices for wireless communication. Optionally, the human-machine interface module 110 may include a microphone, and/or an antenna.

The human-machine interface module 110 may include algorithms and/or circuitry for sending and/or receiving data.

In at least one embodiment, the human-machine interface module 110 is connected to the sensors with a parallel communication connection or with a serial communication connection. In an embodiment, the connections between the sensors and the human-machine interface module 110 include parallel communication that allows conveying multiple binary digits (bits) simultaneously. Additionally or alternatively, the connections between the sensors and the human-machine interface module 110 include serial communication that allows sequential data transmission over a communication channel or computer bus. In at least one embodiment, the basic difference between a parallel and a serial communication channel is the number of electrical conductors used at the physical layer to convey bits of information. In an embodiment of the parallel communication being used, the connection between the sensor and the human-machine interface module 110 includes more than one such conductor (in addition to one or more ground lines and/or return-line conductors). For example, an 8-bit parallel channel will convey eight bits (or a byte) simultaneously, whereas a serial channel would convey those same bits sequentially.

For example, the sensors may be connected to the human-machine interface module 110 using a 16-pin connector for parallel communication, or using a Universal Serial Bus (USB) cable for serial communication. In at least one embodiment, the communication between the human-machine interface module 110 and the sensors and/or other modules includes encrypted communications. Additionally or alternatively, the information transmitted between the modules of the display system is not encrypted. In at least one embodiment, the human-machine interface module 110 and the sensors all support internet protocols (e.g., TCP/IP) and/or other communication protocols that allow communication between the human-machine interface module 110 and the sensors. In at least one embodiment, the encrypted communication between the human-machine interface module 110 and the sensors, and/or between the control device 102 and the modules of the display system 100 prevent non-authorized users from manipulating and/or interfering with the exhibition and/or performance.

In at least one embodiment, the human-machine interface module 110 supplies power to external low-power electronic devices that are connected, via electrical cords, to the connection ports of the human-machine interface module 110. In one embodiment, the human-machine interface module 110 charges low-power electronic devices, which includes devices that include energy saving circuits to minimize power usage when power is not necessary (e.g., notebook processors, mobile phones). For example, an external low-power device such as a mobile phone can be plugged to the control device 102, via a connection port of the human-machine interface module 110, which charges the mobile phone when the user is watching the multimedia on the display panel and the exhibition. Additionally or alternatively, the human-machine interface module 110 supplies power to a built-in computer in the control device 102. In another example, the human-machine interface module 110 supplies power to the sensors (e.g., a touch screen that is connected to the port of the human-machine interface module 110 or the internal computer). In at least one embodiment, providing power to external devices, via the human-machine interface module 110, enhances the versatility of the control device 102.

Control circuit 120 is a circuit, which when activated receives signals, processes the signals, and generates control instructions for controlling the operation of the display system 100. In at least one embodiment, the control circuit 120 receives the sensing signals from the human-machine interface module 110, and accordingly sends control commands to the multimedia controller, the power controller, and/or the drive circuit to control the display module, audio module, lighting module, and/or motion module of the display system 100. In at least one embodiment, the control circuit 120 includes at least a signal processing module that can process digital signals and/or analog signals (and may convert digital signals to analog signals and to digital signals). In at least one embodiment, the control circuit 120 may communicate with other modules of the display system using digital signals and/or analog signals. In an embodiment, the control circuit 120 processes digital signals that may include a physical signal that is a representation of a sequence of discrete values (e.g., a quantified discrete-time signal). Additionally or alternatively, the control circuit 120 processes analog signals that may include any continuous signal for which the time varying features (e.g., whose value may be stored as a variable or may be characterized as a parameter) of the signal, which may be a representation of some other time varying quantity, e.g., analogous to another time varying signal (for example, the instantaneous voltage may be generated by a transducer, such as a microphone, to create an analog audio signal that varies continuously with the pressure of the sound waves). For example, analog signals processed by the control circuit 120 may include analog radio signals, analog telephone signals, analog radar signals, and/or analog television systems.

In at least one embodiment, based on the intensity and/or duration of sensing signals transmitted via the human-machine interface module 110 to the control circuit 120, the control circuit 120 generates and sends control instructions to the power controller and/or the drive circuit, which in turn sends instructions to control the lighting effects and/or the movement of the display items. In at least one embodiment, the control circuit 120, based on the sensing signals, controls the multimedia controller to select and/or play multimedia content, via the display module and/or audio module. In at least one embodiment, the control circuit 120 includes one or more microcontrollers that include microprocessors and memories for controlling different modules of the display system 100.

Power controller 130 is a device that controls the power supply to the modules and/or devices of display system 100. In one embodiment, the power controller 130 is connected to the power supply 104, optionally via the human-machine interface module 110. In one embodiment, the power controller 130 includes chips and/or circuits for controlling the on-and-off of the electricity supplied to individual modules or devices. Additionally or alternatively, the power controller 130 includes power converters for converting direct current (DC) to alternating current (AC), and/or vice versa. In yet another embodiment, the power controller 130 controls the intensity and other characteristics of the current and voltage of the power supply, such as the frequency, phase, and/or amplitude of voltage and current. In at least one embodiment, the power controller 130 receives control commands from the control circuit 120 and executes the control commands to control and adjust the electricity supplied to different modules of the display system 100. Additionally or alternatively, the power controller 130 receives signals from the human-machine interface module 110. In at least one embodiment, the power controller 130 is connected and provides power via power cords to the human-machine interface module 110, control circuit 120, drive circuit, multimedia controller, multimedia database, display module, audio module, lighting module, motion module, and/or sensor. In at least one embodiment, the power controller 130 controls the power supply to the display modules and/or audio modules for displaying multimedia content. In at least one embodiment, the power controller 130 controls the electrical switch and the current and voltage of the electricity to the lighting module to control the brightness of light during display (e.g., by controlling the amplitude and/or duty cycle of the electricity) and controls turning the lighting module on and off). In an embodiment, the power controller 130 controls the proportion of "on" time to the regular interval or "period" of time of the duty cycle. In an embodiment, the duty cycle may be lowered to save power.

In at least one embodiment, the power controller 130 includes a power conversion system and a power distribution system. In at least one embodiment, a microcontroller of the control device 102 may be used to control the power conversion system and/or the power redistribution system of the power controller 130. In at least one embodiment, the power conversion system of the power controller 130 may include an Alternating Current (AC) to Direct Current (DC) converter, a DC-AC converter, a voltage converter (for converting voltage of one set of characteristics, to voltage of another set of characteristics), a current controller (for controlling the amplitude and/or frequency of the current), etc. In at least one embodiment, the power controller 130 converts DC to AC, or AC to DC power. Additionally or alternatively, the power controller 130 includes a transformer to change the voltage of AC power. Additionally or alternatively, the power controller 130 converts one frequency of AC power into another frequency. In at least one embodiment, the power controller 130 converts the electric power received from the power supply 104 to another set of characteristics to meet different requirements of the modules and/or devices of the display system 100 (e.g., a DC motor is driven by DC power while an AC motor is driven by AC power, and different devices may require different voltage and/or current). In one embodiment, at steady state, the rotation of the shaft of the AC motor is synchronized with the frequency of the supply current. In one embodiment, the frequency of the current may be used to predict the speed of rotation of the AC motor.

In at least one embodiment, the power controller 130 provides constant electric supply to a built-in computer, microcontrollers, and/or other devices that need to stay on regardless of the operation of other modules or whether the exhibition has started (e.g., to monitor whether a user is present and start the display when a user comes within a certain vicinity with respect to display system 100). In at least one embodiment, the power controller 130 may turn on or turn off power supplies to various modules (e.g., to the display module, audio module, light module, motion module) due to display requirements or desired display effects, or during power saving mode.

In at least one embodiment, the power controller 130 may include, but is not limited to, electronic relays, transistors (and/or other semiconductor switches or threshold devices), electromagnetic switches, electronic temperature switches, electronic time switches, current switches, voltage switches, multi directional switches, and/or frequency electrical switches. In at least one embodiment, the transistors, relays and/or other switches can also be used to amplify signals. In at least one embodiment, different types of electrical switches may be selected based on the requirements of the circuits that are controlled by the electrical switches (e.g., the voltage and/or current of the circuits, reaction speed, and/or space need for installing the switches).

In at least one embodiment, the power controller 130 receives control instructions from the control circuit 120 and adjusts the electrical switches based on the control instructions. For example, if the light in the display system 100 needs to be brighter or darker, the power controller 130 receives control instructions from the control circuit 120 and may use the pulse width modulation (PWM) to adjust the duty cycle of a high-speed switching device of the lighting module to adjust the brightness (e.g., by turning on and off a switch such as a relay or transistor at the high speed desired). In an embodiment, the power controller 130 uses Pulse-width modulation (PWM, also called pulse-duration modulation (PDM)) to encode a message into a pulsing signal.

In another example, the power controller 130 controls, based on the control instructions received from the control circuit 120, the on and off of DC power supplied to a stepper motor that drives a turntable to move a display item during exhibition. In an embodiment, the turntable is driven by the stepper motor that is a brushless direct current (DC) electric motor that divides a full rotation into a number of equal steps. The stepper motor's position can then be commanded to move and hold at one of these steps without any feedback sensor (an open-loop controller), as long as the stepper motor is carefully calibrated to move the turntable and the display item thereon. In an embodiment, when the stepper motor stops for a period of time and the electrically applied torque is no longer needed to rotate the turntable, and since no electrically applied torque is need to keep the turn table stationary, in order to save power and/or avoid overheating, the power controller 130 may directly turn off the power supply, by switching off a switch, such as a relay, to the drive circuit that drives the stepper motor.

Drive circuit 140 includes at least a circuit and/or other devices that control the operation of the devices of the motion module and/or the lighting module. In at least one embodiment, the drive circuit 140 receives control commands from the control circuit 120 and accordingly controls the on-and-off, the direction, and/or the speed of the motors for moving the display items and/or motors for adjusting the beaming angle and/or motors for adjusting the color of the light.

In at least one embodiment, the drive circuit 140 may include a plurality of circuits for driving one or more devices. In at least one embodiment, the drive circuit 140 may include multiple circuits each driving a motor of the motion modules and/or light modules. In at least one embodiment, each of the plurality of circuits in the drive circuit 140 may include, but is not limited to, H-bridges for reversing the direction the polarity of the voltage, thereby reversing the direction that the motor turns, logic gates that performs a logical operation, such as an AND, OR, or NOT operation on one or more logical inputs for controlling when to turn on and off various components, other integrated circuits, individual relays, transistors, etc (such as to determine when the light is off and the door between the display space and concealed space is open, the drive circuit rotates the motor to turn the turntable to transfer the item or person into the concealed space). In an embodiment, the drive circuit 140 includes an H-bridge, which enables a voltage to be applied across a load (e.g., motors of the motion module) in either direction. In at least one embodiment, the H-bridge of drive circuit 140 allows DC motors of the motion module to run forwards and backwards.

In at least one embodiment, the circuits in the drive circuit 140 play a role in re-distribution the power supply to individually drive the motors of the motion module. In at least one embodiment, each motor is driven by a separate circuit of the drive circuit 140 so that the drive circuit 140 can control the on-and-off of each motor without having to turn on-and-off of the electrical power from the power controller 130 to the entire drive circuit 140. For example, if the drive circuit 140 as a whole drives multiple motors simultaneously and one motor needs to be stopped, the power supplied to the entire drive circuit 140 needs to be turned off, and as a result all the motors stop. However, if the drive circuit 140 redistributes power supply to multiple circuits that each drives an individual motor, only the power supplied to one circuit needs to be turned off to stop the corresponding motor, while the other motors may keep on running. In at least one embodiment, the drive circuit 140 may include circuits that are connected to one or more sensors, which when activated measure the status of the operation of the mobile module (e.g., torque, angular position, etc) in order to accurately control the motion module. Additionally or alternatively, the drive circuit 140 may also include electrical switches that control the motors of the motion module and/or the lighting module. In yet another example, the drive circuit 140 controls the electrical switches, the current, and the voltage of the power supplied to the motion module for driving motors and/or other devices.

Sensor system 150 includes one or more sensors and/or measuring devices for sensing and/or measuring signals and/or collecting data (e.g., information about the user and/or feedback data about the actual status of the display system 100). In at least one embodiment, the sensor system 150 senses the movement and/or operation of a user and sends the sensing signals to the control device 102 via the human-machine interface module 110 using wired or wireless connections. Additionally or alternatively, the sensor system 150 may be connected to the connection ports of the human-machine interface module 110. In at least one embodiment, the sensor system 150 may include built-in wireless communication modes, and/or may be installed with wireless communication modules. Throughout this specification, the terms "sensing device," "sensing/measuring device," and "sensor" are used interchangeably, and may be substituted one for the other to obtain different embodiments. In at least one embodiment, some or all of the sensor system 150 are set as external devices outside of the control device 102.

In at least one embodiment, the sensor system 150 may include an image sensor, a sound sensor, a temperature sensor, a motion sensor, a light sensor, a feedback sensor, a tilt sensor, a distance sensor, and/or a pressure sensor. In one embodiment, the sensor system 150 may include image sensors, such as optical cameras, video cameras, or infrared cameras, for detecting the movement and/or gestures of a user. Additionally or alternatively, the sensor system 150 may include sound sensors such as microphones or mini-microphones for detecting voice commands from the user. Additionally or alternatively, the sensor system 150 may include infrared temperature sensors. In at least one embodiment, the sensor system 150 allows user interaction with the display system 100. For example, a viewer may press the touch screen on the display panel, and signals are transmit from the touch screen to the control circuit 102. The control circuit 102 processes the signals and, based on the signals, sends control instructions to the multimedia controller, the power controller 130, and/or the drive circuit 140 to move the display item in coordination with the multimedia content played on the display panel, and/or to adjust the lighting effects. Throughout this specification, the terms "viewer," "participant," "passerby," and "user" are used interchangeably, and may be substituted one for the other to obtain different embodiments.

In at least one embodiment, a plurality of sensors may be installed in the display system 100 and/or attached to devices of the display system 100 for detecting the status of the operation of the display system 100. For example, a speed sensor may be physically attached to the motion module and provide speed data about the motor and/or a turntable. In another example, a distance sensor may be mounted on a door or door frame of the display system 100 (e.g., a door of a displayed model of residential house, a door between a display space and a concealed space, etc.) and detect whether the door is open or closed. In yet another example, a light sensor (e.g., an ambient light sensor) may be installed inside the display system 100 (e.g., on the stage, close to the display panel, on a sidewall, etc.) and detect the relative brightness inside and/or outside the display system 100. In another example, an inclination sensor may be attached to a model of a wine bottle that is inclined to pour the wine into a glass. The inclination sensor detects the operation and progress and feeds back the sensing data to a closed loop system to control the motion module to continue or stop. In an embodiment, the control system includes a closed loop system (also called closed loop control system or a feedback system), in which outputs of the control system are "fed back" as inputs as part of a chain of cause-and-effect that forms a circuit or loop of the control system. In the closed loop feedback system of display system 100, the results of the output are used to compute an adjustment to the input (if needed) to achieve a desired result (e.g., a desired state of operation of the display system 100) and thereby accurately control the status of operation of the display system 100.

In at least one embodiment, the sensor system 150 may include a touch screen device, a mobile device, and/or a controller, via which a user may interact with the display system 100, select and/or input information. In at least one embodiment, the sensor system 150 may be external to the display system 100, such as a mobile phone of a user or a remote controller, which is convenient for the user at different locations to interact with the display system 100. Additionally or alternatively, the sensor system 150 may be located and/or installed in the display system 100, such as a touch screen of the display panel or sensors installed in a device of the display system 100.

In at least one embodiment, the sensor system 150 may include digital sensors and/or analog sensors that communicate with the control device 102 using digital signals and/or analog signals, respectively. In at least one embodiment, the sensor system 150 sends the sensing signals to the control circuit 120, which processes the sensing signals and generates control instructions based on the sensing signals. For example, the sensing signals may include a reading of the strength of voltage or current of an analog audio sensor, and the reading varies continuously with the pressure of the sound waves (e.g., sound waves produced by the user to input voice commands, for example, to determine whether the signal crosses a threshold or within a preset range in order to determine what response to display or create). In another example, the sensing signals may include a reading of the digital value of a digital sensor. In yet another example, the sensing signals may include an on or off reading of a switch type sensor. In one embodiment, a sensing signal may directly correlates with information about a specific instruction. For example, when a user presses on a pressure sensor that is labeled with "Press to stop the car moving," the signal from the pressure sensor indicates the information of the instruction to the control circuit 120 to stop the car, and then the control circuit 120 sends control commands to the drive circuit to stop the motor of the car model in the display system 100.

In at least one embodiment, the sensor system 150 can be active or passive. In at least one embodiment, an active sensor can operate without receiving control instructions from external sources (e.g., the active sensor can autonomously output sensing data continuously or periodically as long as the power controller 130 supplies electrical power to the active sensor). In at least one embodiment, a passive sensor, only when receiving an instruction and/or a request, would perform detection operation and output detected sensing data in response to the request received. In at least one embodiment, the display system 100 may include both active and passive sensors. In at least one embodiment, the control device 102 sends instructions to the passive sensors for controlling the operation of sensing and/or detection. In at least one embodiment, sensing data from both active devices and passive devices are transmitted to the control device 102 and processed by the control circuit 120.

In at least one embodiment, the sensor system 150 may transmit a single input to the control device 102, for example, to record a status of the door (whether closed or open). In one embodiment, input single from the sensor system 150 is received at a microcontroller that is not in control of the door. For example, the single input is recorded by the microcontroller as a reference to be used by other microcontrollers and/or modules. Additionally or alternatively, the input data is used for controlling an open loop system. For example, a user intends to open a door of a model of a house by pressing on a pressure sensor or a touch screen. The pressure sensor or the touch screen sends input data caused by the user to a microcontroller, which in turn sends control instructions to drive circuit 140 to turn on a motor to open the door (without giving any feedback).

For example, the control device 102 receives the input data from the distance sensor indicating the closure of the door, and therefore stops the rotation of a turntable that may transfer items through the door. Additionally or alternatively, the sensor system 150 detects and transmits a series of feedback data for the control of a closed loop control system. The closed loop systems will be discussed in further detail in conjunction with FIGS. 8C-8E.

Motion module 160 is a module, which when activated moves display items and/or live performers according to different exhibition or performance requirements. In at least one embodiment, the motion module 160 includes one or more motors, gears, pulley systems, and/or assemblies of gears that may interact with one another in manners that were discussed in conjunction with FIGS. 1, 5, 6, and 7A-7E of the U.S. application Ser. No. 14/535,195.

In at least one embodiment, the motion module 160 is connected to the drive circuit 140, which controls the power supply as well as the operation of the motion module. In at least one embodiment, upon receiving control commands from drive circuit 140 and/or the control circuit 120, the motion module 160 may control at least a motor to rotate forwards or backwards, which further rotates and/or moves, for example, a turntable, an elevation platform, vehicles that have wheels on a track, and/or different pulley systems and gears. In at least one embodiment, the motion module 160 may include a motor that drives a turntable of the lighting module for changing the color of light or changing the beaming angle, as described in conjunction with FIGS. 8A-8D of the U.S. application Ser. No. 14/535,195. Various components and operations were discussed in conjunction with the U.S. application Ser. No. 14/535,195.

Lighting module 170 is a module, which when activated controls the light effects during display of exhibition or performance by display system 100 under the control of the control device 102. In at least one embodiment, the lighting module 170 controls on and off of lighting devices, and/or adjusts brightness, color, and/or angles of the beam of light in display system 200. In at least one embodiment, the lighting module 170 includes one or more light bulbs and/or spot lights. In at least one embodiment, the manners of the operation of the lighting module 170 were discussed in conjunction with FIGS. 2 and 8A-8D of the U.S. application Ser. No. 14/535,195.

Audio module 180 is a module that includes software and/or hardware for playing audio content and adjusting the audio effects under the control of the control device 102. In at least one embodiment, the audio module 180 includes an audio controller, an audio signal amplifier, and one or more loudspeakers. In at least one embodiment, the audio module 180 plays audio content that are retrieved from the multimedia database under the control of the multimedia controller.

In one embodiment, the display system 100 may have multiple display modules that share a single broadcast system via one audio module 180, which controls different loudspeakers to play different audio content in coordination with the videos on different display panels. In at least one embodiment, the audio controller 180 controls multiple channels to broadcast different audio content at the same time.

Multimedia controller 181 is a device that receives control commands from the control circuit 120 of the control device 102, and accordingly controls the display module and/or audio module to play multimedia content. In at least one embodiment, the multimedia controller 181 controls the play of multimedia content that includes any of, or any combination of, content forms including, but not limited to, text, still images, animation, video, audio, and/or interactive content forms. Throughout this specification, the terms "multimedia" and "multimedia content" are used interchangeably, and may be substituted one for the other to obtain different embodiments.

In at least one embodiment, the multimedia controller 181 is connected with the control circuit 120, the multimedia database, one or more display modules, and/or the audio module. In at least one embodiment, the multimedia controller 181 selects and retrieves the multimedia content from the multimedia database, based on the control commands received from the control circuit 120, and sends instructions to the display modules for playing videos and/or images on the display panels. In at least one embodiment, the multimedia controller 181 sends instructions to the audio module for playing audio content, via the loudspeakers. In at least one embodiment, the multimedia controller 181 controls the play of the multimedia content (e.g., advertisements) in coordination with the display of items and/or performances.

Multimedia database 182 is a database that stores and manages multimedia content. In at least one embodiment, multimedia database 182 stores videos, images, texts, audio content, etc. In at least one embodiment, the multimedia database 182 stores multimedia content (e.g., advertisements) that are related to the display item and/or performances. Multimedia database 182 may store the multimedia content in association with other information, such as what other content is played in conjunction with the multimedia content and/or what signals trigger the display of the multimedia content.

Audio controller 184 is a device that receives instructions from the multimedia controller 181 and controls the audio signal amplifier and one or more loudspeakers to play audio content. In at least one embodiment, the audio controller 184 executes the control instructions received from the multimedia controller 181 and retrieves audio content from the multimedia database 182 to play via the loudspeakers. In at least one embodiment, the audio controller 184 sends audio signals via single or multiple channels to the audio signal amplifier, which drives one or more loudspeakers for broadcasting the audio content. Throughout this specification, the terms "play" and "broadcast" are used interchangeably, and may be substituted one for the other to obtain different embodiments. In at least one embodiment, the audio controller and/or the audio signal amplifier are powered via power supply 104.

Audio signal amplifier 186 is an electronic amplifier that amplifies low-power audio signals to a level suitable for driving loudspeakers. In at least one embodiment, the audio signal amplifier 186 is a multi-channel audio signal amplifier.

Loudspeakers 188 are electroacoustic transducers that convert electrical audio signals into the corresponding sound. In at least one embodiment, one or more loudspeakers 188 are connected to the audio signal amplifier for converting the amplified audio signals into sound. In at least one embodiment, the audio module 180 includes one or more loudspeakers 188 for playing the same or different audio content. In at least one embodiment, different loudspeakers 188 may be installed in different locations to broadcast different audio content in coordination with the display and/or the video content on different display panels.

Display modules 190 include software and/or hardware for playing multimedia content under the control of the multimedia controller 181. In at least one embodiment, the display system includes one or more display modules 190 that include a display controller and at least one display panel for playing video, images, texts, etc., which may be retrieved from the multimedia database 182 under the control of the multimedia controller 181. In at least one embodiment, a plurality of display modules 190 may play the same or different multimedia content based on the display requirements. In at least one embodiment, the display modules are powered via power supply 104, optionally under the control of the power controller 130.

Display controller 192 is a device that receives instructions from the multimedia controller 181 and accordingly controls the display panels to play multimedia content. In at least one embodiment, the display controller 192 controls the transparency of at least a portion of the display panel. In at least one embodiment, the display controller 192 receives instructions from the multimedia controller 181 to retrieve a video from the multimedia database 182 and sends the retrieved video to the display panels for playing.

In at least one embodiment, the display controller 192, based on the instructions received, sends a display message to at least one display panel. In at least one embodiment, the display controller 192 may send messages to the display panels to clear the current screen (e.g., blank the display panel and make it transparent or all black), or may play certain portions of a video or image on certain display panels. In one embodiment, clearing the current screen may be done by sending messages from the display controller 192 to the display panel, which messages may include one or more of: setting the next active pixel as the first pixel in the next line (HSYNC); resetting the first pixel and setting the next active pixel as the first pixel at the top left corner (VSYNC); setting effective pixels (DEC); rectifying red green blue (RGB) trichromatic data (DCLK); distributing red, green and blue pixel data actually and evenly (DATA) (18-24 lines) to get one blank screen. In at least one embodiment, the display message sent by the display controller 192 controls the backlight intensity of the display panels. For example, when it is detected that the image on the display is out of synchronization with the audio file be played and lags the audio file, the display controller 192 may advance the image by setting the next pixel to the first pixel of the next line (using the HSYNC signal or next frame using the VSYNC signal.

Display panel 194 is an electronic panel that plays multimedia content and also allows viewers to see through to observe display items or performers in display system 100. In one embodiment, the display panel 194 is a liquid-crystal display (LCD) panel. In at least one embodiment, according to display requirements and/or the multimedia content, at least a portion of the display panel 194 turns transparent or semi-transparent, so that viewers can see through the transparent or semi-transparent portion and observe the display items or performers inside a display space. The characteristics of display panels 194 and the manners that the display panels 194 are set up were discussed in conjunction with the U.S. application Ser. No. 14/535,195. In at least one embodiment, display system 100 includes a plurality of display panels 194 that are grouped into different groups for playing the same or different multimedia content.

In at least one embodiment, different groups of display panels 194 are respectively set up in different regions of the display system 100 to enhance the display effects and attractiveness of exhibition. For example, five display panels 194, each having the same area, are used to playing multimedia content under the control of the control device 102. One of the five display panels 194 is installed approximately at the bottom left of the display system 100, and the other four that form a 2×2 "⊞" shape are installed approximately at the bottom right of the display system 100. The one display panel at the bottom left displays an image while the other four display panels at the bottom right display, as a whole, the same or different image four folds bigger than the area of the image on the bottom left. Additionally or alternatively, the four display panels at the bottom right individually display four different images, while the one display panel at the bottom left displays another image. Additionally or alternatively, each of the display panels individually displays the same or different images and/or videos. In one embodiment, different display panels and/or groups of display panels in different locations display the same image at the same time. Alternatively, the same image is respectively displayed on a group of display panels as a whole of different sizes (e.g., a group of display panels in a 2×2 "⊞" shape, or in a 3×3 "⊞" shape, or in a 1×3 stretched shape, etc). In at least one embodiment, image may be divided into different sections and stored in the multimedia database 182, and the different sections of the images may be retrieved by the multimedia controller 181 or the display controller 192 to be played on different display panels based on the location of the display panels in the group that plays the image as a whole. Additionally or alternatively, the images may be divided in real time by a built-in image processor in the multimedia controller 181 and/or the display controller 192.

In at least one embodiment, the sensor system 150 detects the presence or activity of a user and sends the sensing signals via the human-machine interface module 110 to the control circuit 120. The control circuit 120 processes the sensing signals and generates, based on the sensing signals, control instructions. The control circuit 120 sends the control instructions to the multimedia controller 181, the power controller 130 and the drive circuit 140. The multimedia controller 181 selects, based on the control instructions, multimedia content (e.g., video content and audio content) from a multimedia database 182 and sends control instructions and the multimedia content that was selected to the display module 190 and the audio module 180. The display module 190 plays the video content on one or more display panels 194 and may turn a portion of the display panel 194 transparent, based on the instructions received from the multimedia controller 181. The audio module 180 plays the audio content under the control of the multimedia controller 181. The power controller 130, based on the control instructions received from the control circuit 120, controls the power and thus the on-and-off of the display panel 194 of the display module 190 and the lights of the lighting module 170, for example. The power controller 130 may also control the power to one or more motors that may adjust the angle of the beam of light from the lighting module 170, and/or colors of light. The drive circuit 140, based on the control instructions received from the control circuit 120, controls one or more motors to move devices such as a turntable, platform, vehicle, trolley, and thus move the display item. Feedback sensors may be installed in the display system 100 to detect actual speed, brightness of light, and other status of the display system 100. The feedback sensors may feedback data representing the actual status of the display system 100 to a closed loop system of the control device 102, so that the control device 102 may accurately control and adjust the operation of the display system 100.

Figure 2:
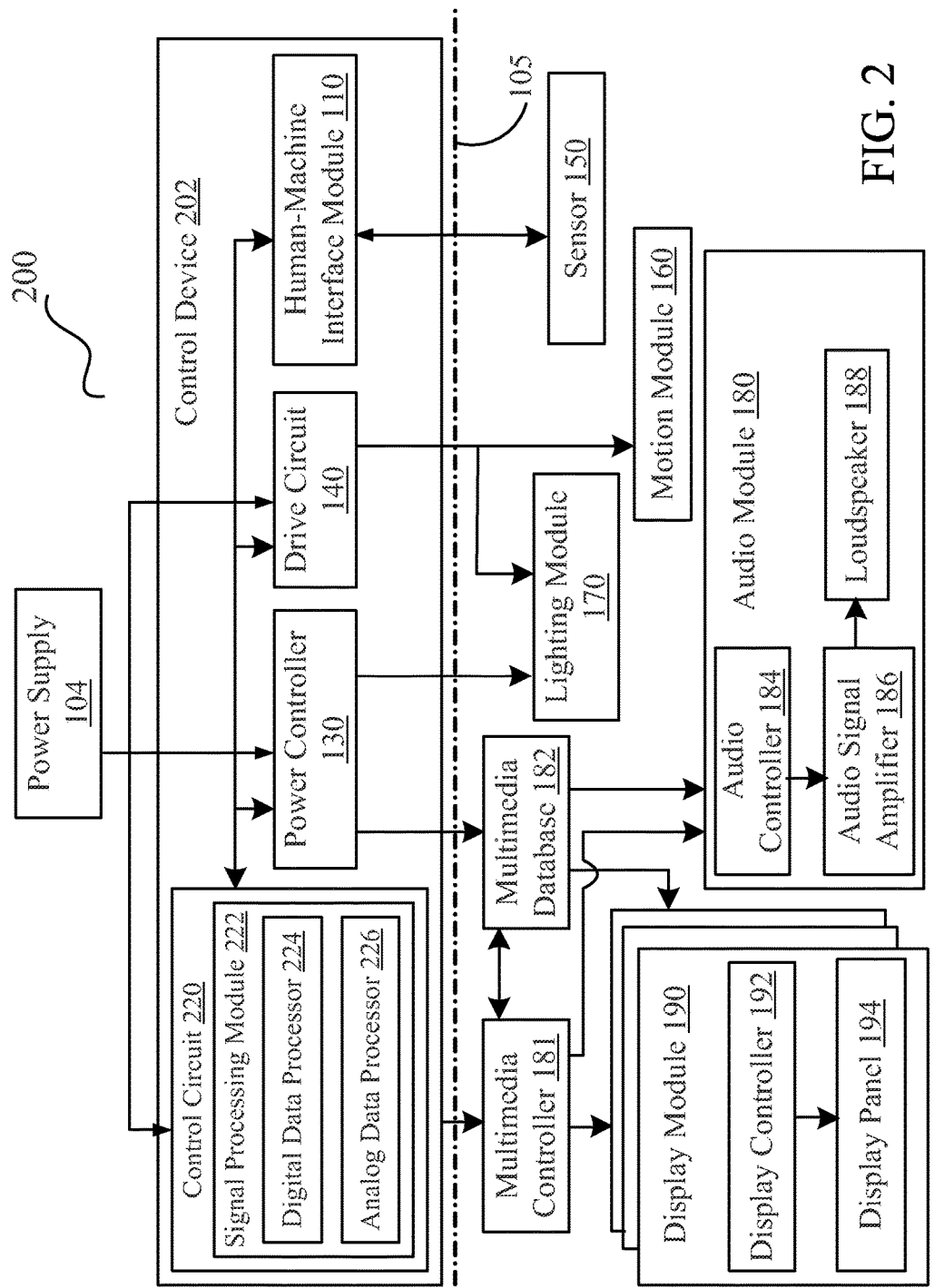
FIG. 2 shows a block diagram of another embodiment of the display system of FIG. 1.

FIG. 2 shows a block diagram of another embodiment of the display system 100 of FIG. 1. The display system 200 includes at least power supply 104, line 105, human-machine interface module 110, power controller 130, drive circuit 140, sensor system 150, motion module 160, lighting module 170, audio module 180, multimedia controller 181, multimedia database 182, audio controller 184, audio signal amplifier 186, loudspeakers 188, display modules 190, display controller 192, and display panel 194, which were discussed in conjunction with FIG. 1. Display system 200 further includes at least a control device 202 that includes a control circuit 220. The control circuit 220 includes at least a signal processing module 222 that includes a digital data processor 224 and an analog data processor 226. In other embodiments, display system 200 may not have all of the elements or features listed and/or may have other elements or features instead of, or in addition to, those listed.

In the embodiment of FIG. 2, the control circuit of the control device of display system 200 includes a signal processing module for processing digital signals and/or analog signals received from the sensor system 150, via the human-machine interface module 110.

Control device 202 and control circuit 220 are embodiments of the control device 102 and the control circuit 120, respectively, which were discussed in conjunction with FIG. 1. The control circuit 220 includes at least a signal processing module 222 that includes a digital data processor and an analog data processor.

Signal processing module 222 is a module, which when activated uses applications, algorithms, and implementations to process signals. In at least one embodiment, the signal processing module 222 includes hardware and/or software that use mathematical, statistical, computational, heuristic, and linguistic representations, formalisms, and techniques for representation, modeling, analysis, synthesis, discovery, recovery, sensing, acquisition, extraction, learning, security, or forensics. In at least one embodiment, the signal processing module 222 receives digital and/or analog signals from the sensor system 150 via the human-machine interface module 110. In at least one embodiment, the signal processing module 222 processes and/or converts the digital signals and/or analog signals, and generates digital control instructions for controlling the multimedia controller 181, the power controller 130, and/or the drive circuit 140. In at least one embodiment, the control circuit 220 includes one or more digital signal processing modules 222 for processing data received from various sensors and/or external devices.

In at least one embodiment, the signal processing module 222 includes one or more microprocessors that implement software programs to process digital data. The methods and/or algorithms used to process digital data include, but are not limited to, fuzzy logic control, proportional-integral-differential control, artificial neural network control, etc. In one embodiment, the signal processing module 222 includes digital to analog converter (DAC) for converting analog information received to digital data, which could be processed by the digital data processor. Additionally or alternatively, the signal processing module 222 includes analog to digital converter (ADC) for converting digital data to analog information, which could be processed by the analog data processor. In at least one embodiment, the signal processing module 222, which when activated processes sensing/measuring signals.

Digital data processor 224 is a processor, which when activated processes digital signals. In one embodiment, digital data processor 224 includes general-purpose computers or digital circuits such as ASICs, field-programmable gate arrays or specialized digital signal processors (DSP chips). In one embodiment, the digital data processor 224 uses arithmetical operations to process digital data, which operations include fixed-point and floating-point, real-valued and complex-valued, multiplication, etc. In at least one embodiment, the digital data processor 224 converts the digital sensing signals received from the sensor system 150 to digital instructions and transmits to at least one microprocessor of the control circuit 220.

Analog data processor 226 is a processor, which when activated processes analog information. In one embodiment, the analog data processor 226 includes linear electronic circuits as well as non-linear circuits. In at least one embodiment, the analog data processor 226 converts the analog sensing signals, received from the sensor system 150, to digital data to be further processed by at least one microprocessors of the control circuit 220.

Figure 3:
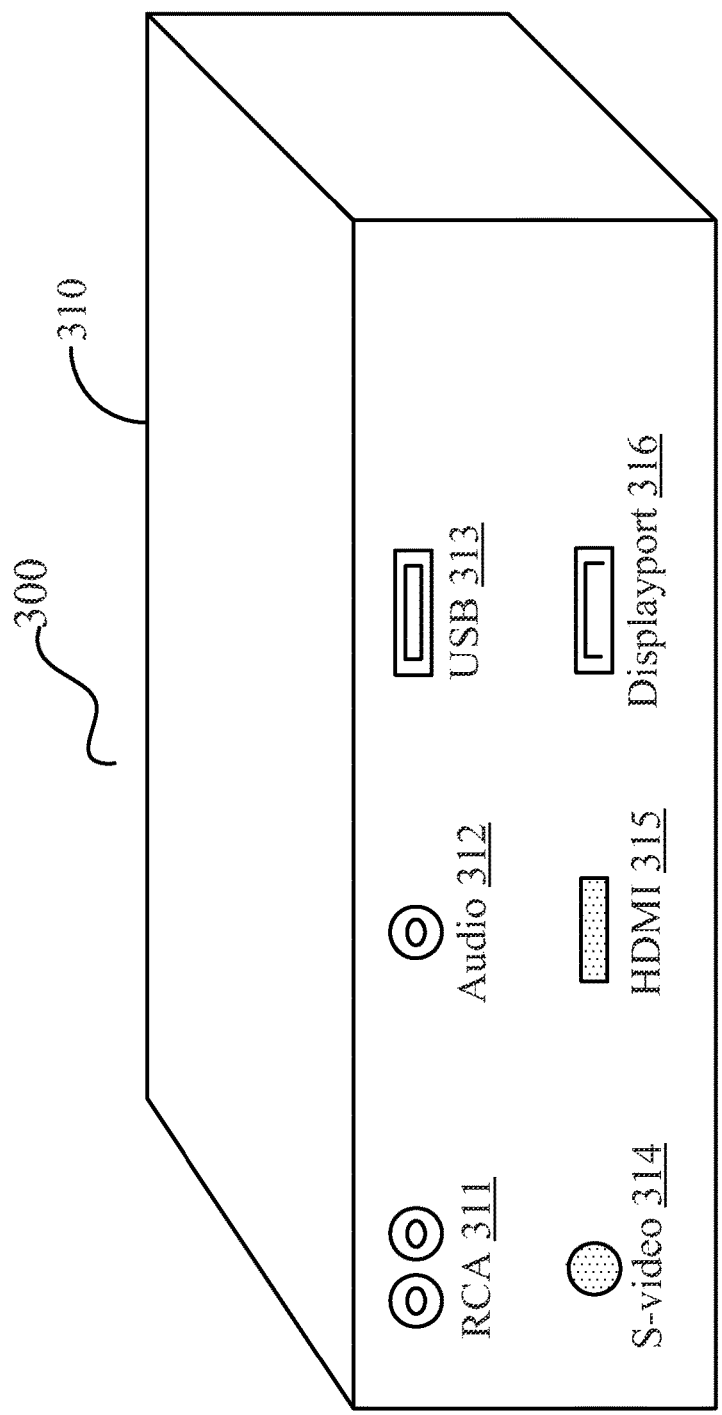
FIG. 3 shows an embodiment of the human-machine interface module of FIG. 1.

FIG. 3 shows an embodiment 300 of the human-machine interface module 110 of FIG. 1. FIG. 3 includes a human-machine interface module 310 that includes at least a RCA port 311, an audio port 312, a Universal Serial Bus (USB) port 313, a separate video (S-video) port 314, a High Definition Multimedia Interface (HDMI) port 315, and a display port 316. In other embodiments, human-machine interface module 310 may not have all of the elements or features listed and/or may have other elements or features instead of, or in addition to, those listed.

FIG. 3 shows an embodiment of the human-machine interface module 310, which includes one or more connection ports for connecting to one or more sensors and/or external devices. Throughout this specification, the terms "socket," "connection port," and "port" are used interchangeably, and may be substituted one for the other to obtain different embodiments. External devices (e.g., sensors, touch screens, etc.) may be connected to the human-machine interface module 310 via a direct wire and/or a detachable wire. In at least one embodiment, external devices use data cables to connect to the human-machine interface module 310 of the control device 102 depending on the matching sockets (e.g., an external camera or infrared camera may include connection plugs for both S-Video and RCA sockets; an image sensor may include connection plug for an HDMI port). Additionally or alternatively, various external devices may use universal socket plugs (e.g., a USB cable and connector) to connect to the human-machine interface module 310.

Human-machine interface module 310 is an embodiment of the human-machine interface module 110 that was described in conjunction with FIG. 1. In at least one embodiment, the human-machine interface module 310 includes one or more connection ports that may physically engage cables and/or connectors for connecting the sensor system 150 to the control device 102. In other embodiments, the human-machine interface module 310 may include other connection ports for transmitting data, such as Digital Visual Interface (DVI), Video Graphics Array (VGA), for example.

RCA port 311 is a receptacle or jack to which an RCA connector can be connected to transmit audio and video signals between sensor system 150 (e.g., camera, infrared camera, etc.) and the control device 102.

Audio port 312 is a receptacle or jack to which an audio device such as loudspeakers, headphones or a microphone can be connected to transmit audio signals.

USB port 313 is a USB socket into which a USB cable can be plugged for transmitting data between various types of sensor system 150 and the control device 102.

S-video port 314 is a port to which an S-video cable is connected to transmit video signals. In an embodiment, S-video port 314 of the human-machine interface module 310 allows transmission of S-video (also called separate video or super-video) signals which may include 480i or 576i signals. By using S-video port 314, higher color resolution is achievable by separating the black-and-white signal and the color signal on different lines.

HDMI port 315 is a port to which a HDMI connector and cable can be connected to transmit high-quality and high-bandwidth streams of audio and video signals.

Display port 316 is a display interface that relies on packetized data transmission, a form of digital communication found in technologies including Ethernet, USB, and PCI express. In one embodiment, the display port 316 is DisplayPort developed by the Video Electronics Standards Association (VESA). In one embodiment, the display port 316 allows both internal and external display connections, and the display port 316 protocol is based on small data packets (e.g., micro packets) that can embed the clock signal within the data stream, allowing higher resolutions with fewer pins as compared to were the clock signal not embedded in the data stream.

Figure 4:
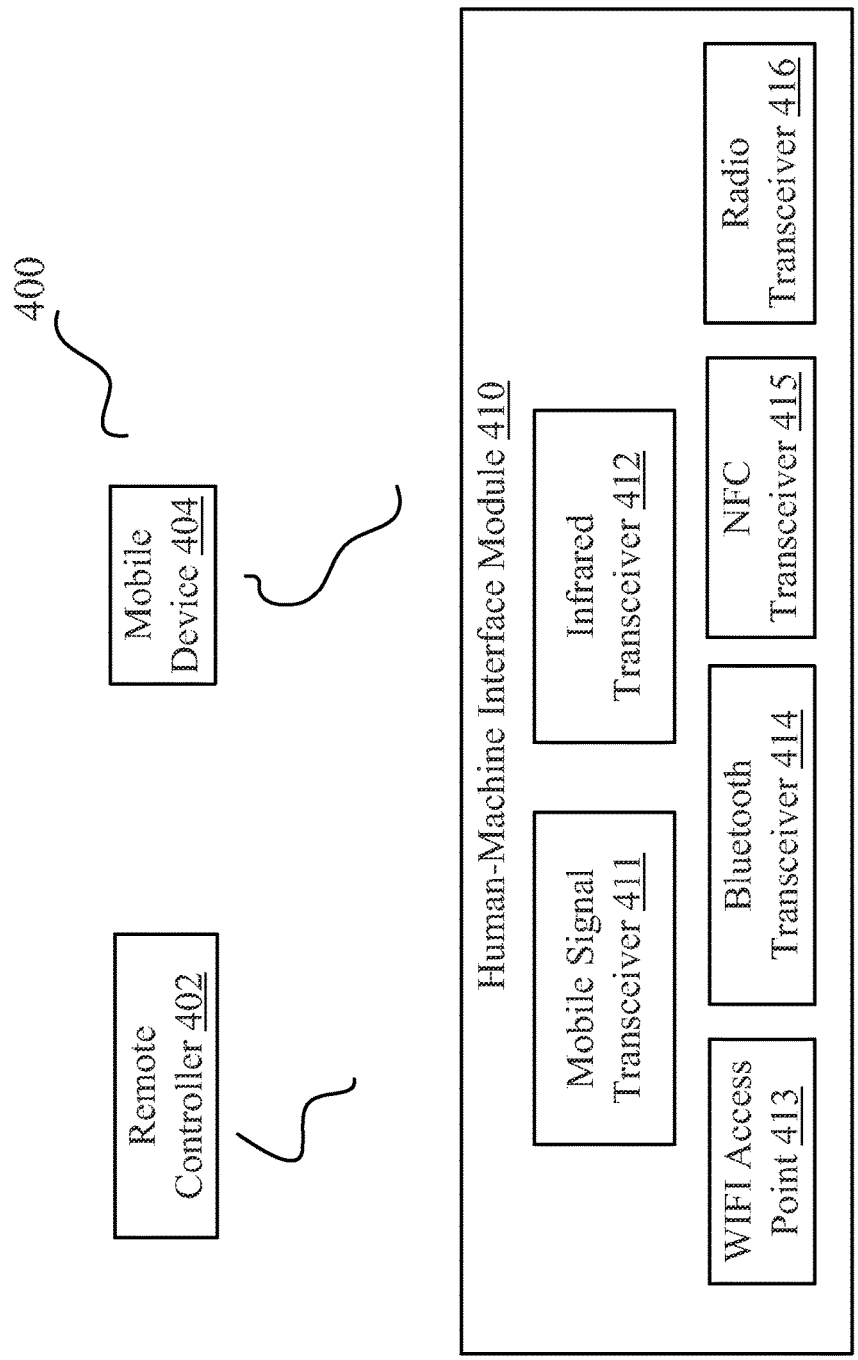
FIG. 4 shows a block diagram of an embodiment of the human-machine interface module of FIG. 3.

FIG. 4 shows a block diagram of an embodiment 400 of the human-machine interface module 310 of FIG. 3. FIG. 4 shows a remote controller 402, a mobile device 404, and a human-machine interface module 410. The human-machine interface module 410 includes at least a mobile signal transceiver 411, an infrared (IR) transceiver 412, a WIFI access point 413, a Bluetooth transceiver 414, a Near Field Communication (NFC) transceiver 415, and a radio transceiver 416. In other embodiments, FIG. 4 configuration may not have all of the elements or features listed and/or may have other elements or features instead of, or in addition to, those listed.

FIG. 4 shows that the human-machine interface module 410 may communicate with external devices, such as a remote controller and/or a mobile device, via wireless connections.

Remote controller 402 is an electronic device that is used to operate the display system 100 wirelessly from a short distance. In one embodiment, remote controller 402 allows a user to interact with the display system 100 that is out of convenient reach for direct operation of controls. In one embodiment, the remote controller 402 includes buttons that may be pressed by the user to make selections and/or input to control the display system 100. Additionally or alternatively, the remote controller 402 may include a touch screen and a user interface for the user to interact with the display.

Mobile device 404 is used and/or owned by a user for communicating and/or interacting with the display system 100. Mobile device 404 may also have other uses, such as making phone calls, browsing a network, personal computing, and/or receiving messages. For example, the mobile device 404 may include smart phones, PDA (Personal Digital Assistant), tablet PCs, laptops, and/or other electronic mobile devices capable of running mobile applications. In at least one embodiment, the mobile device 404 includes wearable electronics or wearable devices such as Google Glass, Apple iWatch, clothing or accessories that incorporate electronic technologies and can run applications, etc. In at least one embodiment, the mobile device 404 is equipped with a communication module (e.g., a network interface) to communicate with a mobile communication network. In at least one embodiment, the mobile device 404 may include built-in communication modules to communicate with the human-machine interface module via WIFI, Bluetooth, radio, audio communication, and/or mobile network communication.

Human-machine interface module 410 is an embodiment of the human-machine interface modules 110 and 310, which were discussed in conjunction with FIGS. 1 and 3. In at least one embodiment, the human-machine interface module 410 includes modules and/or devices that allow transmission of wireless signals between the control device and the remote controller 402 and/or the mobile device 404. In at least one embodiment, the human-machine interface module 410 may include a wireless network access point, a WIFI access point or router, a Bluetooth, a NFC transceiver, a radio transceiver and/or an audio transceiver, a mobile network transceiver, an infrared transceiver, etc. In other embodiments, the human-machine interface module 410 may include other devices for wireless communications. Additionally or alternatively, the human-machine interface module 410 may communicate with one or more sensor system 150, via wireless connections.

Mobile signal transceiver 411 includes a mobile network transmitter and a receiver for transmitting and receiving mobile network signals, respectively. In one embodiment, the mobile signal transceiver 411 communicates with external devices, via mobile network.

Infrared (IR) transceiver 412 is a transceiver that transmits and/or receives information using IR signals. In one embodiment, the IR transceiver 412 includes infrared light-emitting diodes (LEDs) to emit infrared radiation that is focused by a plastic lens into a narrow beam. The beam is modulated (e.g., switched on and off) to encode the data. In one embodiment, the IR transceiver 412 includes an IR receiver that uses a silicon photodiode to convert the infrared radiation to an electric current.

WIFI access point 413 is a device that allows wireless devices to connect to a wired network using WIFI. Allowing passersby to use access point 413 to connect to a wired network may encourage passersby to view the displays of display system 100.

Bluetooth transceiver 414 is a transceiver chip or microchip that transmits and receives signals using Bluetooth communications protocol.

Near Field Communication (NFC) transceiver 415 includes a transmitter and a receiver that transmits and receives NFC signals, respectively. In one embodiment, NFC includes a set of short-range wireless technologies, typically requiring a distance of 10 cm or less.

Radio transceiver 416 includes a transmitter and a receiver that transmits and receives radio signals, respectively.

By providing mobile signal transceiver 411, IR transceiver 412, WIFI access point 413, Bluetooth transceiver 414, NFC transceiver 415, and radio transceiver 416, the user is given a variety of different options of interacting with the human-machine interface module 410, making it more likely that passerby will interact with display system 100.

Figure 5:
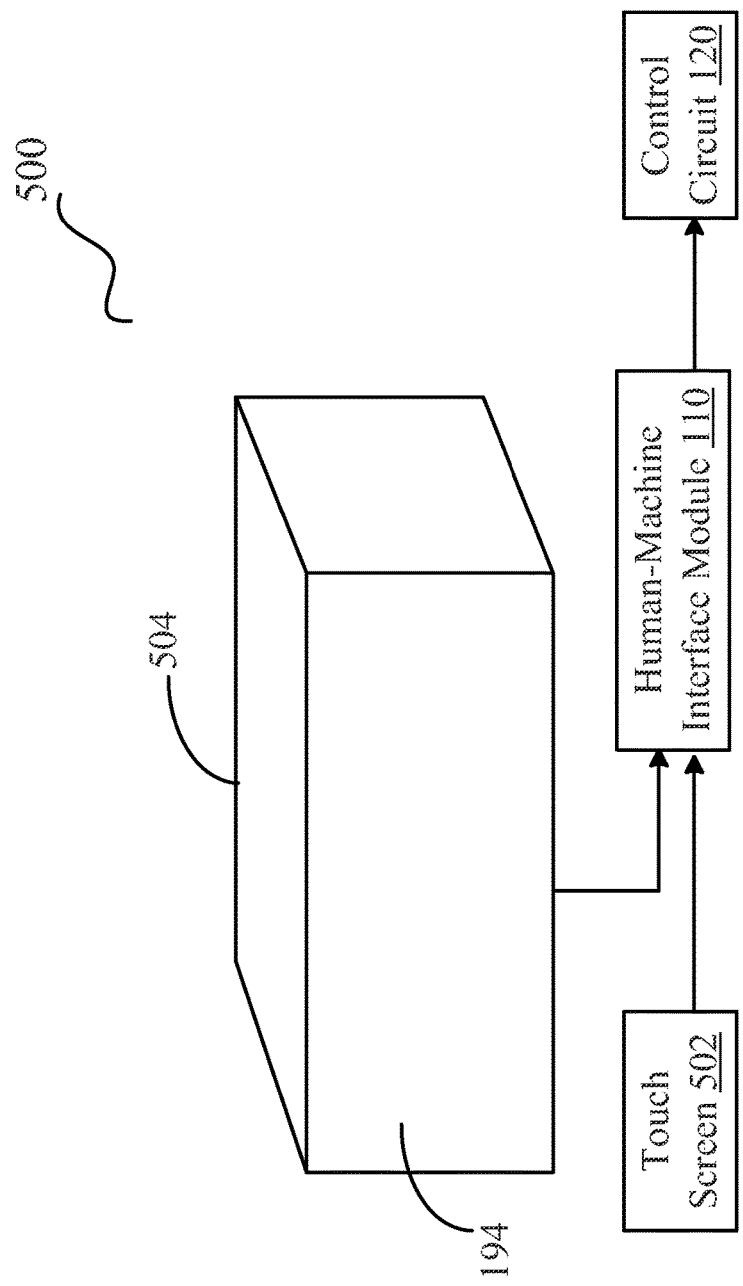
FIG. 5 shows a block diagram of an example of manipulation of the display system of FIG. 1.

FIG. 5 shows a block diagram of an example 500 of manipulation of the display system 100 of FIG. 1. Example 500 of FIG. 5 includes at least the human-machine interface module 110, control circuit 120, and display panel 194, which were discussed in conjunction with FIG. 1. Example 500 of FIG. 5 also includes a touch screen 502 and a display system 504. In other embodiments, example 500 of FIG. 5 may not have all of the elements or features listed and/or may have other elements or features instead of, or in addition to, those listed.

The FIG. 5 embodiment includes a touch screen connected to the human-machine interface module 110, via a wired or wireless connection, allowing the user's interaction to control the display system 100. FIG. 5 also shows that the display panel 194 may also function as a touch screen for the user to interact with the display system 100. In at least one embodiment, the human-machine interface module 110 receives the sensing signals caused by the user pressing on the touch screen of the display panel or a stand-alone touch screen, and then in response, the display panel or stand alone touch screen transmits the sensing signals to the control circuit 120.

Touch screen 502 is a touch screen that provides an interface for receiving user input or allowing user interaction with the display system 100. In one embodiment, the touch screen 502 is a stand-alone device. In at least one embodiment, the touch screen 502 transmits sensing signals, based on the user's operation, to the human-machine interface module 110 via wired or wireless connections. Alternatively, a touch screen is on the display panel 194, or the display panel 194 may function as a touch screen. In one embodiment, the touch screen on the display panel 194 sends sensing information to the human-machine interface module 110. In at least one embodiment, a touch screen may be installed in, or as part of, a sensor system 150 for sensing the feedback or instruction of a participant. For example, a touch screen may be installed in the remote controller 402, or the mobile phone may include a touch screen for communicating with the human-machine interface module 110. In at least one embodiment, the touch screen 502 or the touch screen on the display panel 194 shows texts, images and/or graphical buttons to help the participant to select and/or input instructions to manipulate the display system 100.

Display system 504 may be an embodiment of the display system 100 as discussed in conjunction with FIG. 1. In at least one embodiment, display system 504 includes the modules and/or devices that are below the line 105 in FIG. 1. In at least one embodiment, the display system 504 includes a display space defined by at least a display panel 194 and other modules and/or structures of the display system 504.

Figure 6:
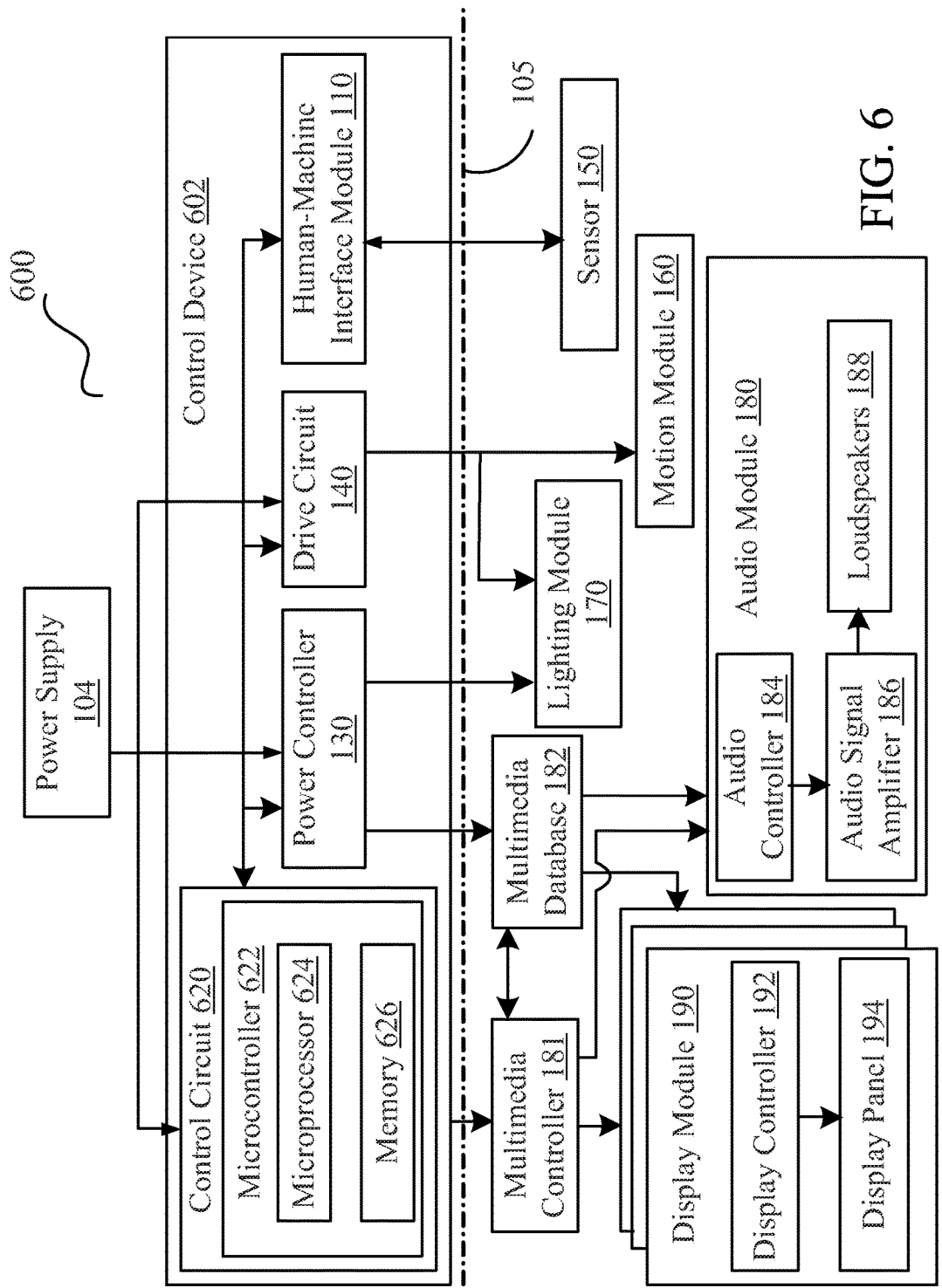
FIG. 6 shows a block diagram of another embodiment of the display system and the control device of FIG. 1.

FIG. 6 shows a block diagram of another embodiment of the display system 100 and the control device 102 of FIG. 1. Display system 600 includes at least the power supply 104, line 105, human-machine interface module 110, power controller 130, drive circuit 140, sensor system 150, motion module 160, lighting module 170, audio module 180, multimedia controller 181, multimedia database 182, audio controller 184, audio signal amplifier 186, loudspeakers 188, display modules 190, display controller 192, and display panel 194, which were discussed in conjunction with FIG. 1. Display system 600 further includes at least a control device 602 that includes a control circuit 620. The control circuit 620 includes at least a microcontroller 622, which includes a microprocessor 624 and a memory 626. In other embodiments, display system 600 may not have all of the elements or features listed and/or may have other elements or features instead of, or in addition to, those listed.

FIG. 6 shows a control circuit, which includes a microcontroller that controls the operations of the human-machine interface module 110, the power controller 130, the drive circuit 140, and/or the sensor system 150.

Control device 602 and control circuit 620 are embodiments of the control devices 102 and 202 and control circuits 120 and 220, which were discussed in conjunction with FIGS. 1 and 2. In one embodiment, the control circuit 620 includes at least one microcontroller that includes a microprocessor and a memory for controlling the operations of the display system 100.

Microcontroller 622 is a small computer on a single integrated circuit for controlling a plurality of modules and/or devices of the display system 100. In at least one embodiment, the microcontroller 622 includes at least a microprocessor 624 and a memory 626. In one embodiment, the microcontroller 622 also controls programmable input/output peripherals. In at least one embodiment, the microcontroller 622 is STM32F407 from ST Microelectronics. In at least one embodiment, the microcontroller 622, which when activated receives and transmits signals, processes signals, computes, executes logical operations, and/or generates control instructions.

Microprocessor 624 is a computer processor that incorporates the functions of a computer's central processing unit (CPU) on a single integrated circuit (IC) or a few integrated circuits. In one embodiment, the microprocessor 624 is a multipurpose, programmable device that accepts digital data as input, processes the digital data according to instructions stored in a memory, and provides results as output. In at least one embodiment, the microprocessor 624 processes digital sensing signals received from sensor system 150 via the human-machine interface module 110, and generates control commands based on the digital data received and corresponding algorithms. Additionally or alternatively, the microprocessor 624 converts analog signals to digital data and processes the digital data. In at least one embodiment, the microprocessor 624 merges and manipulates sensing signals received from different types of sensors, and makes a series of mathematical and logical operations to generate control commands to control multiple modules and/or devices of the display system 100. In one embodiment, the microprocessor 624 is ARM Cortex-M4.

In at least one embodiment, the microcontroller 622 includes multiple microprocessors 624, while the microcontroller 622 is considered as a master microcontroller and the microprocessors 624 are considered as slave microcontrollers that are controlled by the master microcontroller. In at least one embodiment, each of the slave microcontrollers can control separate modules of the display system while the master microcontroller controls the slave microcontrollers to coordinate the operation of various modules to achieve a synchronized exhibition. Additionally or alternatively, multiple slave microcontrollers can control multiple display systems under the control of one control device 102.

Memory 626 may include, for example, any one of, some of, any combination of, or all of a long term storage system, such as a hard drive; a short term storage system, such as random access memory; a removable storage system, such as a floppy drive or a removable drive; and/or flash memory. Memory 626 may include one or more machine-readable mediums that may store a variety of different types of information. The term machine-readable medium is used to refer to any non-transient medium capable carrying information that is readable by a machine. One example of a machine-readable medium is a non-transient computer-readable medium. In an embodiment, memory 626 may include software and interfaces for communicating with the human-machine interface 110, power controller 130, drive circuit 140, multimedia controller 181, etc. In an embodiment, memory 626 may include software and algorithms for processing sensing signals, converting signals, computing, and/or generating control commands based on the sensing signals.

Figure 7:
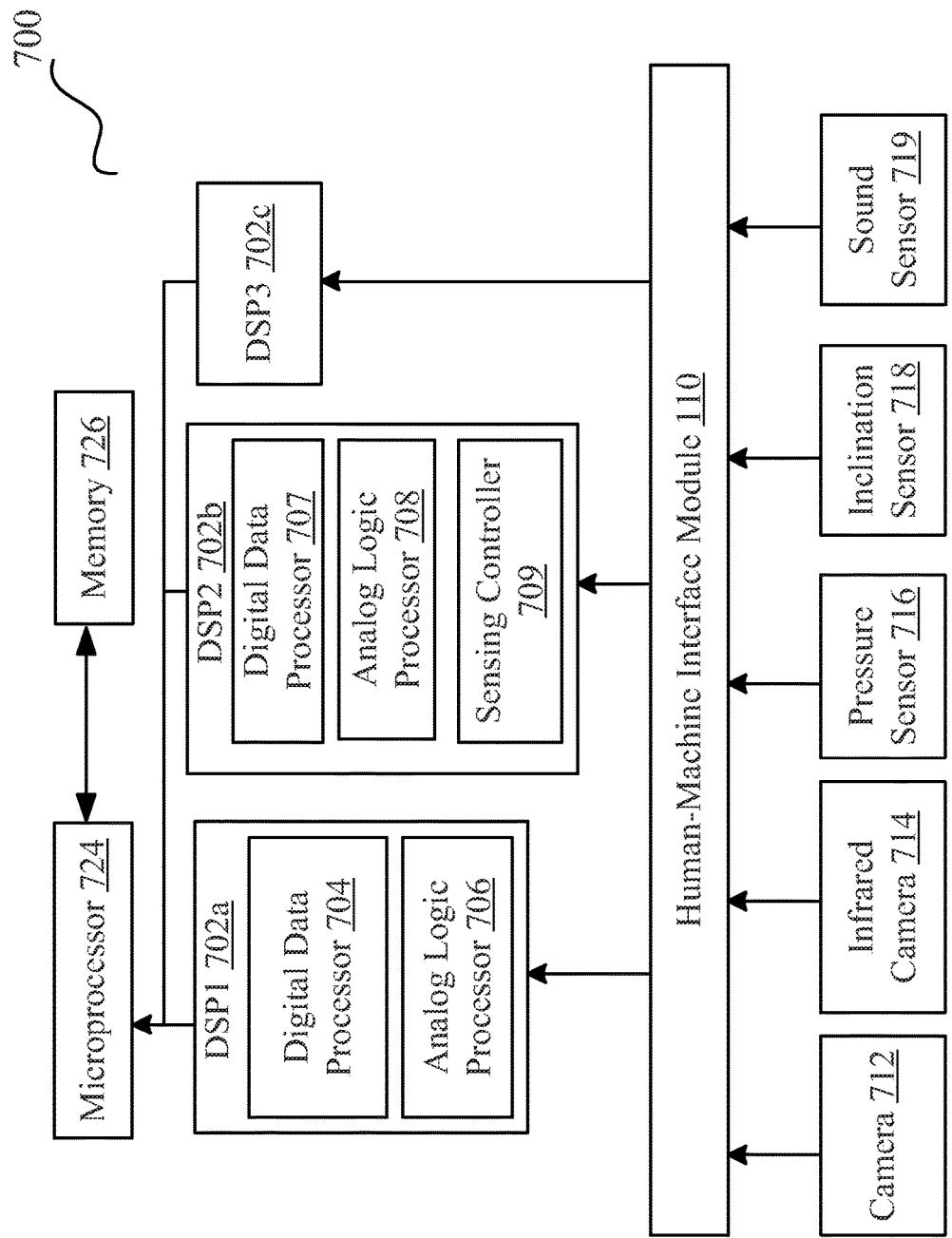
FIG. 7 shows a block diagram of an embodiment of the signal processing circuits in a control circuit.

FIG. 7 shows a block diagram of an embodiment 700 of the signal processing circuits in a control circuit. FIG. 7 includes human-machine interface 110 which was discussed in conjunction with FIG. 1. FIG. 7 further includes at least a digital signal processor 1 (DSP1) 702a that includes a digital data processor 704 and an analog logic processor 706, a DSP2 702b that includes a digital data processor 707, an analog logic processor 708, and a sensing controller 709, and a DSP3 702c. FIG. 7 further includes at least a camera 712, an infrared camera 714, a pressure sensor 716, an inclination sensor 718, a sound sensor 719, a microprocessor 724, and a memory 726. In other embodiments, FIG. 7 configuration may not have all of the elements or features listed and/or may have other elements or features instead of, or in addition to, those listed.

FIG. 7 shows that the control circuit of the control device may include multiple digital signal processing (DSP) modules for processing sensing signals received from the sensor system 150. In one embodiment, the control circuit may have a plurality of DSP modules and at least one microprocessor. In at least one embodiment, various DSP modules process sensing signals and transmit data to one or more microprocessors of the control circuit (or a microcontroller). In one embodiment, multiple microprocessors may transmit data to a control center or a control processor that sends control instructions to coordinate the operation of the modules and/or devices of the display system. In one embodiment, the DSP modules can directly send instructions to the multimedia controller, the power controller, and/or the drive circuit.

DSP1 702*a* is a digital signal processing module, which when activated processes digital signals received from the sensors. In at least one embodiment, the DSP1 702*a* includes a setting to convert analog signals to digital signals when analog signals are received. In at least one embodiment, the DSP1 702*a* includes a KeyStone multicore digital processor TMS320C667x from Texas Instruments (US) for processing images. For example, a camera or infrared camera takes an image and transmits the image data via the human-machine interface module 110 to the DSP1 702*a*. DSP1 702*a* converts the image data into digital signals and transmits the digital signals to the microprocessor. In at least one embodiment, the DSP1 702*a* includes at least a digital data processor and an analog logic processor.

DSP2 702*b* may be similar to DSP1 702*a*. In at least one embodiment, DSP2 702*b* receives sensing signals from one or more sensors and processes the sensing signals under the control of a sensing controller. In at least one embodiment, DSP2 702*b* compares the sensing signals received and preset digital values, and sends the results of the comparison and/or computation to the microprocessor of the control circuit for generating control instructions. In at least one embodiment, the DSP2 702*b* receives a digital signal from a sensor and compares the digital signal with a preset value or a preset range. If the received signal is determined by the DSP2 702*b* to be within the preset range, for example, the DSP2 702*b* sends a corresponding control instruction to the microcontroller to execute the corresponding operation in response to the signal received. For example, DSP2 702*b* receives a sensing signal from a pressure sensor (e.g., on a touch screen or a button) and the analog logic processor of DSP2 702*b* measures the characteristics of the signal received (e.g., voltage, current, and/or duration of the signal). DSP2 702*b* compares the signal received with a predetermined value or range. For example, only when the signal received from the pressure sensor has an electric current that is greater than 0.05 amps and duration of time that is longer than 2 seconds, would the signal considered to be a valid input from the user who presses on the pressure sensor. Then the DSP2 702*b* may send a preset message to the microprocessor to move the display item or adjust lighting effects in response to the signal that is determined to be a valid input.

Additionally or alternatively, the DSP2 702*b* receives a first digital signal and a second digital signal from two sensors and compares the first digital signal with the second digital signal to determine which one is a stronger signal. Depending on different types of sensors and/or different ways of comparison, a stronger signal may be one of the signals indicating more pressure or weight measured by pressure sensors, or one of the signals indicating higher intensity of illumination measured by light sensors, or one of the signals indicating a quicker response or shorter lag time of the response different users. In one embodiment, the DSP2 702*b* transmits the stronger signal to the microcontroller to execute the operation corresponding to the stronger signal. For example, two users may pull on two ropes that each is connected to a pressure sensor (or the users may press on the pressure sensors directly), to participate in an exhibition of two teams playing tug of war. The sensing signals generated by the two pressure sensors are received and processed by DSP2 702*b*, which compares the electric current or voltage related to the sensing signals of the two sensors. The signal that has higher electric current or voltage is determined to be stronger, indicating that the corresponding user applies more strength and is considered to win the tug of war. DSP2 702*b* transmits the stronger signal to the microcontroller, which then generates control commands to control the motion module of the display system to move the rope in the exhibited to the side of the winner. Additionally or alternatively, the microcontroller, based on the stronger signal received from DSP2 702*b*, may control the display module and/or audio module to change the image on the display panel and/or broadcast the result of tug of war.

In at least one embodiment, DSP2 702*b* can simultaneously process signals from a plurality of external sensors, under the control of the sensing controller, using various settings such as one or more settings for signal comparison, one or more settings for amplification, one or more settings for accepting and or processing superimpose messages, noise reduction, etc. In at least one embodiment, one or more DSPs can process signals received from multiple sensors and transmit the signals to the same microcontroller. The microcontroller, based on the signals received from the DSPs, generates and outputs control instructions to control the modules of the display system. In at least one embodiment, the superimposed messages may include a video feed from a camera that films a background image, such as the skyline of a city as viewed through a tall window in from of a balcony, and another video feed from a camera filming the person standing before the show case. The two messages may be superimposed to create a composite image in which the person appears to be standing before a balcony with a tall window, with the skyline in the window. In another example one message may be an audio feed from a concert hall and the second message may be the audio feed from a microphone for a person before the transparent showcase. The two messages may be superimposed so as to convey the impression of that the person is singing and/or talking before a large audience. The two messages/signals may also be from two pressure sensors pressed (and/or other sensors) from two players of a game, the DSP may perform compute a net effect of the two superimposed signals and generate a net signal from which an outcome of the interaction is determined, which may represent the outcome of two opposing forces in a tug-of-war game, for example.

For example, two image sensors are installed facing two participants, respectively, and the image sensors collect image data of the movements and/or gestures of the two participants and transmit the image data to DSP2 702*b* of the microcontroller. The DSP2 702*b* processes the image data using logical operations, and then compares the two groups of signals corresponding to the two participants. The microcontroller, based on the results of the comparison, generates control instructions and sends the control instructions to various modules of the display system for controlling the exhibition in response to of the movement of the participants. For example, two participants facing two cameras participate in a simulated table tennis game. The display item may be a moving (and flying) table tennis ball, and the display panels show images of the participants taken by the cameras. The cameras transmit the image data (e.g., direction of movements, speed, reaction time, etc.) of the participants to DSP2 702*b*, which processes the signals and calculates the direction and speed of the table tennis ball in response to each hit by the participant. The microcontroller generates control instructions based on the results of the calculation and controls the motion module to move the displayed table tennis ball and/or to change the images of the participants on the display panels.

In at least one embodiment, the DSPs of the control circuit include various types of open loop controllers and/or closed loop controllers for processing digital signals received directly from various sensors or digital data that are converted from analog signals. In at least one embodiment, DSPs use logical operations to process signals received.

DSP2 702c, in one embodiment, directly process the digital signals received from the sensors. For example, an inclination sensor may send inclination data of a display item in digital form, and inclination data is then directly transmitted, via the human-machine interface module 110 to DSP3 702c. In an embodiment, the inclination sensor senses the inclination of the lighting equipment and/or of the moving items (e.g., when a model of a wine bottle is inclined to pour wine into wine glass) in the display, and DSP3 702c determines whether by how much to adjust the inclination, if at all. Additionally or alternatively, the inclination sensor senses the inclination of the parts of the users interacting with the display system 100, and DSP3 702c determines what to display based on the inclination data. The inclination sensor may be used to measure user input and/or used to measure how far the display object is moved, such as the bottle of the bottle of wine being poured onto a glass and/or other tilted items. The inclination sensor here can be used to measure the degree of inclination of a lever that the user pulls to interact with display system 100 instead of or in addition to display system 100 being capable of detecting how hard and whether or not a button is pressed. DSP1 702a, DSP2 702b, and DSP3 702c are examples of different types of DSPs that may be used in the control device 102. Additionally or alternatively, the control device 102 may include other types of DSPs.

Digital data processor 704 includes one or more processors that perform operations on digital data. Operations used by the digital data processor 704 may include, but are not limited to, sensor array processing, audio signal processing, audio compression, digital image processing, video compression, speech processing, speech recognition, digital communications, and statistical signal processing. In at least one embodiment, the digital data processor 704 includes software that is run by the microprocessor of a microcontroller and the algorithms and instructions of the digital data processor 704 may be stored in the memory of the microcontroller.

Analog logic processor 706 includes one or more processors for processing analog signals. In at least one embodiment, the analog logic processor 706 includes one or more independent electronic devices. Additionally or alternatively, the analog logic processor 706 includes software that is run by the microprocessor of a microcontroller and the algorithms and instructions of the analog logic processor 706 may be stored in the memory of the microcontroller. In at least one embodiment, the analog logic processor 706 converts analog signals to digital signals.

Digital data processor 707 may be similar to the digital data processor 704. Analog logic processor 708 may be similar to the digital data processor 706. In another word, DSP2 may be just another instance of DSP1 (in other words, the components of DSP1 and DSP2 may be the same). In an embodiment, DDP 707 may be different from DDP 704 in that one can have a faster processor speed, one can be tailored with more cache memory (for example, a DDP—such as DDP 704 or 707—that is built for video processing has more memory and a faster processing speed than one built for other purposes), etc. DSP2 may be different from DSP1, in that the DDP within each DSPs are different. DSP2 can be different from DSP1. For example, DSP2 may include a sensor controller that is not in DSP1.

Sensing controller 709 is a device, which when activated controls the receiving and processing of sensing signals from various sensors. In at least one embodiment, the sensing controller 709 can read signals from an external sensor continuously or periodically with data sampling. For example, sensing controller 709 may read data ten times per second, once every two seconds, once every ten seconds, once every minute, etc. Alternatively, sensing controller 709 can read data irregularly and/or randomly. In at least one embodiment, the sensing controller 709 receives sensing signals from multiple sensors and compares the sensing signals. Additionally or alternatively, the sensing controller 709 receives sensing signals from various types of sensors and coordinates the processing of signals using different logical operations and/or in different microcontrollers.

Referring to FIG. 7, DSP1 (702a) includes DDP 704 and DSP2 (702b) may include DSP707, which may be the same or similar to one another. Multiple DSPs are present, so that the different DSPs can be configured differently. Some sensors may input an analog signal that is directly processed by analog logic processor 706, and then analog logic processor 706 may convert the analog signal to a digital signal. The digital signal may then be fed to digital data processor 704 to process. DSP2, is also communicatively coupled to sensing controller 709. Some sensors or combination of sensors may work in concert, and sensing controller 709 may pre-process signals from some sensor before passing the signal the next component within DSP2 702b. Sensing controller 709 may optionally perform operates on the signals from the human-machine interface module 110. Signals coming out of the sensing controller 709 may be processed by analog logic processor 708 and/or digital data processor 707.

Camera 712 is an optical device that records images that can be stored directly and/or transmitted to the control device via the human-machine interface module 110. In at least one embodiment, camera 712 may take still photographs or moving images such as videos or movies.

Infrared camera 714, also called thermographic camera or thermal imaging camera, is a device that forms an image using infrared radiation (while camera 712 forms an image using visible light). In one embodiment, the infrared camera 714 operates in wavelengths as long as 14,000 nm (14 μm). In an embodiment, infrared camera 714 may detect the presence of users in certain vicinity, the motion of the user, and/or the activity of the user, so that display system 100 responds in an appropriate manner.

Infrared camera 714 may detect body heat generated by a user's movement and/or the heat of an above room temperature items, such as hot coffee or a hat just taken off from a visitor. Infrared camera may detect a below room temperature object, such as icecream in the hands of a user. Display system 100 may include a game in which by using infrared camera 714 to detect an above room temperature object, and a user can enter into a room and drop his hat into a group of hats. Then display system 100 may, based on the signal from the infrared camera 714 (as a temperature sensor and feedback sensor) control an arm to pick-up the hat.

Pressure sensor 716 is a device that measures pressure, when a user presses on the pressure sensor, for example. In one embodiment, the pressure sensor 716 acts as a transducer and generates an electrical signal as a function of the pressure imposed, such as the pressure applied on a button by user.

Inclination sensor 718, also called tilt sensor, is a device for detecting the orientation or inclination of an object, such as the lighting mechanisms, and/or items being displayed in display system 100 or such as a model of wine bottle that is inclined to pour wine into wine glass.

Sound sensor 719 is a device for detecting audio signals. In one embodiment, the sound sensor may include a microphone or a mini microphone, via which a user may issue voice commands and/or the system may respond to the user's voice commands while the user is playing a game on display system 100. Sound sensor 719 may be used for detecting voice activated commands. One of the DSPs may be equipped with a language recognition sub-system and/or processor, with the necessary language processor and memory storage for storing language phrases. Once the voice/language command is captured by the microphone, the signal generated by the microphone may be sent to the DSP that handles language recognition, and the voice command may be analyzed. The analyzed command may then be converted to command signal. Additionally, or alternatively, sound sensor 719 may be include a sound mixing processor and/or implement a sound mixing process. Using the sound mixing process and/or processor, a user may singing a song and the transparent show case may display an opera house where an orchestra is playing. The sounds detected (such as the user singing) may be picked up by the microphone can be played on the speakers of the display system 100.

Microprocessor 724 may be an embodiment of the micro processor 624 that was discussed in conjunction with FIG. 6. In at least one embodiment, the microprocessor 724 receives digital signals from one or more DSP modules. In at least one embodiment, the microprocessor 724 is an Intel i3 processor. In at least one embodiment, the microprocessor is in a microcontroller that is connected to the DSPs.

Memory 726 is an embodiment of the memory 626 as discussed in conjunction with FIG. 6. In at least one embodiment, the memory 726 stores a control program and logical operations that, when implemented by the microcontroller, control the computations and/or comparisons of the received signals. In an embodiment, the memory 726 includes software instructions that may be executed by the microprocessor 724 and/or the DSP modules of the microcontroller.

Figure 8A:
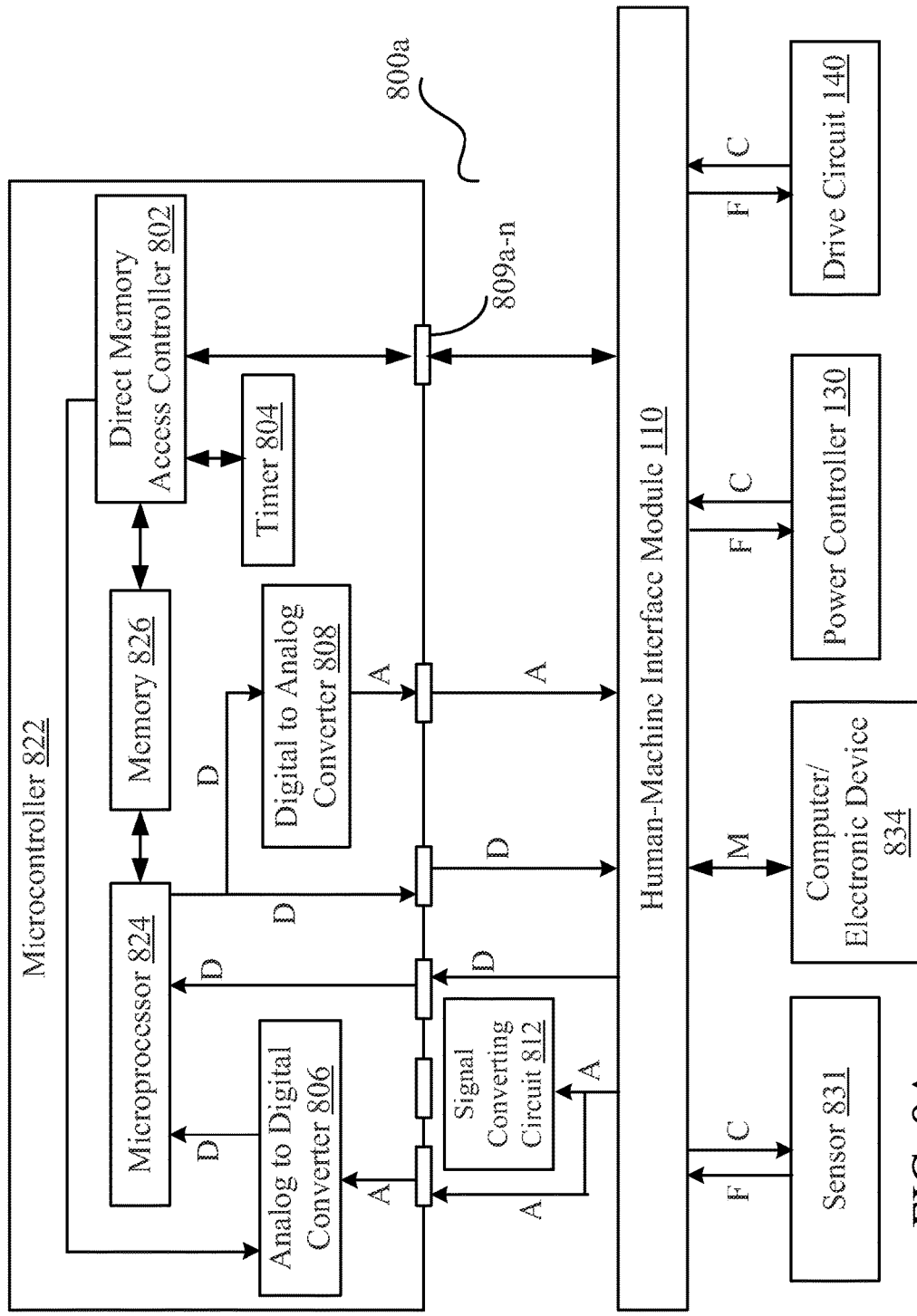
FIG. 8A shows a block diagram of an example of signal processing circuits in the control device of FIG. 6.

FIG. 8A shows a block diagram of an example 800*a* of signal processing circuits in the control device of FIG. 6. FIG. 8A includes at least human-machine interface module 110, power controller 130, and drive circuit 140, which were discussed in conjunction with FIG. 1. FIG. 8A further includes at least a direct memory access controller 802, a timer 804, an analog to digital converter 806, a digital to analog converter 808, ports 809*a-n*, a signal conversion circuit 812, a microcontroller 822, a microprocessor 824, a memory 826, a sensing/measuring device 831, and a computer/electronic device 834. FIG. 8A also include signals A, D, C, F, and M. In other embodiments, FIG. 8A configuration may not have all of the elements or features listed and/or may have other elements or features instead of, or in addition to, those listed.

FIG. 8A shows that microcontroller receives and transmits digital and/or analog signals, via the human-machine interface module 110. FIG. 8A also demonstrates that the microcontroller could process both digital and analog signals. A plurality of signals indicating the communication between different components of the display system 100 are shown in FIG. 8A. Signals "A" represent analog signals. Signals "D" represent digital signals. Signals "C" represents control instructions signals. Signals "F" represent feedback signals. Signals "M" represent communications signals. In at least one embodiment, the microcontroller of FIG. 8A includes at least a microprocessor, a memory, a direct memory access controller, an analog to digital converter, a digital to analog converter, a timer, and multiple ports for communicating with the human-machine interface module 110. In an embodiment, the microcontroller may include other control devices such as USB controller (e.g., to interface with USB devices) and/or serial advanced technology attachment (SATA) controller (e.g., to interface with a hard disk or solid state drives).

Direct memory access (DMA) controller 802 is a device, which when activated accesses the memory of the control system independently of the microprocessor. In one embodiment, DMA controller 802 can generate memory addresses and initiate memory read or write cycles. In one embodiment, the DMA controller 802 directly records and/or retrieves information (e.g., sensing information/and/or time information read form the sensor and/or clock, respectively) in the memory without having to slow down or interrupt the operation of the microprocessor.

Timer 804 may be an electronic timer including digital electronics. Alternatively, timer 804 may be a software timer that exists only in lines of code. In an embodiment, the software timer relies on the accuracy of a clock oscillator usually built into a hardware device that runs the software. In at least one embodiment, the timer 804 provides time information to the direct memory access controller for recording the information to the memory of the microcontroller. In at least one embodiment, the time information is used by the microcontroller to coordinate the operation of the modules of the display system to achieve a synchronized exhibition. The sensors sense the position of the various elements of the display system 100 and the time, and the position and time are recorded, which are later analyzed to determine whether to adjust the motion of the items in display system 100, the images on the display, and/or the audio sound being broadcast.

Analog to digital converter (ADC) 806 is a device that converts a continuous physical quantity (e.g., voltage) to a digital number that represents the quantity's amplitude. In an embodiment, ADC 806 performs the conversions periodically to create a sequence of digital values that have been converted from a continuous-time and continuous-amplitude analog signal (A) to a discrete-time and discrete-amplitude digital signal (D).

Digital to analog converter (DAC) 808 is a device that converts digital data (e.g., binary) into an analog signal (e.g., current, voltage, or electric charge). In one embodiment, DAC 808 converts finite-precision time series data to a continually varying physical signal. In one embodiment, DAC 808 is used to convert digital signals (D) to analog signals (A) to drive an audio amplifier in order to produce sound (e.g., analog air pressure waves) from data in a sound file.

Ports 809*a-n* include a number of ports for transferring data between the circuits of the microcontroller and the human-machine interface module. In at least one embodiment, different microcontrollers have different numbers of ports. In one embodiment of the microcontroller not having a large enough number of ports as needed, multiplexers can be mounted to the digital and/or analog data buses for multiplexing the number of channels for transmitting data between the microcontroller and external data buses. In an embodiment, the control system may use at least one multiplexer that selects one of several analog or digital input signals and forwards the selected input into a single line. In an embodiment, a multiplexer of $2^n$ inputs has n select lines, which are used to select which input line to send to the output. In an embodiment, multiplexers of the control device 102 are used to increase the amount of data that can be sent over the network within a certain amount of time and thereby increasing the effective bandwidth. It should be appreciated that one or more multiplexers may be included as part of the data buses. In one embodiment of a multiplexer being used in an analog data bus, it should be appreciated that the digital signal for controlling the multiplexer is included as part of the data bus. In an embodiment, the ports 809a-n and multiplexers allow multiple auxiliary control devices to connect to the control device.

Signal conversion circuit 812 is a circuit, which when activated measures and/or converts the sensing signals to another form. In one embodiment, the signal conversion circuit 812 converts analog signals to digital signals.

Microcontroller 822 may be an embodiment of the microcontroller 622 as discussed in conjunction with FIG. 6. In one embodiment, the microcontroller 822 is a STM32F407 single chip microcomputer. In at least one embodiment, the microcontroller 822 includes an analog to digital converter and a digital to analog converter, and therefore can process both digital signals and analog signals received from multiple modules of the display system. Additionally or alternatively, the microcontroller 822 can transmits both digital and analog information to multiple modules. In at least one embodiment, multiple devices are connected to the microcontroller 822 using electrical cords and/or cables, which have electrical characteristics (e.g. voltage, current, electrical impedance, etc.) that meet the requirements of the corresponding ports 809a-n.

In at least one embodiment, the microcontroller 822 communicates with the modules of display system 100 using digital signals, via at least a digital data bus, and analog signals, via at least an analog data bus, in order to meet different needs of signal transmission and exhibition requirements. Alternatively, each module of the display system may be connected via either digital or analog data bus when in use.

Microprocessor 824 is an embodiment of the microprocessors 624 and 724, which were discussed in conjunction with FIGS. 6 and 7, respectively. In one embodiment, the input and output of the microprocessor 824 are digital signals.

Memory 826 is an embodiment of the memories 626 and 726, which were discussed in conjunction with FIGS. 6 and 7, respectively. In one embodiment, the memory 826 can be visited by the direct memory access controller 802 independently of the microprocessor 824.

Sensor 831 is an embodiment of the sensor system 150, as discussed in conjunction with FIG. 1. In one embodiment, the sensor 831 receives control instructions from the microcontroller 822, via the human-machine interface module 110, and detects the operation status of the display system (e.g., speed, brightness, open or close of doors, etc.). In an embodiment, the sensor 831 feeds back the sensing signals to a closed loop system of the microcontroller 822 to achieve more accurate control of display.

Computer/electronic device 834 may include at least a computer and/or other devices that communicate with the microcontroller 822 via the human-machine interface module 110. In one embodiment, the computer/electronic device 834 includes a built-in computer in the control device. Additionally or alternatively, the computer/electronic device 834 includes an external computer or device that transmits communication signals to interact with the display system 100.

In an embodiment, the power controller 130 and/or drive circuit 140 sends control instructions (C) via human-machine interface module 110 to the lighting modules and/or motion modules. In an embodiment, feedback instructions (F) are sent from the sensor 831 and/or the microcontroller 822 to the power controller 130 and/or drive circuit 140 for adjusting the movement of items and/or the illumination. The sensor 831 may receive control instructions (C) from the microcontroller to take measurements. The sensor 831 may transmit digital signals (D) to the microprocessor 824 via one of the ports 809a-n. The sensor 831 may transmit analog signals (A), via another one of the ports 809a-n, to the analog to digital converter 806 of the microcontroller 822, which converts the analog signals (A) to digital signals (D) and then send the digital signals (D) to the microprocessor 824. The sensor 831 may transmit analog signals (A), via the human-machine interface module 110, to a signal converting circuit 812, which converts the analog signals (A) to digital signals (D) and transmit to the microcontroller 822. The microprocessor 824 may generate control instructions based on the digital signals (D) received, and send digital signals (D) that may include control commands to the human-machine interface module 110 and further to the sensor 831, power controller 130, and/or drive circuit 140. The digital signals (D) sent by the microprocessor 824 may also be converted by the digital to analog converter 808 to analog signals (A), and the analog signals (A) are transmitted to the human-machine interface module 110. The computer/electronic device 834 my communicate with the microcontroller 822 via the human-machine interface module 110 via communication signal (M).

Figure 8B:
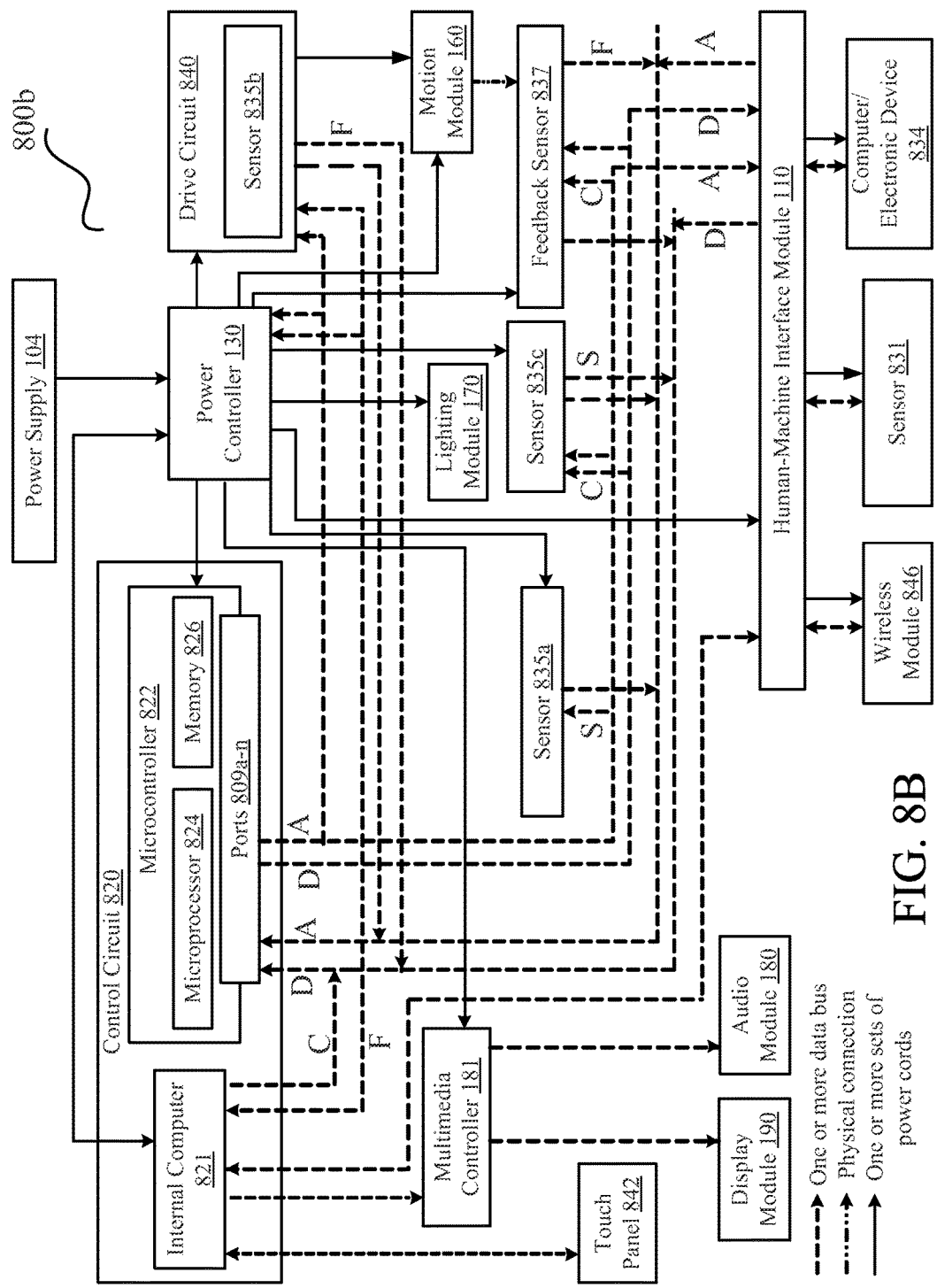
FIG. 8B shows a block diagram of an example of the signal processing system for controlling the display system of FIG. 6.

FIG. 8B shows a block diagram of an example 800b of the signal processing system for controlling the display system 600 of FIG. 6. Display system 800b includes at least power supply 104, human-machine interface module 110, power controller 130, motion module 160, lighting module 170, audio module 180, multimedia controller 181, and display module 190, which were discussed in conjunction with FIG. 1. Display system 800b also includes microcontroller 822, memory 826, ports 809a-n, sensor 831, and computer/electronic device 834, which were discussed in conjunction with FIG. 8A. Display system 800b further includes at least a control circuit 820, an internal computer 821, a sensing/measuring device 835a, a drive circuit 840 that includes a sensor 835b, a sensor 835c, a feedback sensor 837, a touch panel 842, and a wireless module 846. FIG. 8B also include signals A, D, C, and F, representing analog signals, digital signals, control signals, and feedback signals, respectively as discussed in conjunction with FIG. 8A. FIG. 8B also include signals "S" representing sensing signals. In other embodiments, the system of FIG. 8B configuration may not have all of the elements or features listed and/or may have other elements or features instead of, or in addition to, those listed.

FIG. 8B shows communication signals transmitted between the microcontroller 822 and various modules of the display system 100. In at least one embodiment, the control circuit 820 includes an internal computer 821 that receives signals from and transmits signals to the power controller 130, drive circuit 840, the multimedia controller 181, a touch screen 842, and the human-machine interface module 110. The internal computer 821 may send digital control signals (C) to the microcontroller 822 to control the operation of the display system 100. The multimedia controller 181 sends signals to the display module 190 and audio module 180 to control the play of multimedia content and audio media. The microcontroller 822 of the control circuit 820 may receive digital signals (D) and/or analog signals (A) from various sensors (e.g., 835a, 835b, 835c) and feedback sensors 837. The microcontroller 822 of the control circuit 820 may also receive digital signal (D) and/or analog signals (A), via the human-machine interface module 110, from wireless modules 846, sensors 831, computers and/or other electronic devices 834. The microcontroller 822 of the control circuit 820, based on signals received, may send digital signals (D) and/or analog signals (A) to the power controller 130 and/or drive circuit 840 to control the operation of the display system 100. The microcontroller 822 of the control circuit 820 may also send digital signals (D) and/or analog signals (A) that includes control instructions (C) to the sensors (e.g., 835c, 837) to control the measuring functions of the sensors. The microcontroller 822 may send digital (D) and/or analog signals (A), via the human-machine interface 110, to the wireless modules 846, sensors 831, computers and/or other electronic devices 834. The sensors (e.g., 835a, 835c) send sensing signals (S) in digital and/or analog form to the microcontroller 822 to control the operation of the display system 100. The feedback sensors 837 may send sensing feedback signals (F) to the microcontroller 822 and/or the internal computer 821 as input of closed loop systems to control the display system 100. The power supply 104 and the power controller 130 provides electrical power to the microcontroller 822, the internal computer 821, the multimedia controller 181, the sensors (e.g., 831, 835a, 835b, 835c) and feedback sensors 837, the human-machine interface module 110, the drive circuit 840, the lighting module 170, and the motion module 160. In FIG. 8B, communication connections and power cords are separately illustrated using different types of lines. FIG. 8B illustrates an example of control logic in closed loop control systems to control the display system 100 using microcontrollers. The lines in FIG. 8B may represent a logical relationship and may not require physical connections.

Control circuit 820 is an embodiment of the control circuits 120, 220, and 620, which were discussed in conjunction with FIGS. 1, 2, and 6, respectively. In at least one embodiment, the control circuit 820 controls digital devices, analog devices, and/or a combination of both. In at least one embodiment, the control circuit includes the microcontroller 822 and at least an internal computer 821.

Internal computer 821 is a built-in computer installed in the control circuit 820. In at least one embodiment, the microcontroller 822 first communicates with the internal computer 821 in order to implement control instructions. The internal computer 821 may communicate with one or more microcontrollers via digital data transmission. The data transmission mode may be serial communications, parallel communications, baseband communications (e.g., baseband signals are transmitted without modulation), and/or passband communications (e.g., digital modulation methods are employed and only a limited frequency range is used in some bandpass filtered channel), etc. In one embodiment, a serial communication mode is selected for transmitting data between the internal computer 821 and one or more microcontroller 822.

In at least one embodiment, the internal computer 821 is considered as a master controller, and the microcontrollers are considered as slave controllers. In at least one embodiment, the internal computer 821 includes software that controls the operation of the internal computer and transmission of instructions and/or data to at least one microcontroller. In at least one embodiment, each of the microcontrollers controls the operations of a different module and/or device of the display system 100. In at least one embodiment, the microcontrollers process data received according to programs in the microcontrollers and/or control instructions received at the microcontroller. In at least one embodiment, the microcontrollers receive feedback information from the sensors and further transmit to the internal computer 821. In at least one embodiment, the software of the internal computer 821 processes the feedback information and sends control instructions to at least one microcontroller to control the operation of the corresponding module (e.g., select multimedia for display, adjust display effects, change the speed of display items, change the lighting effects, etc.).

Drive circuit 840 is an embodiment of the drive circuit 140 as discussed in conjunction with FIG. 1. In one embodiment, the drive circuit 840 includes sensors for measuring the operation status of the drive circuit and/or the motion module.

Sensors 835a, and 835c may include the sensors and/or devices discussed in conjunction with the sensor system 150 of FIG. 1. In one embodiment, the sensor 835a may transmit only analog signals to the microcontroller 822 and/or other devices, and receives analog signal instructions. In one embodiment, the sensor 835c may communicate with the microcontroller 822 and other modules using both digital and analog signals.

Sensor 835b may include the sensors and/or devices discussed in conjunction with the sensor system 150 of FIG. 1. In one embodiment, the sensor 835b of the drive circuit 840 measures, for example, the voltage and/or current of the circuits in the drive circuit 840, and/or the operation of the motors driven by the drive circuit 840. In at least one embodiment, the sensor 835b feeds back the sensing information to the microcontroller 822 or the internal computer 821 as a feedback input of a closed loop system to achieve a more accurate control of the drive circuit 840.

Feedback sensor 837 may include a speed sensor or a light sensor that are physically installed in or connected to the components of the motion module 160 for measuring the speed that a light fixture (and/or other component, such as a turntable) changes positions/configurations or the brightness of light. For example, feedback sensor 837 may feedback actual speed information for the control system to adjust the speed of a turntable or other motion component. In another example, feedback sensor 837 may be a light sensor installed on the turntable and feedback actual brightness data for the control system to adjust the intensity of the spotlight that illuminates the display item on the turntable. The feedback sensors will be discussed in further detail in conjunction with FIGS. 8C-8E.

Touch panel 842 may be a stand-alone touch screen or a touch screen on the display panels 194, which were discussed in conjunction with FIG. 5. In one embodiment, the touch panel 842 communicates with the internal computer 821 for transmitting signals when the user operates on the touch panel 842.

Wireless module 846 includes wireless communication modes for communicating with the human-machine interface module 110. In one embodiment, the human-machine interface module 110 may be connected via power cords to and therefore charge the wireless module 846, sensor 831, and/or computer or other electronic devices.

Signal "S" represents sensing signals. In one embodiment, sensing signal "S" may include digital and/or analog signals. The types of sensors and examples of sensing signals were discussed in conjunction with sensor system 150 of FIG. 1.

Figure 8C:
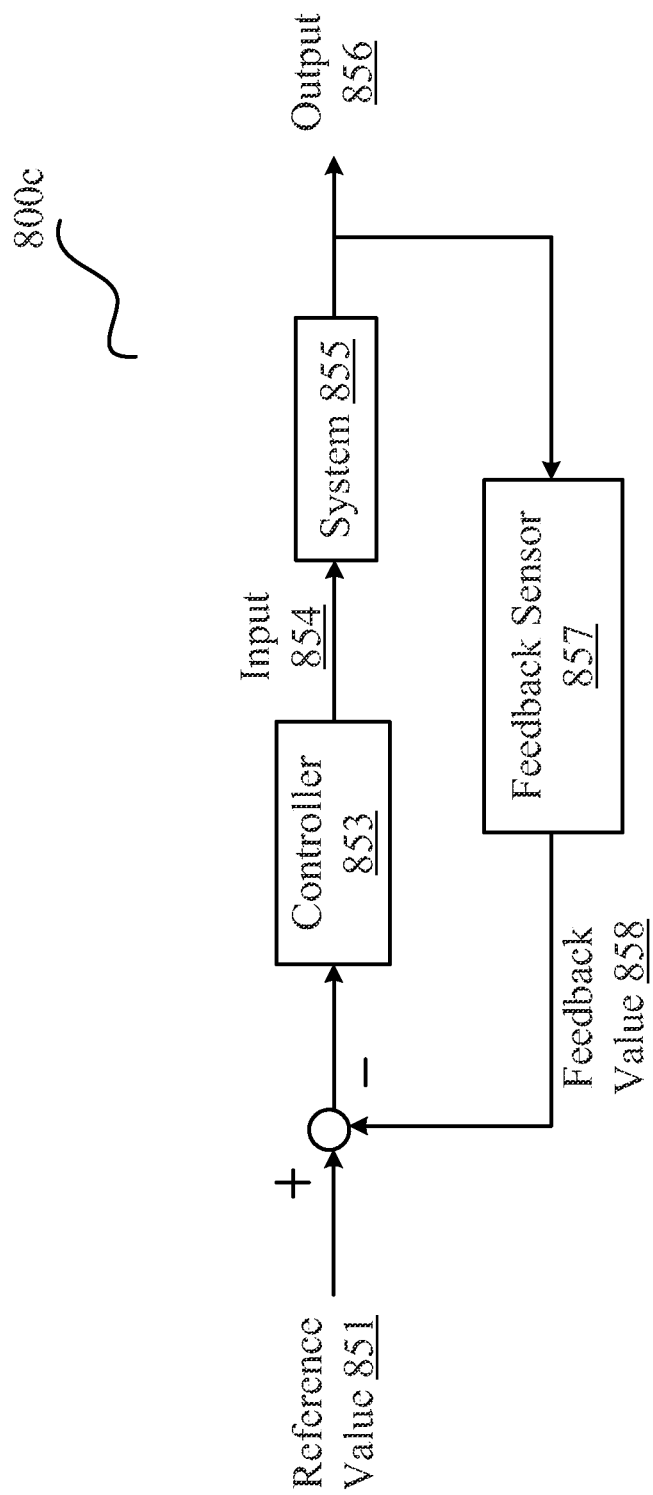
FIG. 8C shows a block diagram of an embodiment of a closed loop control system that may be used to control the display system.

FIG. 8C shows a block diagram of an embodiment 800c of a closed loop control system that may be used to control the display system. FIG. 8C shows a reference value 851, a controller 853, an input 854, a system 855, an output 856, a feedback sensor 857, and a feedback value 858. In other embodiments, the system of FIG. 8C may not have all of the elements or features listed and/or may have other elements or features instead of, or in addition to, those listed.

FIG. 8C shows a closed loop control system 800c for controlling the operation of the display system 100. In at least one embodiment, the display system includes multiple closed loop systems under the control of one or more microcontrollers. In at least one embodiment, a microcontroller may control a single or multiple closed loop systems. In at least one embodiment, the closed loop system 800c includes a controller that controls the operation of a system, and at least a feedback device (e.g., a feedback sensor).

Reference value 851 may be a value that is preset by a program in the controller of the system. Alternatively, the reference value 851 may be received from another device (e.g., an internal computer, a touch screen, a remote controller, or a mobile device). Alternatively, the reference value 851 may be generated by the controller after processing other data (e.g., sensing data, or instructions received from another microcontroller). In at least one embodiment, the reference value 851 represents an ideal value that the system should operate as desired and/or instructed, which may be a parameter that an operator of display system 100 may set, may be a parameter that is determined automatically by measuring several samples of a value overtime, and/or may be a parameter that is set at the time display system 100 is manufactured and/or configured.

Controller 853 is an embodiment of the microcontroller 822 as discussed in FIG. 8A. In at least one embodiment, the controller 853 receives an instruction with a reference value and controls the operation of the system. In at least one embodiment, the actual value of the operation of the system is frequently different from the reference value due to the accuracy of controllers, power lost as heat in wires, wear and tear of components, interactions between different components, and other reasons. Therefore, a feedback sensor may be installed in the system for detecting and feeding back the actual value/output of the operation, and the actual output is used as an input to the controller 853 for adjusting the operation. In at least one embodiment, the controller 853 adjusts the operation of the system based on the difference between the reference value and the feedback data received from the feedback sensor. In at least one embodiment, the controller 853 compares feedback data (e.g., actual speed, actual brightness, etc.) with the reference value and calculates an error (e.g., the difference between the actual value and reference value). As alluded to above, the actual value may be a weighted sum of the current actual value, the sum or integral of the actual value over time, and/or the derivative of the actual value. So for example, if the actual value is currently at the reference value and has been at the reference value over the entire period of time that the actual value is being integrated over, the integral of the actual value will be the reference value times the period of time of the integration, and the derivative of the actual value will be zero. In one embodiment, the error is calculated by subtracting the reference value from the actual value. In one embodiment, based on the calculated error the controller 853 computes, using mathematical equations and/or logical operations, a desired value (e.g., voltage, current, frequencies, etc.) that needs to be adjusted. For example, the change of the voltage (or current) supplied to the motor is proportional to the calculated error. In another example, logical operations are used to calculate the value to adjust the voltage or current supplied to the motor. Then the controller 853 generates and outputs control instructions to the modules of the system (e.g., power controller 130, drive circuit 140, etc.), which execute the control instructions to adjust the operation of the system.

For example, the controller 853 controls one or more motors to drive a turntable, and the reference value is a rotational speed of 50 revolutions per minute. The actual speed that is fed back to the controller 853 from the feedback sensor is 48 revolutions per minute. The controller 853 calculates the error (e.g., a minus 2 revolutions per minute) and uses equations and/or logical operations to calculate a value to adjust the current of the motor (e.g., an increase of X amperes). The controller 853 generates control commands to sent to the drive circuit 140 to increase the current supplied to the motor by X amperes to speed up to 50 revolutions per minute. In at least one embodiment, the display system includes one or more microcontrollers in one or more closed loop systems to adjust the operations of the modules of display system.

Input 854 includes input data and/or control commands to control the system. In one embodiment, input 854 includes the value to adjust the voltage or current in the system based on feedback data.

System 855 may be a system or a module that is controlled by the controller 853 in a closed loop system. In one embodiment, system 855 may be the display system 100. Alternatively, system 855 may be at least a module of the display system 100 (e.g., the motion module 160, or the light module 170).

Output 856 includes output data of the operation of the system 855. In one embodiment, output 856 includes an actual value of the operation of the system 855, which may be different from the reference value 851, and the output 856 is changed under the control of the closed loop system to eventually achieve the reference value.

Feedback sensor 857 may be any type of sensors as described in conjunction with the sensor system 150 of FIG. 1. In at least one embodiment, the feedback sensor 857 detects and feeds back the actual value of the status of the operation, which is used by the microcontroller to adjust the display module.

Feedback value 858 is a value that is fed back by the feedback sensor 857 to the controller 853. In one embodiment, the feedback value is the actual value of the operation (e.g., actual speed, actual brightness). Additionally or alternatively, the feedback value includes other data. In an embodiment, feedback value 858 may be a PID signal.

Figure 8D:
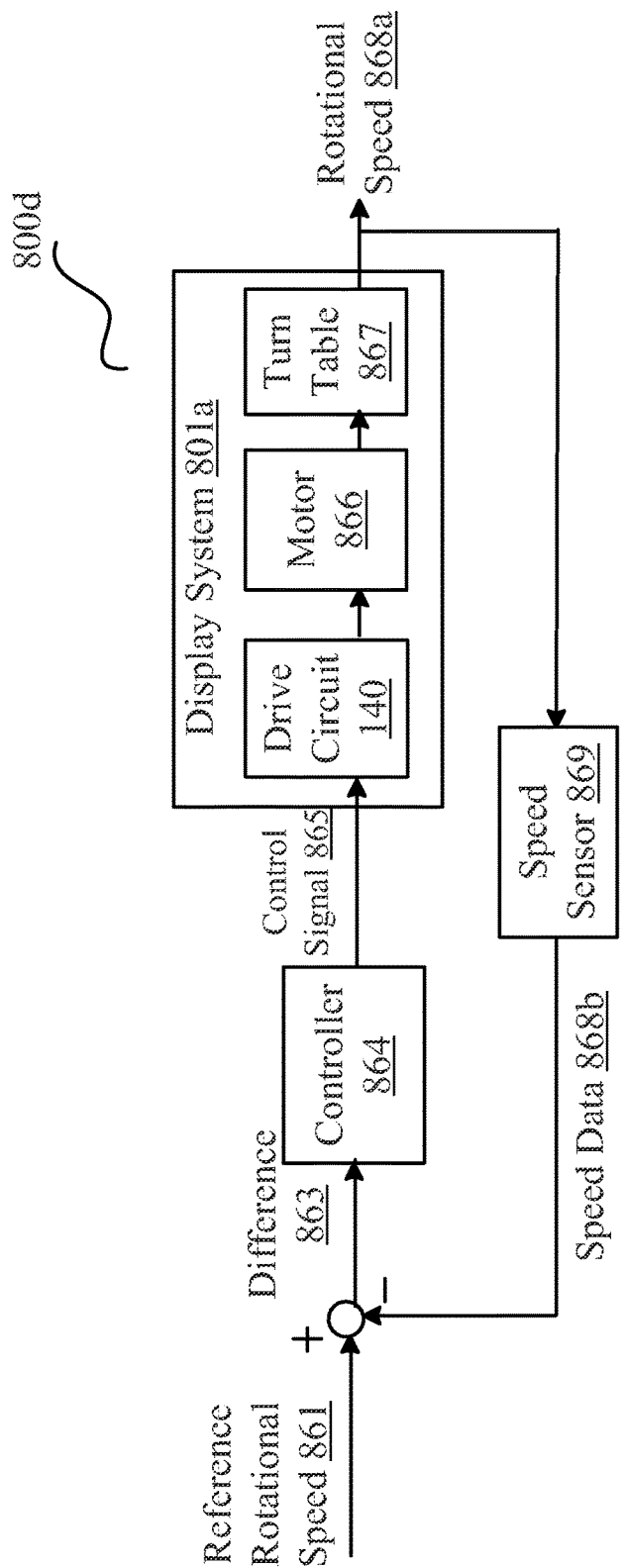
FIG. 8D shows a block diagram of an example of a closed loop control system that may be used to control the rotational speed of a turntable.

FIG. 8D shows a block diagram of an example 800d of a closed loop control system that may be used to control rotational speed of a turntable. FIG. 8D includes at least a display system 809, drive circuit 140, a reference rotational speed 861, an error 863, a controller 864, a control signal 865, a motor 866, a turntable 867, a rotational speed 868a, actual speed 868b, and a speed sensor 869. In other embodiments, the system of FIG. 8D may not have all of the elements or features listed and/or may have other elements or features instead of, or in addition to, those listed.

FIG. 8D shows that a speed sensor is used as a feedback sensor for sensing and providing actual speed data to the microcontroller of the display system for adjusting the rotational speed of a turntable. Display system 801a is an embodiment of the display system 100 as discussed in conjunction with FIG. 1.

Reference rotational speed 861 is a reference value indicating that the turntable is desired to rotate at the reference rotational speed 861. Error 863 is the difference between the actual rotational speed and the reference rotational speed 861.

Controller 864 is an embodiment of the controller 853 as described in FIG. 8C. In at least one embodiment, the controller 864 receives or is preset with reference rotational speed 861 and controls the rotation of a turntable of the display system 801*a*. In an embodiment, the controller 864 receives the actual rotational speed of the turntable detected by the speed sensor, and the controller 864 calculates the error 863 and computes a value for adjusting the power supplied to the motor. The controller 864 generates and outputs control instructions to the drive circuit 140 of the display system 801*a*, and the drive circuit 140 accordingly adjusts the speed of the motor that drives the turntable.

Control signal 865 includes control instructions generated by the controller 864 and is sent to the drive circuit 140, and drive circuit 140 executes the control instructions to change the power supplied to the motor 866 that drives the turntable 867.

Rotational speed 868*a* is the actual rotational speed of the turntable 867. Speed data 868*b* is the sensing data of the speed sensor that measures the rotational speed 868*a*. In one embodiment, the speed sensor 869 measures the rotational speed 868*a* and sends the speed data 868*b* to the controller 864 for processing. A similar circuit as that of FIG. 8D may be used to control the rate/speed at which the position of a light fixture is changed.

Figure 8E:
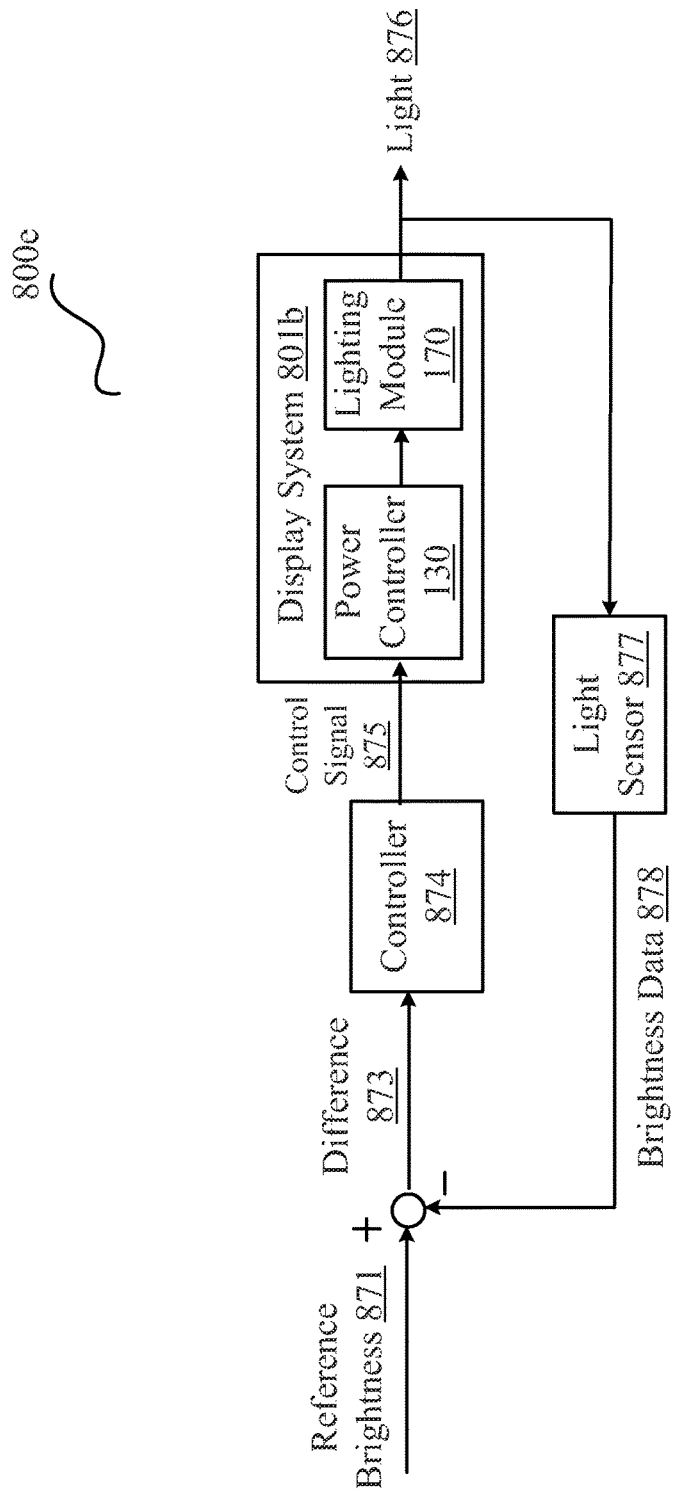
FIG. 8E shows a block diagram of an example of a closed loop control system that may be used to control lighting effects.

FIG. 8E shows a block diagram of an example 800*e* of a closed loop control system that may be used to control lighting effects. Example 800*e* of FIG. 8E shows at least a display system 801*b*, power controller 130, lighting module 170, a reference brightness 871, an error 873, a controller 874, a control signal 875, light 876, a brightness sensor 877, and brightness data 878. In other embodiments, example 800*e* of FIG. 8E may not have all of the elements or features listed and/or may have other elements or features instead of, or in addition to, those listed.

FIG. 8E shows that a light sensor is used as a feedback sensor for sensing and providing actual brightness data to the microcontroller of the display system for adjusting the lighting effects. Display system 801*b* is an embodiment of the display system 100 as discussed in conjunction with FIG. 1.

Reference brightness 871 is a reference value indicating what brightness of the light is desired to be. Error 873 is the difference between the actual brightness and the reference brightness 871.

Controller 874 is an embodiment of the controller 853 as discussed in FIG. 8C. In at least one embodiment, the controller 874 receives or is preset with a reference brightness 871 and controls the lighting effects of the lighting module 170 of the display system 801*b*. In an embodiment, the controller 874 receives the actual brightness data detected by the light sensor, and the controller 874 calculates the error 873 and computes a value for adjusting the power supply. The controller 874 generates and outputs control instructions to the power controller 130 of the display system 801*b*, and the power controller 130 accordingly adjusts the brightness the lights.

Control signal 875 includes control instructions generated by the controller 874 and is sent to the power controller 130, which executes the control instructions to change the power supplied to the lighting module 170.

Light 876 is the light generate by the lighting module 170 under the control of the controller 874. Light sensor 877 measures the intensity of light. In an embodiment, the light sensor 877 may be an ambient light sensor. In one embodiment, light sensor 877 measures the brightness of light 876 and feeds back brightness data 878 to the controller 874.

In FIGS. 8E and 8D, the rotational speed of the turntable and the brightness of the lighting module are controlled by two closed loop control systems 800*d* and 800*e*, respectively. In one embodiment, one microcontroller can control multiple closed loop control systems that may have logical relationships between one another. For example, the microcontroller controls a first closed loop system to lower the brightness of a spotlight that illuminates a first display item on a turntable within a display space, and then the microcontroller controls a second closed loop system to rotate the turntable to move the first display item into a concealed space and move a second display item into the display space. After the second display item is moved into the display space, the microcontroller controls the first closed loop system to raise the brightness of the spotlight to illuminate the second display item.

In at least one embodiment, the display system adapts to different environment and/or situations based on different feedback sensors that feedback actual data related to the environment. In at least one embodiment, because each feedback sensor may have inaccuracy and/or errors during sensing, the display system may include multiple feedback sensors to provide feedback data. The feedback data from multiple sensors may be combined (e.g., averaged and/or compared to one another) by the microcontroller, so that the microcontroller processes the combined sensing signals comprehensively so as to provide more accurate information to process a series of mathematical and/or logical operations. Combining more feedback sensors allows more accurate control of different modules and/or devices of the display system.

Figure 9A:
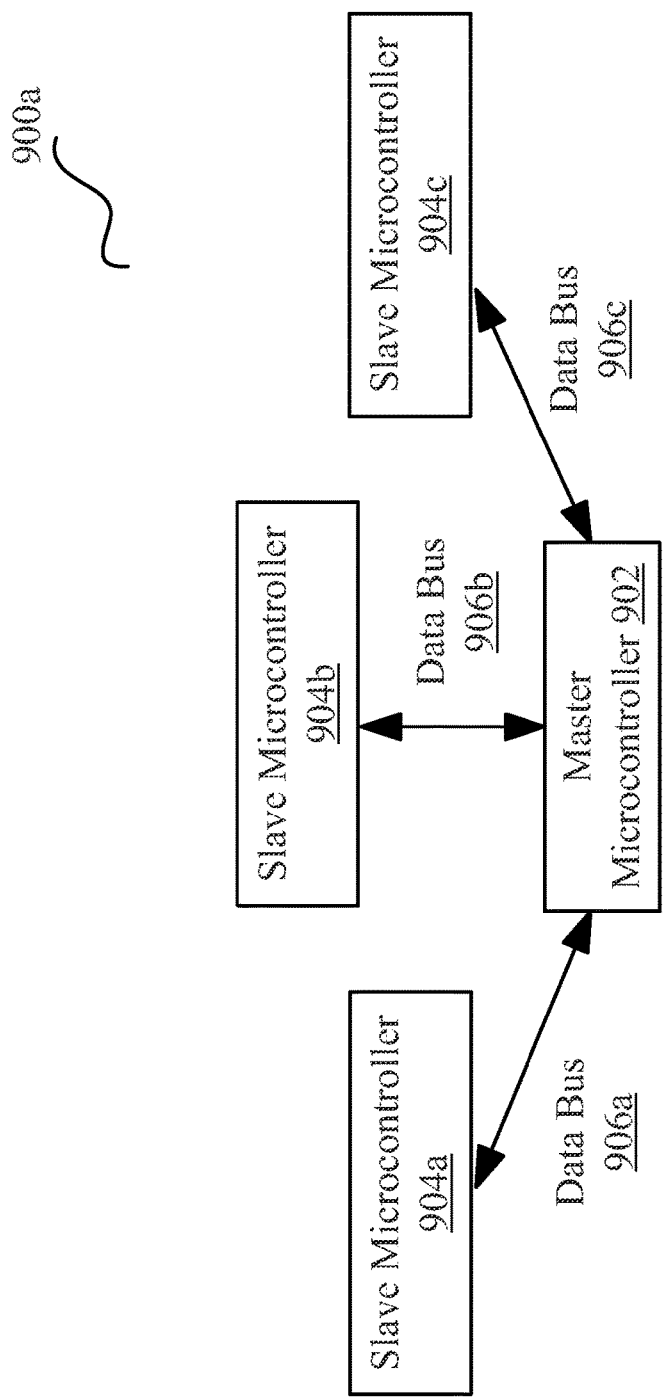
FIG. 9A shows a block diagram of an embodiment of master and slave microcontrollers that may be used in the control circuit.

FIG. 9A shows a block diagram of an embodiment 900*a* of master and slave microcontrollers that may be used in the control circuit. FIG. 9A includes at least a master microcontroller 901, a plurality of slave microcontrollers 904*a*, 904*b*, and 904*c*, and data bus 906*a*, 906*b*, and 906*c*. In other embodiments, FIG. 9A configuration may not have all of the elements or features listed and/or may have other elements or features instead of, or in addition to, those listed.

FIG. 9A shows a master microcontroller controls multiple slave microcontrollers that are each connected to the master microcontroller via an individual data bus. In at least one embodiment, the control circuit 120 may not have a dedicated microprocessor and memory to be used as a control processor. As shown in FIG. 9A, the control circuit 120 may include multiple digital signal processing modules that are used as microcontrollers. In an embodiment, one of the microcontrollers is considered as a master microcontroller 901 while the other microcontrollers are considered as slave microcontrollers 904*a*, 904*b*, and 904*c*. In one embodiment, the master microcontroller 901 processes the data received from the slave microcontrollers 904*a*, 904*b*, and 904*c*, and sends control commands to the slave microcontrollers 904*a*, 904*b*, and 904*c*. In one embodiment, the master and slave microcontrollers exchange data to coordinate and control the operation of various modules of the display system.

Data buses 906*a*, 906*b*, and 906*c* are data connections that are used to transfer data between various module and/or devices of the display system 100. In at least one embodiment, the data transfer via the data buses 906*a*, 906*b*, and 906*c* may use different channel protocols, include a CAN bus protocol, a SPI bus protocol, a I2C bus protocol, or other bus protocols. In an embodiment, one or more of the data buses 906*a*, 906*b*, and 906*c* may use controller area network (CAN) bus protocol in order to allow the master microcontroller 902 and the slave microcontrollers 904*a*, 904*b*, and 904*c* to communicate with each other in applications without a host computer. Additionally or alternatively, one or more of the data buses 906*a*, 906*b*, and 906*c* may use Serial Peripheral Interface (SPI) bus protocol in order to allow synchronous serial communications for short distance communication between the master microcontroller 902 and the slave microcontrollers 904a, 904b, and 904c. Additionally or alternatively, one or more of the data buses 906a, 906b, and 906c may use Inter-Integrated Circuit (I2C) bus protocol to allow for a multi-master, multi-slave, single-ended, serial computer bus for attaching lower-speed peripherals to processors on computer motherboards and embedded systems.

In one embodiment, data buses 906a, 906b, and 906c communicatively connect the master microcontroller with slave microcontrollers 904a, 904b, and 904c, respectively. In at least one embodiment, a test for preventing data collision can be set up when using the data buses, thereby reducing the likelihood or completely preventing simultaneous data packet transmission between two or more devices attached to and/or within display system 100.

In one embodiment, the relationship between a master microcontroller and slave microcontrollers can be determined when the system is designed. Alternatively, the mastership and related functions can be transferred from one microcontroller to another depending on the loading capacities of different microcontrollers. The network of the master and slave microcontrollers enhances the accuracy of the control of the display system. In an embodiment, the data buses between the master microcontroller and each slave microcontroller form a star network as shown in FIG. 9A.

Figure 9B:
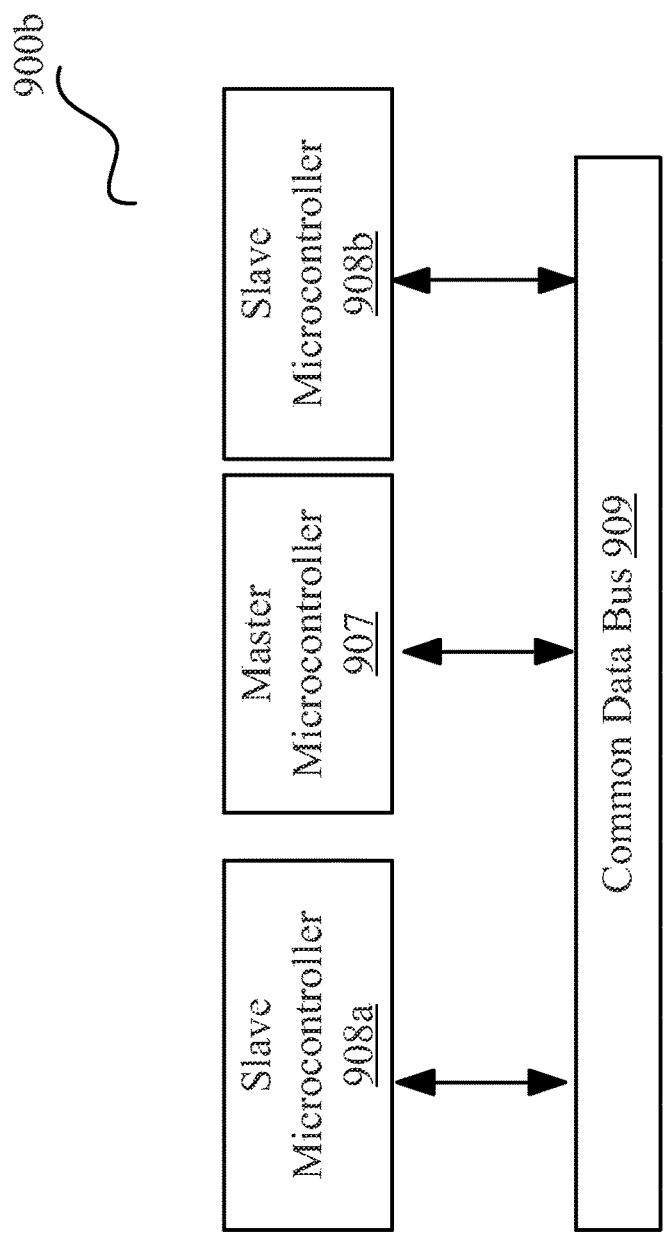
FIG. 9B shows a block diagram of an alternative embodiment of master and slave microcontrollers.

FIG. 9B shows an embodiment of an alternative embodiment 900b of master and slave microcontrollers. FIG. 9B includes at least a master microcontroller 907, slave microcontrollers 908a and 908b, and common data bus 909. In other embodiments, FIG. 9B configuration may not have all of the elements or features listed and/or may have other elements or features instead of, or in addition to, those listed.

FIG. 9B shows that each of the master microcontroller and slave microcontrollers is connected to a common data bus for exchanging data. Master microcontroller 907 is an embodiment of the master microcontroller 902 of FIG. 9A. Slave microcontrollers 908a and 908b may be embodiments of the slave microcontrollers 904a, 904b, and 904c of FIG. 9A.

Common data bus 909 is a data bus that may be shared by the master microcontroller 907 and the slave microcontrollers 908a and 908b, while each of the master and slave microcontrollers may exchange data with the common data bus 909.

Figure 10A:
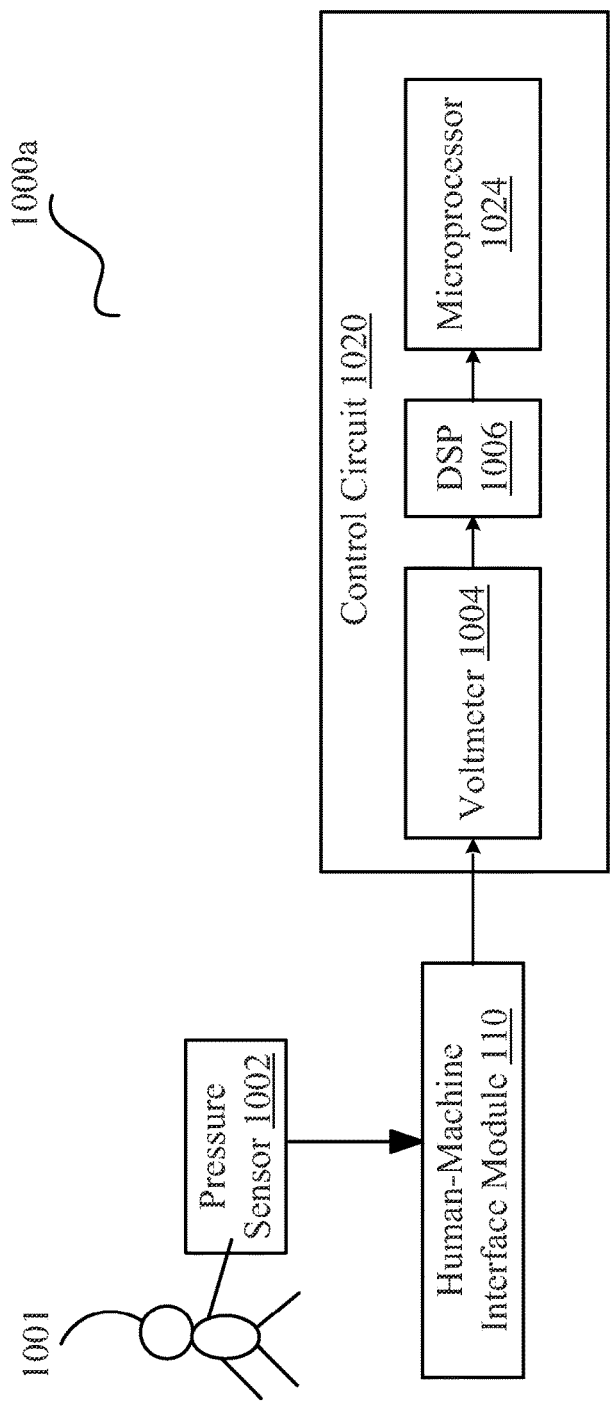
FIG. 10A shows a block diagram of an example of a user manipulating the display system, via a pressure sensor.

FIG. 10A shows a block diagram of an example 1000a of a user manipulating the display system, via a pressure sensor. Example 1000a of FIG. 10A includes at least a user 1001, a pressure sensor 1002, human-machine interface module 110, a control circuit 1020, a voltmeter 1004, a DSP 1006, and a microprocessor 1024. In other embodiments, the example 1000a of FIG. 10A may not have all of the elements or features listed and/or may have other elements or features instead of, or in addition to, those listed.

FIG. 10A shows that a user 1001 may press his/her palm against a pressure sensor 1002, and a sensing signal is generated as analog data by the pressure sensor 1002. In an embodiment, the pressure sensor 1002 is a millivolt output pressure transducer (e.g., the output voltage is in the range of around 30 millivolts). In an embodiment, the output voltage is associated with the intensity of the pressure applied to the pressure sensor 1002. In an embodiment, the pressure sensor 1002 transmits the output voltage data via the human-machine interface module 110 to a voltmeter 1004 of the control circuit 1020. In an embodiment, the microvolimeter 1004 reads the voltage output data and records the maximum value and duration data, which are sent to the digital signal processor (DSP) 1006 for processing. The DSP 1006 compares the voltage and duration data received with a preset threshold (e.g., the voltage is maintain at a level above 32 millivolts and the duration of time is 2 seconds or longer). Based on the comparison, the DSP 1006 determines whether the signal received from the pressure sensor 1002 represents a valid input and then transmits instructions to the microprocessor to control the operation of the display system in response to the signal.

Control circuit 1020 is an embodiment of the control circuit 120 of FIG. 1. In an embodiment, control circuit 1020 includes at least the voltmeter 1004, the DSP 1006 and microprocessor 1024. Voltmeter 1004 is a voltmeter that measures voltage of the circuit. In one embodiment, the voltmeter 1004 is a microvoltmeter that is capable of measuring on the scale of microvolts. The DSP 1006 may be an embodiment of the DSP1 702a, DSP2 702b, and DSP3 702c as discussed in conjunction with FIG. 7. Microprocessor 1024 may be an embodiment of the microprocessors 624, 724, 824 of FIGS. 6, 7, and 8, respectively.

Figure 10B:
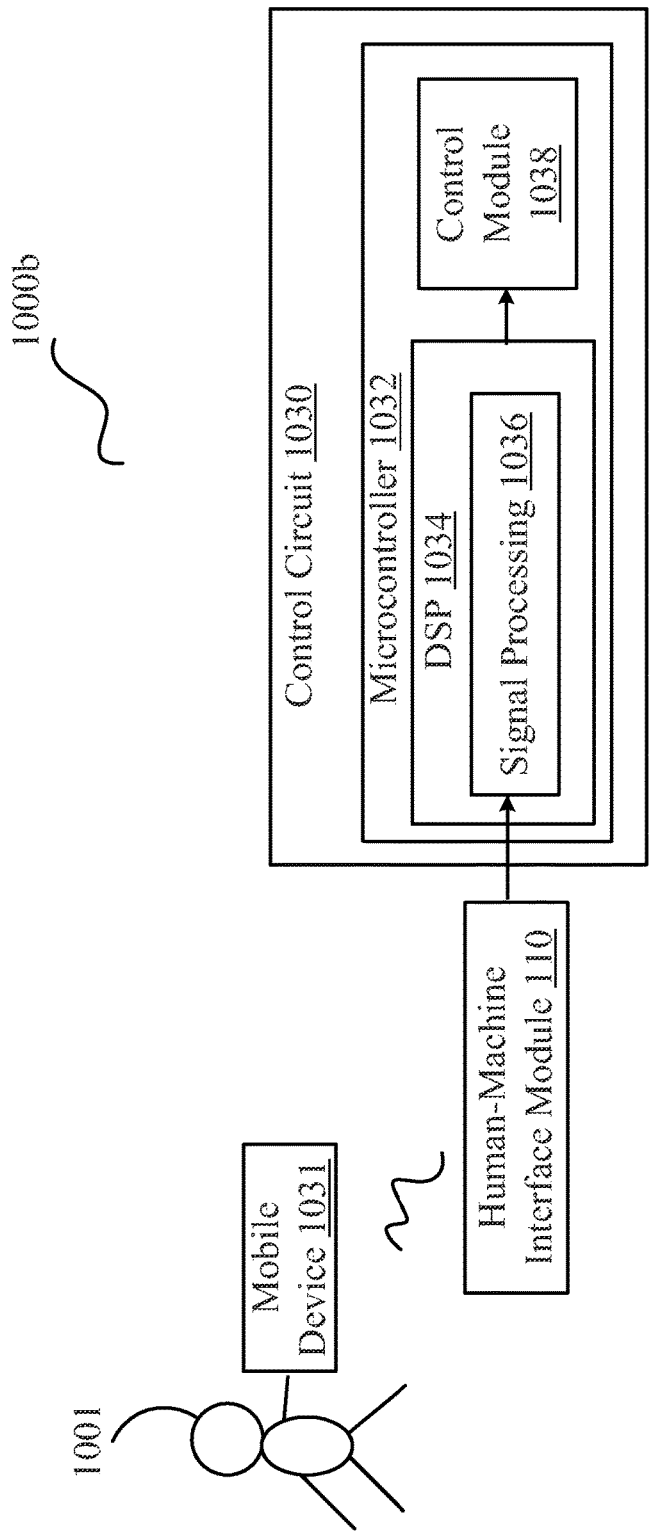
FIG. 10B shows a block diagram of an example of a user manipulating the display system using a mobile device.

FIG. 10B shows a block diagram of an example 1000b of a user manipulating the display system using a mobile device. Example 1000b of FIG. 10B includes at least user 1001, a mobile device 1031, human-machine interface module 110, a control circuit 1030, a microcontroller 1032, a DSP 1034, signal processing 1036, and a control module 1038. In other embodiments, the example 1000b of FIG. 10B may not have all of the elements or features listed and/or may have other elements or features instead of, or in addition to, those listed.

FIG. 10B shows that a user uses a mobile device (e.g., a smart phone) that has a touch screen to send information to control the display system. For example, the user uses his/her hand to press on the touch screen or sweep the touch screen from top to bottom, then the smart phone sends a signal, via the human-machine interface module 110 to the control circuit 1030. In an embodiment, the signal may include the distance of the sweep from top to bottom and the duration of time. The control circuit 1030 may include a microcontroller 1032 that process the signal via the digital signal processor 1034. The DSP 1034 reads the signal that includes the distance and the duration of time and compares with a preset threshold (e.g., the distance is more than 50% of the length of the touch screen and the duration of time is 1 second or longer). The DSP 1034 determines, based on the comparison, whether the signal is considered a valid input, and then sends instructions to a control module 1038 to control the operation of the display system.

Control circuit 1030, mobile device 1031, and microcontroller 1032 are embodiments of the control circuit 130, the mobile device 404, and the microcontroller 622 of FIGS. 1, 4, and 6, respectively. DSP 1034 is an embodiment of the DSP1 702a, DSP2 702b, and DSP3 702c of FIG. 7. Signal processing 1036 includes the methods, algorithms, and/or logical operations discussed above. Control module 1038 is a module that may play the role of the multimedia controller 181, power controller 130, drive circuit 140, and/or various microcontrollers for controlling the operations of various modules of the display system.

Figure 10C:
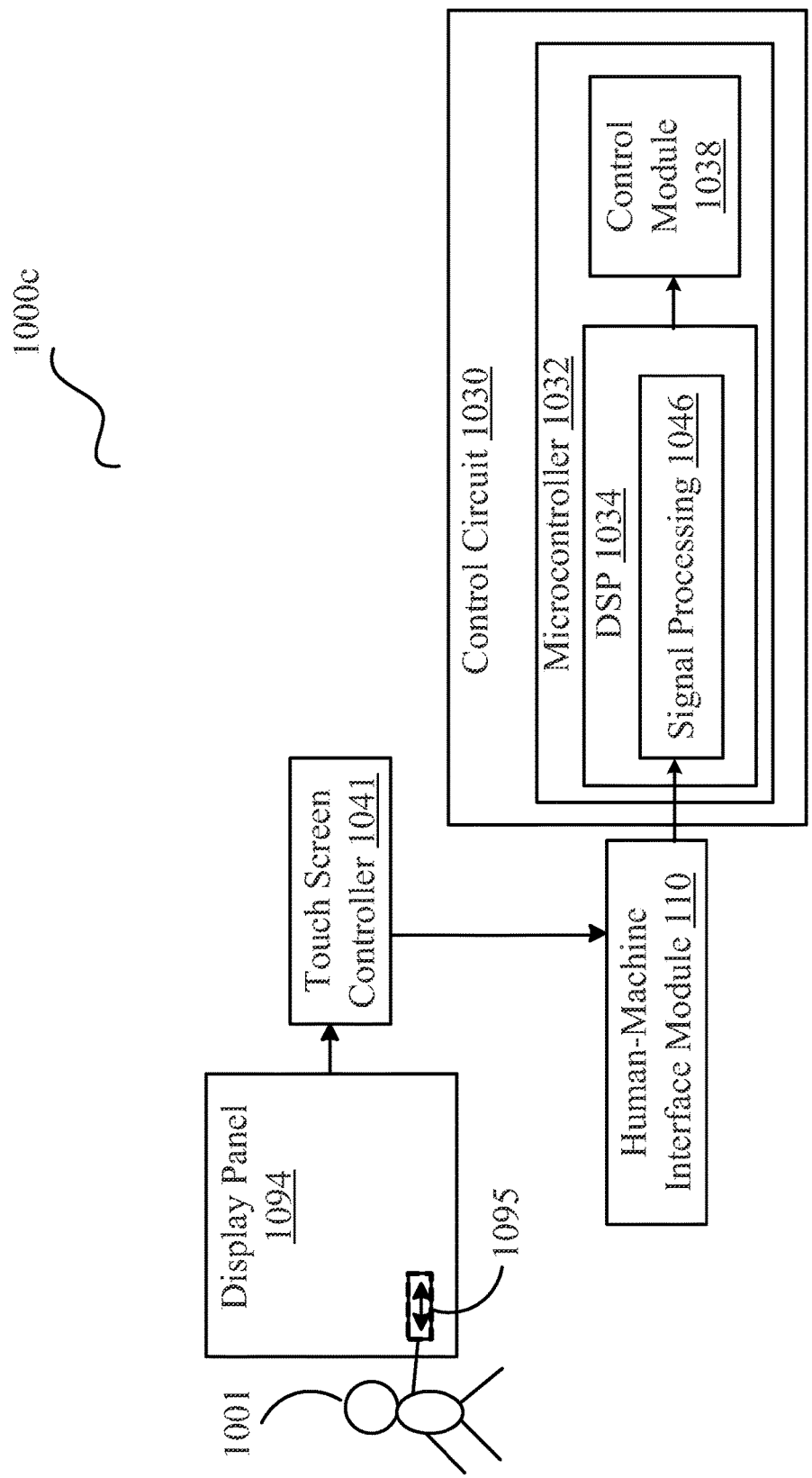
FIG. 10C shows a block diagram of an example of a user manipulating the display system via a pressure sensor using a touch screen of the display panel.

FIG. 10C shows a block diagram of an example 1000c of a user manipulating the display system via a pressure sensor using a touch screen of the display panel. Example 1000c of FIG. 10C includes at least user 1001, human-machine interface module 110, control circuit 1030, a touch screen controller 1041, microcontroller 1032, DSP 1034, signal processing 1036, control module 1038, display panel 194, and a sweep action 1095. In other embodiments, the example 1000c of FIG. 10C may not have all of the elements or features listed and/or may have other elements or features instead of, or in addition to, those listed.

FIG. 10C shows that a touch screen on the display panel 194 is connected to a touch screen controller 1041 that transmits the signals, when the user 1001 presses the touch screen portion of the display panel 1094, via the human-machine interface module 110 to the control circuit 1030 for signal processing and controlling the display system. In an embodiment, the signal may include coordinates of the portion pressed by the user 1001, the direction, distance, and/or area of the sweep, duration of time, etc.

Touch screen controller 1041 is a device that controls one or more touch screens on one or more display panels. In an embodiment, the display panel 194 includes multiple touch screen portions. Additionally or alternatively, an area of the touch screen are divided into different portions. In an embodiment, the touch screen controller 1041 collects signals from all the touch screen portions and outputs data to the human-machine interface module 110. Sweep action 1095 demonstrates that the user 1001 may press on the touch screen of the display panel 194 and move his/her finger or palm across a distance or area, so that to interact with the exhibition (e.g., to select or stop the playing of a video, to move an item, to change the light effects, etc.)

Figure 11:
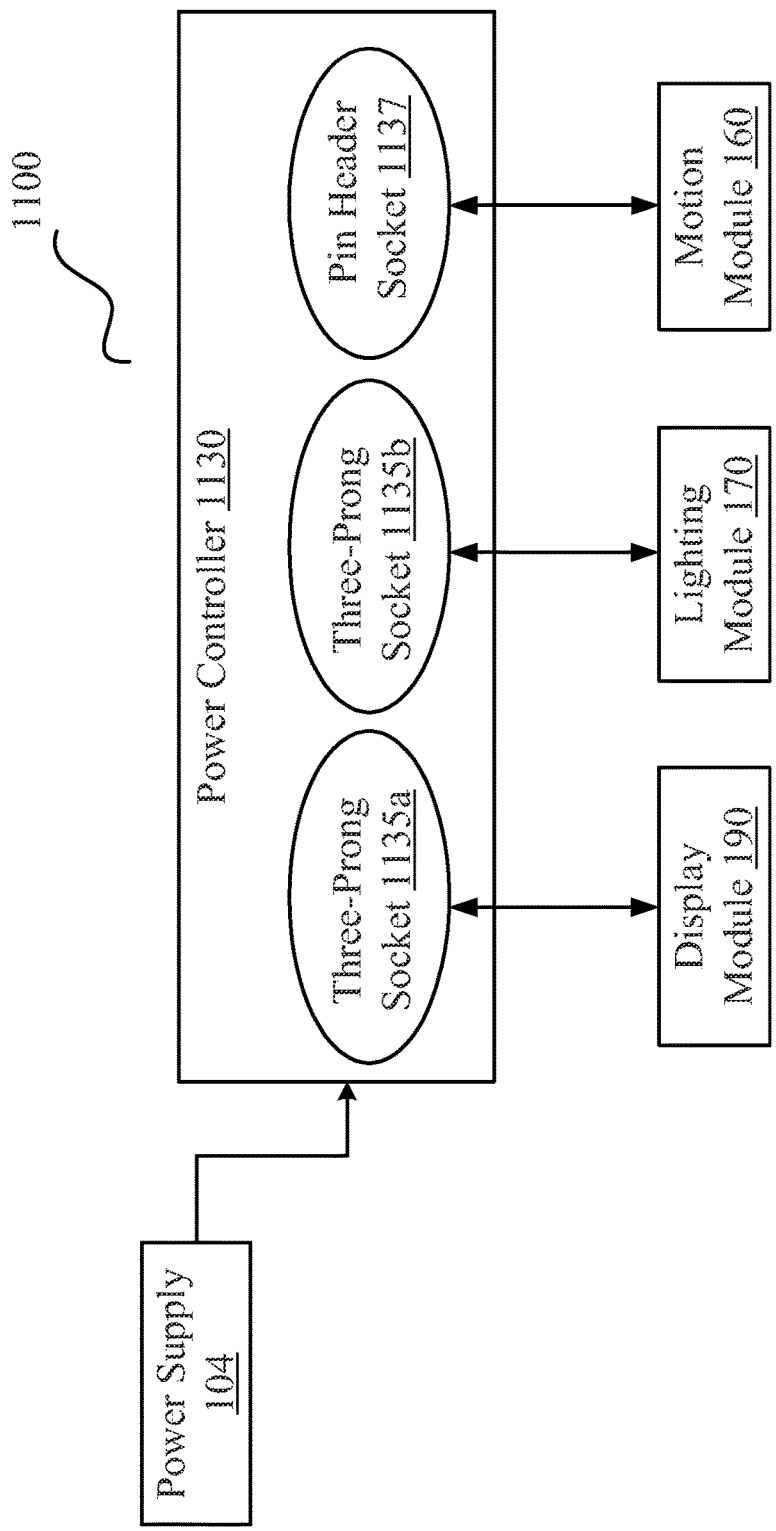
FIG. 11 shows a block diagram of an embodiment of the connection sockets of the power controller for connecting the modules of the display system.

FIG. 11 shows a block diagram of an embodiment 1100 of the connection sockets of the power controller for connecting the modules of the display system. Embodiment 1100 of FIG. 11 includes at least power supply 104, motion module 160, lighting module 170, and display module 190, which were discussed in conjunction with FIG. 1. FIG. 11 also includes a power controller 1130 and three-prong sockets 1135a and 1135b, and a pin header socket 1137. In other embodiments, FIG. 11 configuration may not have all of the elements or features listed and/or may have other elements or features instead of, or in addition to, those listed.

FIG. 11 shows that the power controller 1130 may include various types of sockets for supplying electricity to one or more devices that are directly connected to the power controller 1130 via power cords and are detachable.

Power controller 1130 is an embodiment of the power controller 130 of FIG. 1. Three-prong sockets 1135a and 1135b are sockets for three-prone plugs that may be used to supply AC power. Pin header socket 1137 is a socket to which a pin header having one or more rows of male pins may be connected. Many sensors and devices that are currently commercially available have many different types of connectors and/or do not have standard connectors. By supplying multiple types of sockets, different types of devices may be connected to display system 100, so that display system 100 may be used with a larger variety of types of equipment. In other words, by providing many different types of connectors, display system 100 may be communicatively coupled to many different type of sensors currently commercially available, other devices, and/or device to be introduced in the future.

Figure 12A:
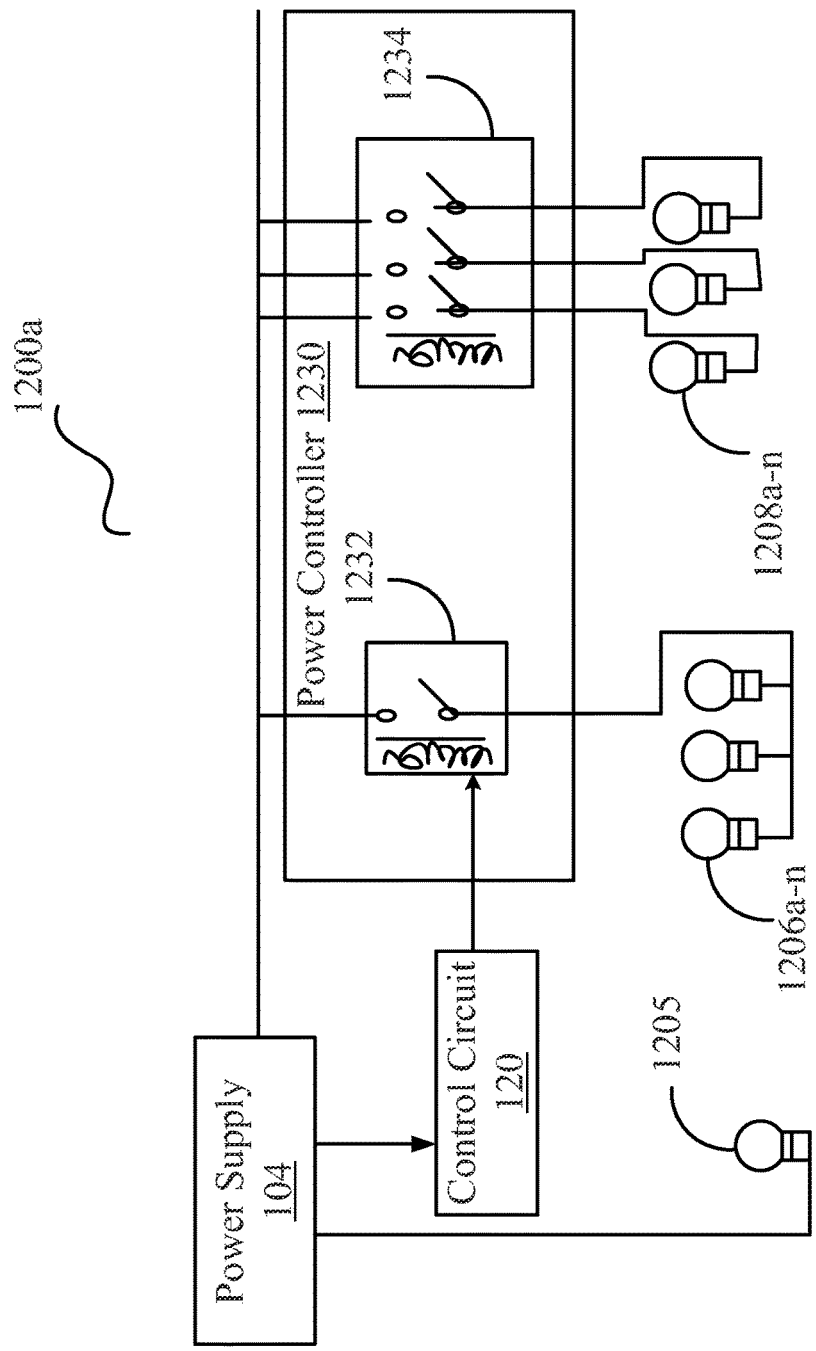
FIG. 12A shows a block diagram of an example of electrical switches in the power controller that may be used to control the illumination.

FIG. 12A shows a block diagram of an example 1200a of electrical switches in the power controller that may be used to control the illumination. Example 1200a of FIG. 12A includes at least power supply 104 and control circuit 120, which were discussed in conjunction with FIG. 1. Example 1200a of FIG. 12A also includes light bulbs 1205, 1206a-n, and 1208a-n. FIG. 12A further includes a power controller 1230 that includes a relay 1232, and a relay 1234. In other embodiments, example 1200a of FIG. 12A may not have all of the elements or features listed and/or may have other elements or features instead of, or in addition to, those listed.

FIG. 12A shows that the control circuit 120 controls electrical switches to control the electricity supplied to the light bulbs. In one embodiment, the power controller 1230 is an embodiment of the power controller 130 of FIG. 1. In one embodiment, the power controller 1230 includes one or more electrical switches for controlling the on-and-off and the lighting effects of the lighting module 170. In one embodiment, the electrical switches of some electrical circuits of the display system under the control of the control circuit 120 can be directly powered by a power supply 104, without the use of the power controller 1230.

Light bulb 1205 is directly connected to the power supply 104, and may be controlled by connecting and disconnecting to the power supply 104. Light bulbs 1206a-n are connected in series to the power controller 1230 and may be controlled by the relay 1232. Light bulbs 1208a-n are connected in parallel to the power controller 1230 and may be controlled by the relay 1234.

Relay 1232 is an electromagnetic switch that controls the on-and-off the the power supply to the light bulbs 1206a-n that are in series. In an embodiment, relay 1232 is a single pole single throw (SPST) relay that has a single arm and a coil under the control of the control circuit 120. In an embodiment, when the coil of the relay 1232 is energized by the control circuit 120, the relay 1232 allows electricity to flow to the light bulbs 1206a-n.

Relay 1234 controls the on-and-off the power supply to the light bulbs 1208a-n that are in parallel connection. In an embodiment, relay 1234 is a three pole single throw relay that has three arms and a coil under the control of the control circuit 120. In an embodiment, when the coil of the relay 1234 is energized by the control circuit 120, the three arms of the relay 1232 connect to the open terminal thus allowing electricity to flow to each of the light bulbs 1208a-n.

In an embodiment, the relays of FIG. 12A may include different types of relays that have different response times and/or ranges of voltage. In an embodiment, the lighting module 170 may include multiple electrical switches for controlling each of the lighting devices to create a light-and-shadow effect as a whole in the exhibition. In one embodiment, the power controller 130 and/or drive circuit 140 include a plurality of electrical switches for each electrical device in the motion module 160, lighting module 170, display module 190, and/or audio module 180, so that to individually control the operation of each device. Alternatively, a single electrical switch may control multiple devices simultaneously. Any kind of relays used in FIG. 12A can be replaced by the semiconductor devices (such as transistors, avalanche diodes, tunneling diodes, for example) that have the corresponding functions. Each of the relays may be used to either control whether the light bulb the relay controls is on or off or control the brightness of the light bulb by controlling the duty cycle of the voltage supplied to the light bulb.

Figure 12B:
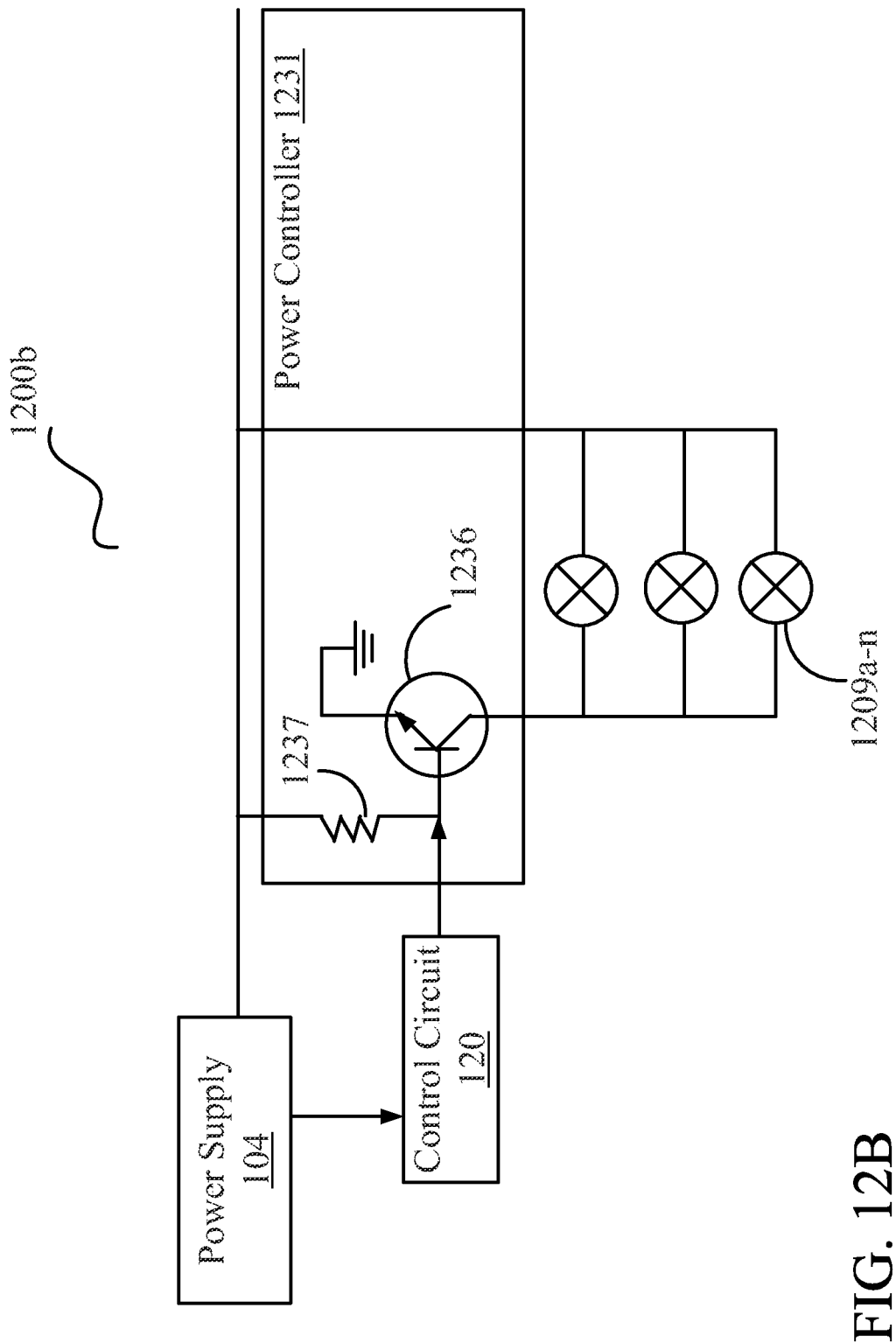
FIG. 12B shows a block diagram of another example of the electrical switches in the power controller.

FIG. 12B shows a block diagram of another example 1200b of the electrical switches in the power controller. FIG. 12B includes at least power supply 104 and control circuit 120, which were discussed in conjunction with FIG. 1. FIG. 12B also includes light bulbs 1209a-n. FIG. 12B further includes a power controller 1231 that includes a transistor 1236 and a resistor 1237. In other embodiments, the embodiment of FIG. 12B may not have all of the elements or features listed and/or may have other elements or features instead of, or in addition to, those listed.

FIG. 12B shows that a transistor may be used under the control of the control circuit 120 for controlling the illumination. In an embodiment, a transistor uses semiconductors without the use of a coil, so that the transistor may be smaller in volume and would not affect the neighboring magnetic fields, and the transistor's response to the switch is faster than electronic relays. In an embodiment, the semiconductors are connected to the control circuit 120, and cannot directly cope with higher voltage and current, so transistors may be more suited to drive a device which requires a high accuracy of low voltage (e.g., a synchronous motor). In an embodiment, solenoids semiconductor switches may be used to control the power supply.

Light bulbs 1209a-n are similar to the Light bulbs 1208a-n as discussed in conjunction with FIG. 12A. In an embodiment, light bulbs 1209a-n are connected in parallel. to Power controller 1231 may be an embodiment of the power controller 130. In at least one embodiment, the power controller 1231 includes a transistor for controlling the electric supply to the light bulbs and/or other devices.

Transistor 1236 is a semiconductor device used to switch and/or amplify electronic signals and electrical power. In at least one embodiment, the transistor 1236 includes semiconductor material with at least three terminals for connection to an external circuit. In at least one embodiment, the transistor 1236 is controlled by the control circuit 120 to control the on-and-off of the light bulbs 1209a-n. Alternatively, the transistor 1236 may be used in the drive circuit 140 for controlling the power supply to a motor. FIG. 12B shows a grounded-emitter transistor circuit, as the base voltage rises, the emitter and collector currents rise exponentially. The collector voltage drops because of reduced resistance from collector to emitter. If the voltage error between the collector and emitter were zero (or near zero), the collector current would be limited only by the load resistance (light bulbs 1209a-n) and the supply voltage and electricity is supplied to the light bulbs 1209a-n.

Resistor 1237 is a passive two-terminal electrical component that implements electrical resistance as a circuit element. In at least one embodiment, the resistor 1237 acts to reduce current flow, and, at the same time, acts to lower voltage levels within the rest of the circuit (since the voltage is divided between resistor 1237 and the rest of the circuit.

Figure 13:
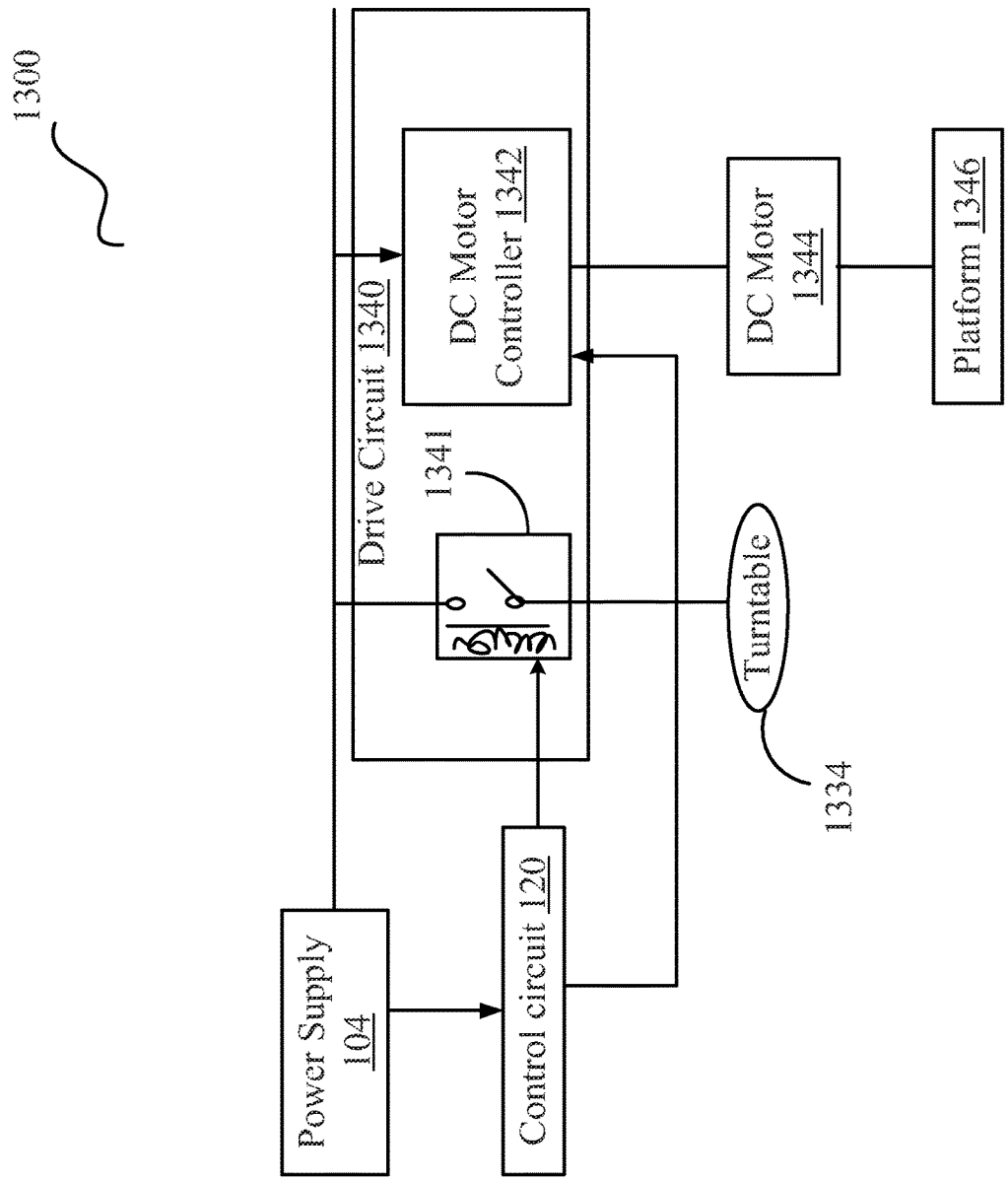
FIG. 13 shows a block diagram of an example of a relay and a controller in the drive circuit that may be used to control a turntable and a platform, respectively.

FIG. 13 shows a block diagram of an example 1300 of a relay and a controller in the drive circuit that may be used to control a turntable and a platform, respectively. FIG. 13 includes at least power supply 104 and control circuit 120, which were discussed in conjunction with FIG. 1. FIG. 13 also includes a turntable 1334, a drive circuit 1340, a relay 1341, a DC motor controller 1342, a DC motor 1344, and a platform 1346. In other embodiments, FIG. 13 configuration may not have all of the elements or features listed and/or may have other elements or features instead of, or in addition to, those listed.

FIG. 13 shows that the drive circuit 1340 may include relays and various motor controllers for controlling the motors of the motion module 160 and/or the lighting module 170. In one embodiment, a relay 1341 may be used to control the on-and-off of a motor (e.g., a single direction motor that runs at a fixed rotational speed) that drives a turntable for moving a display item. Additionally or alternatively, a motor controller may be used to control the motors of the motion module and/or light module. In an embodiment, a motor controller includes a device or a group of devices that serves to govern in some predetermined manner the performance of an electric motor. A motor controller might include a manual or automatic means for starting and stopping the motor, selecting forward or reverse rotation, selecting and regulating the speed, regulating or limiting the torque, and protecting against overloads and faults.

Turntable 1334 is driven by a motor under the control of the drive circuit 1340. In one embodiment, the structure and operation of a turntable were discussed in conjunction with U.S. application Ser. No. 14/535,195. Turntable will be discussed in further detail in conjunction with FIGS. 17A and 17B.

Drive circuit 1340 and relay 1341 is an embodiment of the drive circuit 140 and relay 1232, which were discussed in conjunction with FIGS. 1 and 12A. In an embodiment, relay 1232 may be substituted using other electrical switches.

DC motor controller 1342 includes devices that control the operation of a DC motor (e.g., on-and-off, speed, forwards and backwards, etc.). In one embodiment, the DC motor controller 1342 is EM-241A DC DC motor controller 12-24V 15A from Electromen Oy (as shown in the website www.electromen.com). In one embodiment, the DC motor controller 1342 drives a DC motor in forward and reverse directions.

DC motor 1344 is a motor driven by DC power. In an embodiment, the DC motor drives, via gears and/or threaded shafts, a platform that moves display items up and down. In an embodiment, DC motor runs in forward or reverse directions under the control of the DC motor controller 1342 to elevate or descend the platform.

Platform 1346 is a platform driven by the DC motor 1344, on which the display item 111 and/or performers are displayed. In an embodiment, the structure of platform 1346 and other gears and devices used to drive the movement of the platform 1346 were described in FIG. 6 of U.S. application Ser. No. 14/535,195.

Figure 14:
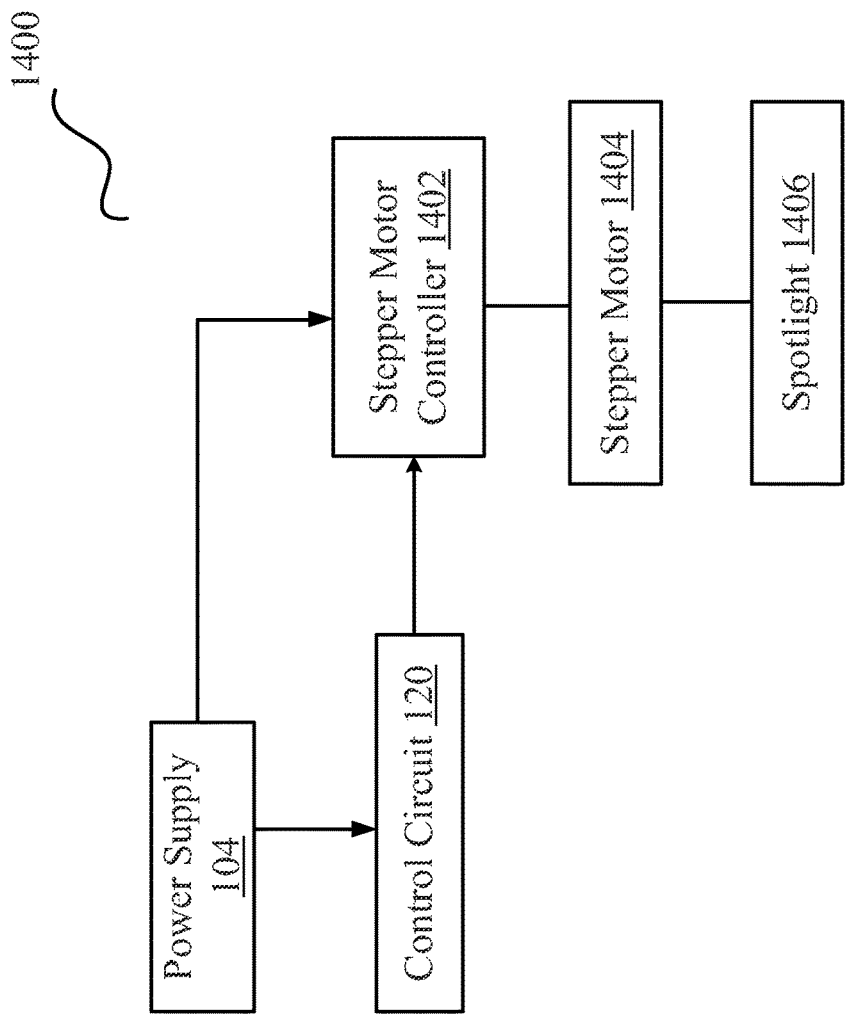
FIG. 14 shows a block diagram of an example of the control circuit and the drive circuit controlling the beaming angle of a spotlight.

FIG. 14 shows a block diagram of an example 1400 of the control circuit and the drive circuit controlling the beaming angle of a spotlight. Example 1400 of FIG. 14 includes at least power supply 104 and control circuit 120, which were discussed in conjunction with FIG. 1. FIG. 14 also includes a stepper motor controller 1402, a stepper motor 1404, and a spotlight 1406. In other embodiments, example 1400 of FIG. 14 may not have all of the elements or features listed and/or may have other elements or features instead of, or in addition to, those listed.

FIG. 14 shows that a stepper motor controller is used under the control of the control circuit 120 for controlling a stepper motor so as to accurately control the beam angle of a spotlight. In one embodiment, the lighting module 170 includes at least a spotlight that is installed on a turntable or gears that can change the direction of the spotlight. In an embodiment, the drive circuit 140 includes a stepper motor controller for controlling the stepper motor that drives the turntable or the gears of the spotlight.

Stepper motor controller 1402 includes devices that control the operation of a stepper motor. In an embodiment, the stepper motor controller 1402 is an EM-121 stepper motor controller from Electromen Oy Ltd. Stepper motor 1404 is a stepper motor that can be held at a certain step or position so that to accurately control the rotation of a turntable or gears attached to the spotlight. Spotlight 1406 is a light that projects a bright beam of light onto a display space or a stage. The direction of spotlight 1406 may be controlled by a plurality of gears and devices.

Method of Use

Figure 15:
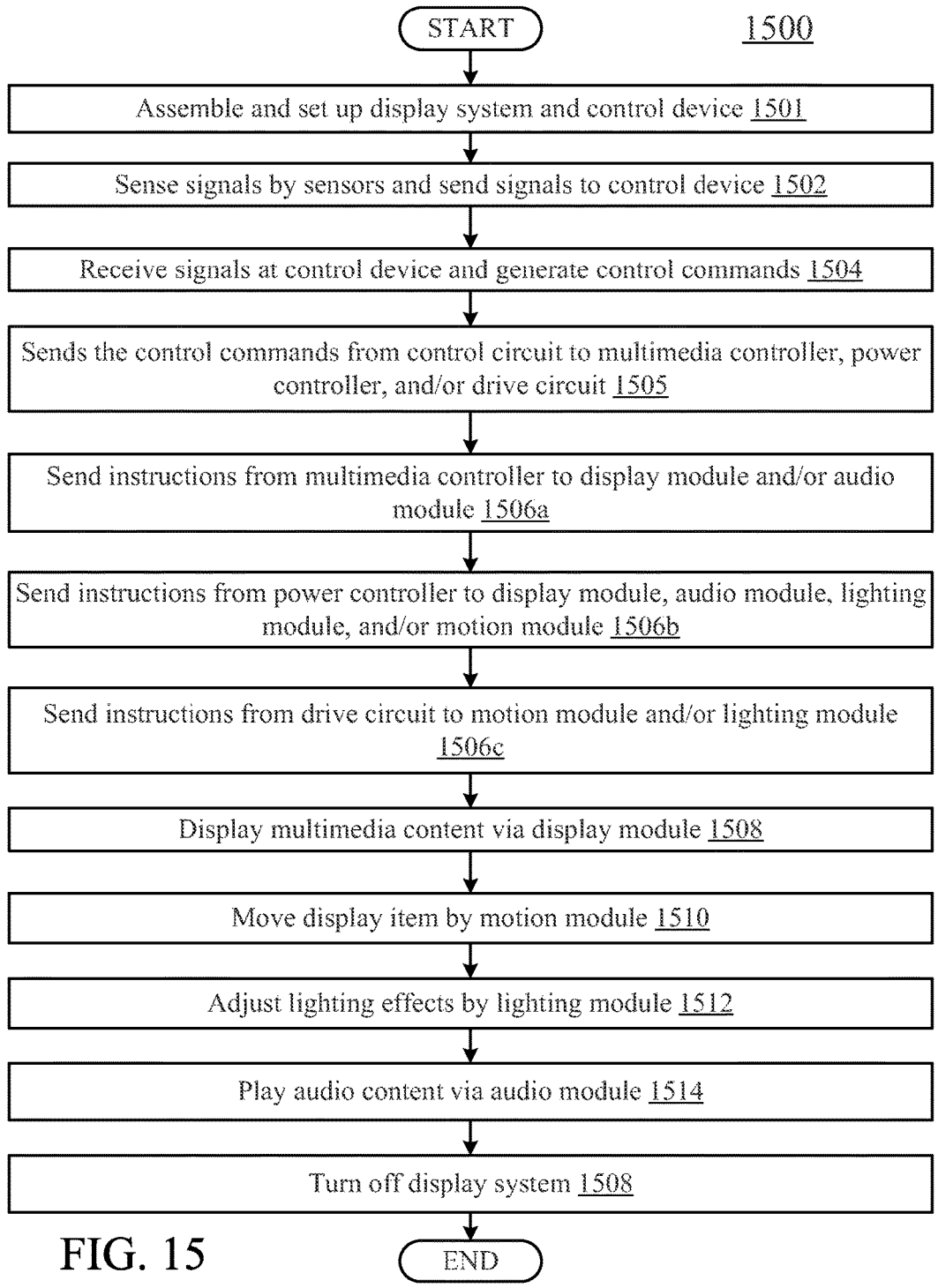
FIG. 15 shows a flowchart of an embodiment of a method of using the control device to control the display system.

FIG. 15 shows a flowchart of an embodiment of a method 1500 of using the control device to control the display system of FIG. 1.

In step 1501, display system and control device is assembled and set up for displaying display item. The display system may be an embodiment of display systems 100, 200, and 600. The display item is placed in display space of the display system. The display system stays on as long as the power supply 104 provides electrical power to the display system and the control device and the display system 100 is not intentionally shut off. The display system may be kept in a dormant mode (e.g., the display panel 194 is turned transparent and no video is played, and the display item stays in the display space or the concealed space) or in a preset display mode (e.g., the display panel 194 automatically plays preselected multimedia content, and/or the display item is moved in a preset manner), until a passerby starts to interact with the display system. When the user finishes interacting with the display system and walks away, the display system may keep on displaying or may turn to the dormant state, until another user comes to interact with the display system and steps 1502-1514 may be repeated.

In step 1502, at least one sensor senses signals and sends to the control device via the human-machine interface module 110. The sensor may sense the presence or activity of a user when the user interacts with the display system by pressing on the sensor or a touch panel. Additionally or alternatively the sensor may detect the movement, gestures, and/or voice of the user when the user participates with the exhibition using the display system. In one embodiment, the sensor may detect the interaction of the user with the display system over a period of time as long as the user is in a vicinity of the display system (e.g., when the user passes by and stays in front of the display panel, or when the user is nearby and use a cell phone to interact with the display system)

In step 1504, the control device receives signals from external devices via the human-machine interface module, and the control device generates control commands, based on the signals received, for controlling the multimedia controller, power controller, and/or drive circuit. In at least one embodiment, the control device receives sensing/measuring signals from sensors and converts and/or processes the received signals into control commands. Additionally or alternatively, the control device receives control instructions from external electronic devices, such as a remote controller or a mobile device and generates corresponding control commands. The control commands for the multimedia controller may include instructions for the multimedia controller to select multimedia content from the multimedia database and to control the display module and/or the audio module to display selected multimedia content. The control commands for the power controller may include instructions for the power controller to control power supply to the display module, audio module, lighting module, and/or motion module. The control commands for the drive circuit may include instructions for the drive circuit to control the motion module and/or the lighting module.

In step 1505, the control circuit sends the control commands to the multimedia controller, the power controller, and/or the drive circuit, simultaneously.

In step 1506a, the multimedia controller sends instructions, based on the control commands received, to the display module and/or the audio module for displaying multimedia content. In at least one embodiment, the multimedia controller selects, based on the control commands received, multimedia contents from the multimedia database. Optionally, as part of step 1506a, the multimedia controller selects videos and/or images to display via the display module. Optionally as part of step 1506a, the multimedia controller selects audio content to display via the audio module.

In step 1506b, the power controller sends instructions, based on the control commands received, to the display module, the audio module, the lighting module, and/or the motion module for controlling the power supply. Optionally as part of step 1506b, the power controller also controls power supply to the multimedia controller, the multimedia database, and/or the sensor.

In step 1506c, the drive circuit sends instructions, based on the control commands received, to the motion module and/or the lighting module. In one embodiment, the steps 1506a, 1506b, and 1506c take place simultaneously.

In step 1508, the display module displays the multimedia content under the control of the multimedia controller. The display controller of the display module, based on the instructions received from the multimedia controller, plays multimedia content retrieved from the multimedia database on the display panels, while controlling the transparency of the display panels.

In step 1510, the motion module, under the control of the drive circuit, moves display item in accordance with the multimedia content or requirements of the display.

In step 1512, the lighting module, under the control of the power controller and/or the drive circuit, controls lighting effects including turning on or off the lighting devices, adjusting brightness, color, contrast, fade-in and fade-out effects, duration of time, and/or angle of the beams of light of the lighting fixtures.

In step 1514, the audio module, under the control of the multimedia controller, plays audio contents retrieved from the multimedia database. Optionally as part of step 1514, the audio controller of the audio module adjusts the volume of the audio contents. In one embodiment, the steps 1508, 1510, 1512, and 1514 may take place simultaneously or in a predetermined order under the control of the control device, to achieve a synchronized exhibition. During the user's interaction with the display system, the display system may repeat steps 1502-1514 in response to the user activity (e.g., the user, after viewing for a few minutes, may interrupt and choose another multimedia or move the display item in another way). Steps 1502-1514 may also be repeated when another user comes to interact with the display system.

In step 1516, display system is turned off when the display session is ended, or when the display system is intentionally shut off.

In an embodiment, each of the steps of method 1500 is a distinct step. In another embodiment, although depicted as distinct steps in FIG. 15, steps 1501-1516 may not be distinct steps. In other embodiments, method 1500 may not have all of the above steps and/or may have other steps in addition to or instead of those listed above. The steps of method 1500 may be performed in another order.

Some Examples

Figure 17A:
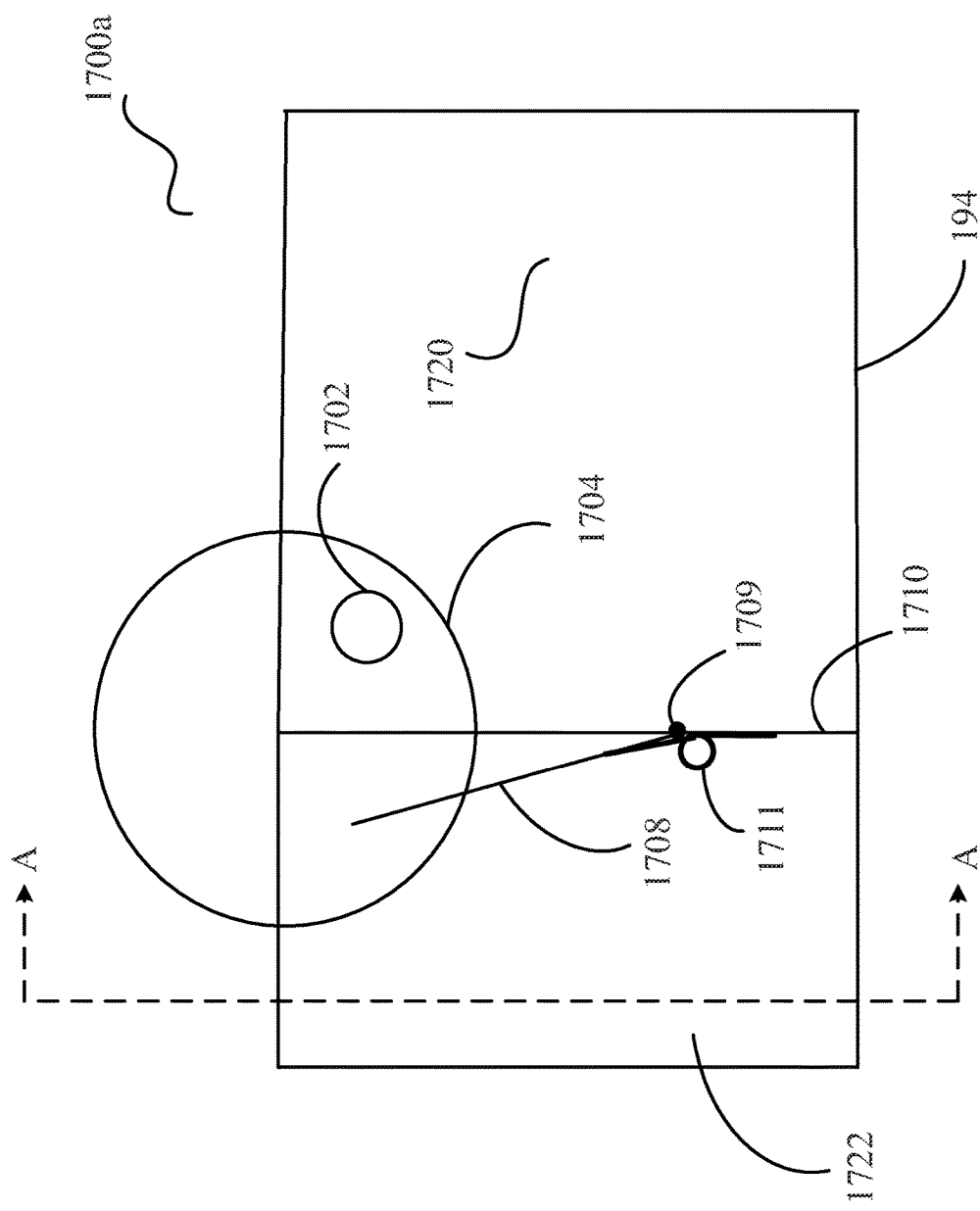
FIG. 17A shows a top view of a turntable that may be used to transfer a display item through a door into a concealed space of the display system.
Figure 17B:
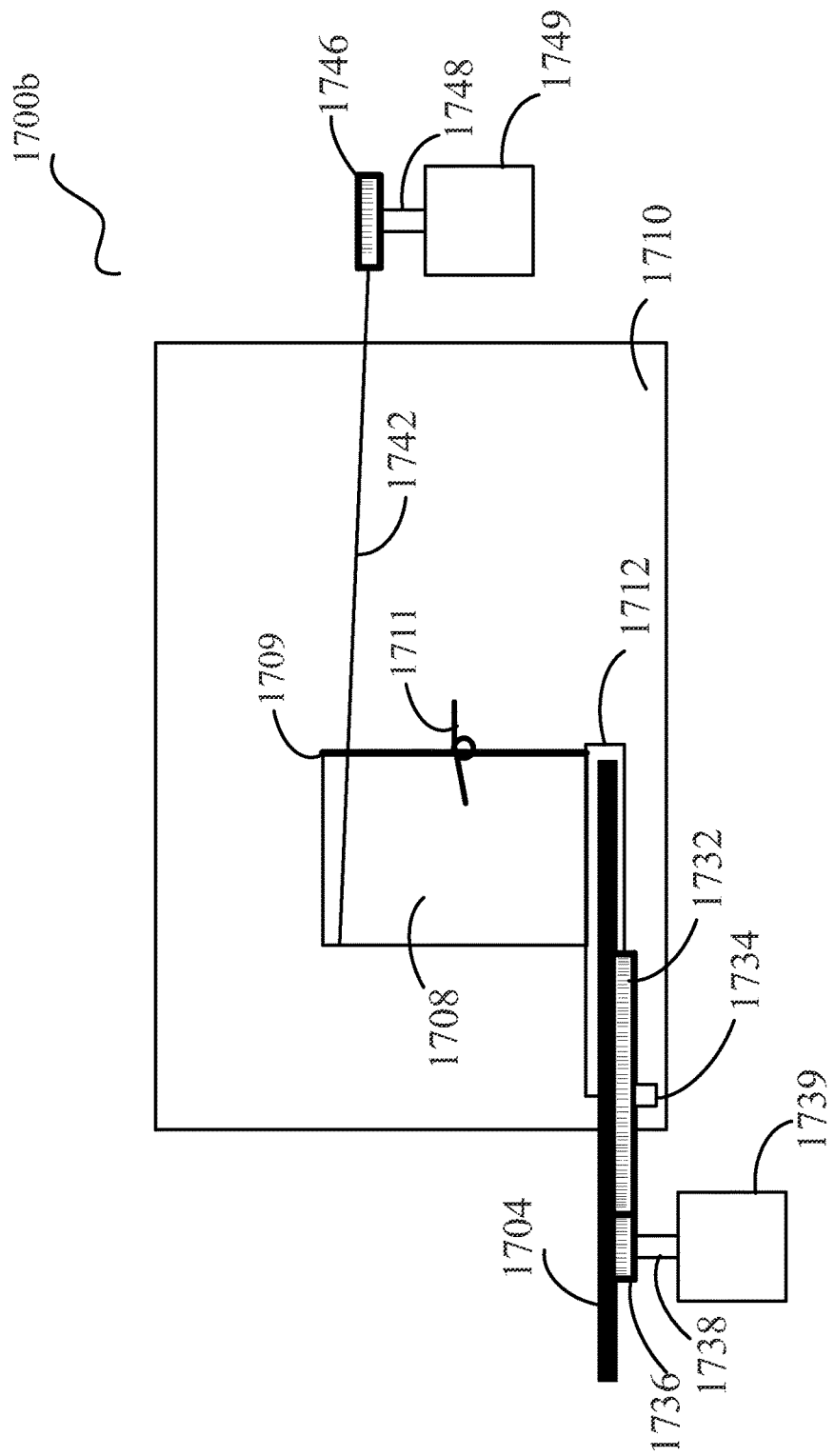
FIG. 17B shows a cross sectional side view of the system of FIG. 17A having motors and gears that controls the turntable and the door.

For example, a user presses on a pressure sensor or operates on a touch screen to switch the display of one item to another. The microprocessor receives the sensing signals and sends control commands to the power controller 30 to turn off the lamp or spotlight of the lighting module that cast light on the display item. The microcontroller then sends control commands to the drive circuit 140 that controls the motion module 160 to open a spring-biased door. The drive circuit 140 also controls the motor that drives a turntable to rotate to move the display item from the display space to the concealed space through the door (as shown in FIGS. 17A and 17B). Alternatively, the control circuit 140 controls another motor that drives the wheel of a vehicle to move along the track at the bottom of the display system to enter into the concealed space through the door (as shown in FIG. 17C). Optionally the drive circuit 140 may also control the turntable or the vehicle to move another item for display from the concealed space into the display space. After the item to be switched is moved into the concealed space (and/or another display item is moved into the display space), the drive circuit 140 controls yet another motor to close the spring-biased door. The microcontroller then sends control commands to the power controller 130 to turn on the lighting of the lighting module 170.

In another example, a user may put his/her hand in front of (e.g., the user may cover) a light sensor that is installed near the display panel 194 facing the user. The user simulate a situation of the night time at the exhibition of a residential house, the control device 102 may receive the sensing signals from the light sensor and generates control commands to control the motors to put down a window curtain. The control device 102 may also control the lighting module 170 to turn on the light, and may control the multimedia controller 181 to play a video on the display panel and play an audio content.

Method of Assembly

Figure 16:
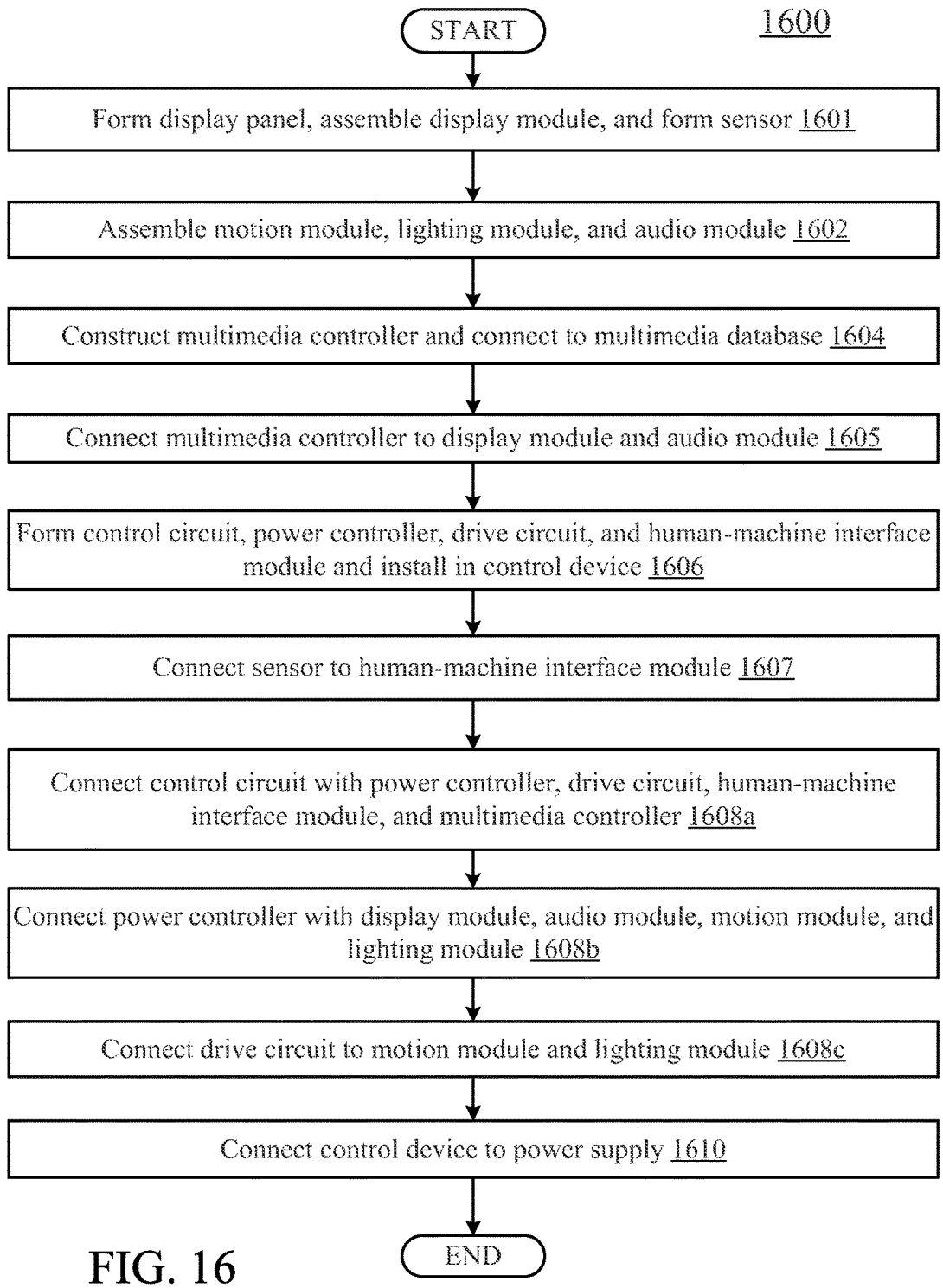
FIG. 16 shows a flowchart of an embodiment of a method of assembling the display system and the control device.

FIG. 16 shows a flowchart of an embodiment of a method 1600 of assembling the control device and display system.

In step 1601, the display panel is formed and assembled with the display controller to form the display module. Optionally, the display item is formed or prepared, and is set up in the display space as discussed in U.S. application Ser. No. 14/535,195.

In step 1602, the motion module, lighting module, and/or audio module are constructed and/or assembled. In at least one embodiment, the motion module may be assembled using structures and/or devices that were discussed in conjunction with FIGS. 5, 6, and 7A-D of U.S. application Ser. No. 14/535,195. In at least one embodiment, the lighting module may be assembled using structures and/or lighting devices that were discussed in conjunction with FIG. 8A of U.S. application Ser. No. 14/535,195. In at least one embodiment, the audio module may be assembled using structures and/or devices that were discussed in conjunction with FIG. 1. Optionally, as part of step 1602, at least a sensor is formed. In other embodiments, the motion module, lighting module, and/or audio module may include other structures.

In step 1604, the multimedia controller is constructed. In at least one embodiment, as part of step 1605, the multimedia database is constructed and connected to the multimedia controller for providing multimedia content.

In step 1605, the multimedia controller is connected to the display module and/or the audio module.

In step 1606, the control device is constructed. In at least one embodiment, the control circuit, power controller, drive circuit, and/or human-machine interface module are formed and installed in the control device, respectively.

In step 1607, the sensor is connected to the human-machine interface module via wired or wireless connections.

In step 1608a, the control circuit is connected with the power controller, the drive circuit, the human-machine interface module, and/or the multimedia controller.

In step 1608b, the power controller is connected with the display module, audio module, motion module, and/or the lighting module. Optionally, as part of step 1608b, the power controller is also connected to the multimedia controller, multimedia database, and/or sensor.

In step 1608c, the drive circuit is connected to the motion module and/or the lighting module.

In step 1610, the control device is connected to the power supply.

In an embodiment, each of the steps of method 1600 is a distinct step. In another embodiment, although depicted as distinct steps in FIG. 16, steps 1601-1610 may not be distinct steps. In other embodiments, method 1600 may not have all of the above steps and/or may have other steps in addition to or instead of those listed above. The steps of method 1600 may be performed in another order.

Alternatives and Extensions

FIG. 17A shows a top view 1700 of a turntable that may be used to transfer a display item through a door into a concealed space of the display system 100. FIG. 17A includes at least display panel 194, a display item 1702, a turntable 1704, a door 1708, an axle 1709, a side wall 1710, a spring 1711, a display space 1720, and a concealed space 1722. In other embodiments, FIG. 17A configuration may not have all of the elements or features listed and/or may have other elements or features instead of, or in addition to, those listed.

FIG. 17A shows a turntable, which is used to move a display item through a spring-loaded door from a display space to a concealed space, or vice versa. Display item 1702, turntable 1704, door 1708, side wall 1710, display space 1720, and concealed space 1722 were described in conjunction with display item 111, turntable 717a, door 721b, side wall 760, display space 720, and concealed space 742 of FIG. 7C of U.S. application Ser. No. 14/535,195.

Axle 1709 is an axle via which the door 1708 is connected to the side wall 1710. Spring 1711 bias the door 1708 to stay closed to block an entrance between the display space 1720 and the concealed space 1722. In an embodiment, a motor is controlled by the drive circuit 140 to pull or push the door 1708 open, and another motor is controlled to rotate the turntable 1704 to transfer the display item 1702.

FIG. 17B shows a cross sectional side view 1700b of the system of FIG. 17A having motors and gears that controls the turntable and the door. FIG. 17B includes at least turntable 1704, door 1708, axle 1709, side wall 1710, and spring 1711. FIG. 17B further includes a space 1712, a gear 1732, an axle 1734, a motor gear 1736, a motor shaft 1738, a motor 1739, a cord 1742, a motor gear 1746, a motor shaft 1748, and a motor 1749. In other embodiments, FIG. 17B configuration may not have all of the elements or features listed and/or may have other elements or features instead of, or in addition to, those listed.

FIG. 17B shows a cross sectional side view of the motors and gears that drives the rotation of the turntable 1704 and controls the door 1708.

Space 1712 is a space at the bottom of the display system for the turntable 1704 to rotate therein. The axle 1734 is an axle on which the turntable 1704 rotates. In at least one embodiment, gear 1732 is mounted to the axle 1734 and rotates with the axle 1734. In at least one embodiment, gear 1732 includes teeth or cogs that engage with the teeth or cogs of a motor gear 1736 that is mounted to a motor shaft 1738 of the motor 1739. In at least one embodiment, the motor 1739 rotates the motor shaft 1738 and the motor gear 1736, which in turn rotates the gear 1732 that is mounted on the axle 1734, which in turn rotates the axle 1734, thereby rotating the turntable 1704. Alternatively, the turntable 1704 may be directly mounted to the motor shaft 1738 of the motor 1739. In other embodiment, display system may include other gears and/or structures for rotating a turntable.

In one embodiment, the motor 1739 may run in forward or reverse direction to transfer the display item into or away from the display space.

Cord 1742 is a cord that at one end is attached to the door 1708 (optionally at the side of the door opposite the axle 1709) while at the other end is connected or wrapped around a motor gear 1746 that is mounted on a motor shaft 1748 of a motor 1749. In at least one embodiment, the motor 1749 rotates the motor shaft 1748 and the motor gear 1746, which pulls the cord 1742 and thus opens the door 1708. In one embodiment, the motor 1749 may rotate slightly in a reversed direction to release the cord 1742, and the door 1708 will close because of the bias of the spring 1711. In one embodiment, cord 1742 is a string.

Figure 18:
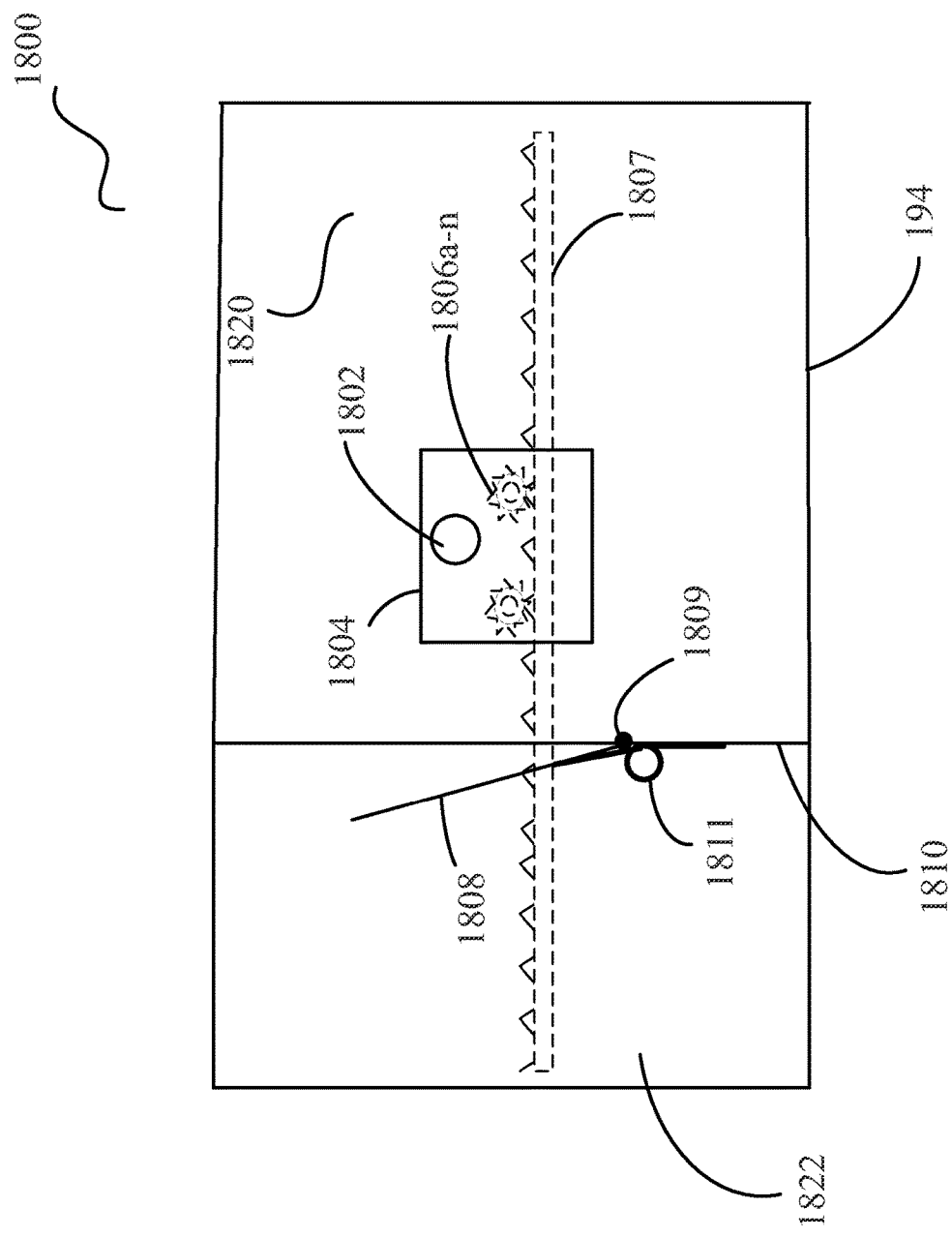
FIG. 18 shows a top view of a vehicle having wheels that may move on a track to transfer the display item through the door into the concealed space of the display system.

FIG. 18 shows a top view 1800 of a vehicle having wheels that may move on a track to transfer the display item through the door into the concealed space of the display system. FIG. 18 includes at least display panel 194, a display item 1802, a vehicle 1804, wheels 1806*a-n*, a track 1807, a door 1808, an axle 1809, a side wall 1810, a spring 1811, a display space 1820, and a concealed space 1822. FIG. 18 configuration may not have all of the elements or features listed and/or may have other elements or features instead of, or in addition to, those listed.

FIG. 18 shows that a vehicle having wheels may be used to move a display item along a track through the door between the display space and the concealed space. In one embodiment, the vehicle may move in either direction to move the display item. In one embodiment, the display system may include multiple vehicles and/or tracks to move multiple display items in various directions.

Display item 1802, door 1808, axle 1809, side wall 1810, spring 1811, display space 1820, and concealed space 1822 are embodiments of the display item 1702, door 1708, axle 1709, side wall 1710, spring 1711, display space 1720, and concealed space 1722, which were discussed in conjunction with FIGS. 7A and 8B, respectively.

Vehicle 1804 is a vehicle for transporting displayed items in the display space 1820 or between the display space 1820 and the concealed space 1822. In one embodiment, the vehicle 1804 moves on toothed wheels 1806*a-n* that engages with cogged rail or track when moving on the track. In one embodiment, the wheels 1806*a-n* are driven by a motor. Additionally or alternatively, the vehicle 1804 may be dragged by strings and motors at either end of the track.

Track 1807 is a cogged track that is installed on the bottom of the display space 1820 for guiding the movement of the vehicle having wheels that run on the track 1807. In other embodiment, the track 1807 may guide the movement of other devices. In one embodiment, the track 1807 extends across the display space 1820 and the concealed space 1822 through the entrance that may be closed by the door 1808.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system, comprising:
   a display area having at least one location that moves, wherein the location is for a person or item;
   at least a display panel that plays multimedia content, wherein at least a portion of the display panel turns transparent during display of the at least one location within the display area, wherein the at least one location is visible through the portion of the display panel that turns transparent;
   one or more motors, which when activated move the at least one item or location;
   at least one sensor, which when activated senses signals, the at least one sensor communicating with a controller, wherein the at least one sensor sends the signals to a human-machine interface of the controller; and
   the controller, which when activated controls the display panel and the one or more motors based on the signals received, wherein the movement of the at least location is in coordination with the multimedia content played on the display panel.

2. The system of claim 1, the controller further comprising
   a control circuit, which when activated processes at least the signals received from the at least one sensor, the control circuit being connected to the human-machine interface, wherein the control circuit converts the signals received into control commands and sends the control commands to at least a power controller and a drive circuit;
   the power controller, which when activated, based on the control commands received, controls power used to operate the system; and
   the drive circuit, which when activated, based on the control commands received, controls the one or more motors to move the at least one location in coordination with the multimedia content played on the display panel.

3. The system of claim 2, further comprising one or more lighting devices, which when activated illuminates at least a portion of the display area during display of the at least one location within the display area, wherein the controller, when activated, controls the one or more lighting devices.

4. The system of claim 3, wherein
   the power controller controls the power supplied to the one or more lighting devices.

5. The system of claim 3, wherein
   the drive circuit, when activated, controls one or more motors to move at least one of the one or more lighting devices to adjust an angle of a beam of light.

6. The system of claim 2, further comprising
   one or more audio devices, which when activated play audio media during display of the at least one location, wherein the controller, when activated,
   controls the one or more audio devices.

7. The system of claim 2, further comprising
   a multimedia controller, which when activated controls the playing of the multimedia content, wherein the control circuit sends control commands, based on the signals received from the at least one sensor, to the multimedia controller; and
   wherein the multimedia controller selects, based on the control commands received, multimedia content from a multimedia database, and controls the playing of the multimedia content that was selected on the at least one display panel.

8. The system of claim 7, wherein
   the power controller, based on the control commands received, controls power supplied to the multimedia controller and the at least one display panel.

9. The system of claim 7, further comprising
a plurality of display panels, the at least one display panel being one of the plurality of display panels, wherein the multimedia controller controls each of the plurality of display panels to play multimedia content.

10. The system of claim 9, wherein
the plurality of display panels are located in different locations.

11. The system of claim 9, wherein
the multimedia controller, when activated, divides the multimedia content into a plurality of portions, each of the plurality of portions of the multimedia content being played on a different one of the plurality of display panels, wherein the plurality of display panels are joined together to play the multimedia content as a whole.

12. The system of claim 7, wherein
the multimedia controller, when activated, selects, based on the control commands received, audio media from the multimedia database, and the multimedia controller, when activated, controls a plurality of audio devices to play the audio media that was selected.

13. The system of claim 12, wherein
the multimedia controller selects, based on the control commands received, a plurality of audio media, and sends the plurality of audio media via a plurality of channels to a plurality of audio devices; and
wherein each of the plurality of audio devices plays a different audio media in accordance with different multimedia content played separately on a plurality of display panels.

14. The system of claim 2, the power controller comprising
one or more electrical switches, which when activated control the power supplied to one or more devices, the one or more electrical switches being controlled by the control circuit based on the signals received from the at least one sensor.

15. The system of claim 2, the power controller further comprising
at least a power conversion device, which when activated converts the power to a different form to meet a requirement of a device that is powered by the power controller.

16. The system of claim 2, wherein
the controller includes at least a built-in power supply that provides power to at least a built-in computer.

17. The system of claim 2, wherein
the human-machine interface includes one or more connection ports, to which one or more sensors are connect, wherein the one or more sensors, when activated, communicate with the controller, via wired connections using the one or more connection ports.

18. The system of claim 2, wherein
the communication between the human-machine interface and the at least one sensor is encrypted.

19. The system of claim 2, wherein
the human-machine interface includes at least one port, which when activated, provides power to at least an external device to charge the external device.

20. The system of claim 2, wherein
the human-machine interface includes one or more wireless signal transceivers, which when activated, receive and transmit wireless signals, wherein the controller communicates with one or more sensors, via wireless communications.

21. The system of claim 2, wherein
the human-machine interface includes one or more of a wireless network access point, a WIFI access point or router, a Bluetooth, a near field communication (NFC) transceiver, a radio transceiver, an audio transceiver, a mobile network transceiver, and an infrared transceiver.

22. The system of claim 2, wherein
the human-machine interface and the at least one sensor support internet protocols.

23. The system of claim 2, wherein
the at least one sensor includes one or more of image sensors, sound sensors, temperature sensors, motion sensors, light sensors, tilt sensors, distance sensors, pressure sensors, and touch screens.

24. The system of claim 2, wherein
the sensor transmits digital signals to the controller via the human-machine interface.

25. The system of claim 2, wherein
the sensor, when activated, transmits analog signals to the controller via the human-machine interface.

26. The system of claim 2, wherein
the at least one sensor, being communicatively coupled to the human-machine interface, receives control commands from the controller via the human-machine interface, the control commands instructing the sensor to take at least one measurement.

27. The system of claim 2, wherein
the display panel includes at least a touch screen, which when activated, receives input information, wherein the touch screen transmits the input information via the human-machine interface to the controller, wherein the control circuit of the controller processes and converts the input information into control commands.

28. The system of claim 2, wherein the control circuit comprises
at least a microcontroller, which when activated, controls the system based on the signals received, the microcontroller including at least
a microprocessor, which when activated, processes the signals received from the at least one sensor, and
a memory unit that stores at least one set of instructions for the microprocessor to execute.

29. The system of claim 28, wherein
the microcontroller processes digital and analog signals received from the at least one sensor.

30. The system of claim 28, wherein the control circuit further includes
at least one digital signal processor (DSP), which when activated, processes the signals received, wherein the at least one DSP sends a result of the processing of the signals to the microprocessor, and the microprocessor converts the result received into control commands.

31. The system of claim 28, wherein the control circuit further includes
at least an analog to digital converter (ADC), which when activated, converts analog signals to digital signals.

32. The system of claim 28, wherein the control circuit further includes
at least a digital to analog converter (DAC), which when activated, converts digital signals to analog signals.

33. The system of claim 28, wherein
the microcontroller comprehensively processes the signals received from a plurality of sensors, and the microcontroller generates, based on the signals from the plurality of sensors, control commands.

34. The system of claim 28, wherein
the microprocessor processes analog signals received from the sensor.

35. The system of claim 28, wherein
the microcontroller receives feedback data from a feedback sensor, the feedback sensor being used to collect the feedback data representative of an actual status of the system and transmits the feedback data via the human-machine interface to the microcontroller; and
wherein the microcontroller calculates a difference between the feedback data and reference data, the reference data representing a desired status of the system, and the microcontroller generates, based on the difference, control commands to control the system to achieve the desired status.

36. The system of claim 35, wherein
the feedback sensor is a speed sensor, the feedback sensor being used to collect the feedback data representative of an actual speed of the at least one item or person; and
wherein the microcontroller calculates a difference between the actual speed and a desired speed, wherein the microcontroller sends, based on the difference, control commands to the drive circuit to adjust a speed of at least one of the one or more motors that moves the at least one item or person to achieve the desired speed.

37. The system of claim 35, wherein
the feedback sensor is a light sensor, the feedback sensor being used to collect the feedback data representative of an actual brightness of light; and
wherein the microcontroller calculates a difference between the actual brightness and a desired brightness, wherein the microcontroller sends, based on the difference, control commands to the power controller to adjust at least one lighting device to achieve the desired brightness.

38. The system of claim 2, further comprising
at least one closed loop control system, which when activated controls the system to display the at least one item or person, the closed loop control system including at least
  a feedback sensor that detects feedback data representative of an actual status of the system and sends the feedback data to a controller;
  the controller that calculates a difference between the feedback data and reference data, wherein the controller generates control commands based on the difference; and
  wherein the controller sends control commands generated to the power controller or the drive circuit to control the system to achieve the reference data.

39. The system of claim 2, wherein the control circuit comprises
a plurality of microprocessors, one of the plurality of microprocessors being a master microprocessor, the others of the plurality of the microprocessors being slave microprocessors, wherein the master microprocessor controls the slave microprocessors, and the slave microprocessors each controls different devices when activated.

40. The system of claim 2, wherein
the control circuit compares the signals received with at least a threshold value or a preset range and generates a result of a comparison of the signals; wherein the control circuit determines, based on the comparison, whether to respond to the signals received.

41. The system of claim 2, wherein
the control circuit receives signals from multiple sensors, the at least one sensor being one of the multiple sensors; wherein the control circuit compares the signals received from the multiple sensors, and determines which signal is dominant based on preset algorithms, and the control circuit sends control commands to the power controller or the drive circuit in response to the dominant signal determined.

42. A method, comprising:
receiving, at a controller, at least signals from at least one sensor;
processing, by the controller, the signals received and converting, by the controller, the signals into control commands;
playing, based on the control commands, multimedia content on at least a display panel;
turning, based on the control commands, at least a portion of the display panel transparent, at least one location that is displayed in a display space being visible through the portion of the display panel that turns transparent; and
moving, based on the control commands, the at least one location by one or more motors in accordance with the multimedia content played on the display panel.

43. The method of claim 42, further comprising
selecting, based on the control commands, multimedia content from a multimedia database; and
sending the multimedia content that was selected to the display panel.

44. The method of claim 42, further comprising
selecting, based on the control commands, audio media from a multimedia database; and
sending, based on the control commands, the audio media that was selected to at least an audio device, which when activated plays the audio media.

45. The method of claim 42, further comprising
controlling, based on the control commands, at least one lighting device, which when activated adjusts lighting effects during display of the at least one location.

46. The method of claim 42, further comprising
comparing, by the controller, the signals that was received with a reference value, the signal having a feedback value representative of an actual status of the system;
generating, by the controller a result of the comparing; and
generating, based on the result, control commands to adjust one or more devices to achieve the reference value.

47. The method of claim 42, further comprising
comparing, by the controller, the signals received with a threshold or a preset range;
generating, by the controller, a result of the comparing; and
determining, by the controller based on the result of the comparing, whether to respond to the signals received.

48. The method of claim 42, further comprising
receiving, at a controller, signals from multiple sensors, the at least one sensor being one of the multiple sensors;
comparing, by the controller, the signals from the multiple sensors;
generating, by the controller, a result of the comparing;
determining, by the controller based on the result of the comparing, a dominant signal; and
generating, by the controller, control commands in response to the dominant signal.

49. A system, comprising:
a display area having at least one location that moves, wherein the location is for an item or a person;
at least a display panel that plays multimedia content, wherein at least a portion of the display panel turns transparent during display of the at least one location within the display area, wherein the at least one location is visible through the portion of the display panel that turns transparent;
one or more motors, which when activated move the at least one item or location;
at least one sensor, which when activated senses signals, the at least one sensor communicating with a controller, wherein the at least one sensor sends the signals to the controller; and
the controller, which when activated controls the display panel and the one or more motors based on the signals received, wherein the movement of the at least one item or location is in coordination with the multimedia content played on the display panel.

50. The system of claim 2, further comprising
one or more lighting devices, which when activated illuminates at least a portion of the display area during display of the at least one location within the display area, wherein the controller, when activated, controls the one or more lighting devices;
where
the power controller controls the power supplied to the one or more lighting devices; and
the drive circuit, when activated, controls one or more motors to move at least one of the one or more lighting devices to adjust an angle of a beam of light;
one or more audio devices, which when activated play audio media during display of the at least one item or person, wherein the controller, when activated, controls the one or more audio devices;
a multimedia controller, which when activated controls the playing of the multimedia content, wherein the control circuit sends control commands, based on the signals received from the at least one sensor, to the multimedia controller;
wherein the multimedia controller selects, based on the control commands received, multimedia content from a multimedia database, and controls the playing of the multimedia content that was selected on the at least one display panel;
the power controller, based on the control commands received, controls power supplied to the multimedia controller and the at least one display panel;
a plurality of display panels, the at least one display panel being one of the plurality of display panels, wherein the multimedia controller controls each of the plurality of display panels to play multimedia content;
where
the plurality of display panels are located in different locations;
the multimedia controller, when activated, divides the multimedia content into a plurality of portions, each of the plurality of portions of the multimedia content being played on a different one of the plurality of display panels, wherein the plurality of display panels are joined together to play the multimedia content as a whole;
the multimedia controller, when activated, selects, based on the control commands received, audio media from the multimedia database, and the multimedia controller, when activated, controls a plurality of audio devices to play the audio media that was selected;
the multimedia controller selects, based on the control commands received, a plurality of audio media, and sends the plurality of audio media via a plurality of channels to a plurality of audio devices; and
wherein each of the plurality of audio devices plays a different audio media in accordance with different multimedia content played separately on a plurality of display panels;
one or more electrical switches, which when activated control the power supplied to one or more devices, the one or more electrical switches being controlled by the control circuit based on the signals received from the at least one sensor;
at least a power conversion device, which when activated converts the power to a different form to meet a requirement of a device that is powered by the power controller;
where
the controller includes at least a built-in power supply that provides power to at least a built-in computer;
the human-machine interface includes one or more connection ports, to which the at least one sensor is connect, wherein the at least one sensor, when activated, communicate with the controller, via wired connections using the one or more connection ports the communication between the human-machine interface and the at least one sensor is encrypted;
the human-machine interface includes at least one port, which when activated, provides power to at least an external device to charge the external device;
the human-machine interface includes one or more wireless signal transceivers, which when activated, receive and transmit wireless signals, wherein the controller communicates with the at least one sensor, via wireless communications;
the human-machine interface includes one or more of a wireless network access point, a WIFI access point or router, a Bluetooth, a near field communication (NFC) transceiver, a radio transceiver, an audio transceiver, a mobile network transceiver, and an infrared transceiver;
the human-machine interface and the at least one sensor support internet protocols;
the at least one sensor transmits digital signals to the controller via the human-machine interface;
the at least one sensor, when activated, transmits analog signals to the controller via the human-machine interface;
the at least one sensor, being communicatively coupled to the human-machine interface, receives control commands from the controller via the human-machine interface, the control commands instructing the at least one sensor to take at least one measurement;
the display panel includes at least a touch screen, which when activated, receives input information, wherein the touch screen transmits the input information via the human-machine interface to the controller, wherein the control circuit of the controller processes and converts the input information into control commands;

at least a microcontroller, which when activated, controls the system based on the signals received, the microcontroller including at least
  a microprocessor, which when activated, processes the signals received from the at least one sensor, and
  a memory unit that stores at least one set of instructions for the microprocessor to execute;
  the microcontroller processes digital and analog signals received from the at least one sensor;
at least one digital signal processor (DSP), which when activated, processes the signals received, wherein the at least one DSP sends a result of the processing of the signals to the microprocessor, and the microprocessor converts the result received into control commands;
wherein the control circuit further includes
    at least an analog to digital converter (ADC), which when activated, converts analog signals to digital signals;
    at least a digital to analog converter (DAC), which when activated, converts digital signals to analog signals;
the microcontroller comprehensively processes the signals received from a plurality of sensors, and the microcontroller generates, based on the signals from the plurality of sensors, control commands;
the microprocessor processes analog signals received from the sensor;
the microcontroller receives feedback data from a feedback sensor, the feedback sensor being used to collect the feedback data representative of an actual status of the system and transmits the feedback data via the human-machine interface to the microcontroller; and
wherein the microcontroller calculates a difference between the feedback data and reference data, the reference data representing a desired status of the system, and the microcontroller generates, based on the difference, control commands to control the system to achieve the desired status;
the feedback sensor includes a speed sensor, the feedback sensor being used to collect the feedback data representative of an actual speed of the at least one item or person; and
wherein the microcontroller calculates a difference between the actual speed and a desired speed, wherein the microcontroller sends, based on the difference, control commands to the drive circuit to adjust a speed of at least one of the one or more motors that moves the at least one item or person to achieve the desired speed;
the feedback sensor also includes a light sensor, the feedback sensor being used to collect the feedback data representative of an actual brightness of light; and
wherein the microcontroller calculates a difference between the actual brightness and a desired brightness, wherein the microcontroller sends, based on the difference, control commands to the power controller to adjust at least one lighting device to achieve the desired brightness;
at least one closed loop control system, which when activated controls the system to display the at least one item or person, the closed loop control system including at least
  a feedback sensor that detects feedback data representative of an actual status of the system and sends the feedback data to a controller;
    where the controller calculates a difference between the feedback data and reference data, and the controller generates control commands based on the difference; and
  wherein the controller sends control commands generated to the power controller or the drive circuit to control the system to achieve the reference data;
wherein the control circuit includes at least
  a plurality of microprocessors, one of the plurality of microprocessors being a master microprocessor, the others of the plurality of the microprocessors being slave microprocessors, wherein the master microprocessor controls the slave microprocessors, and the slave microprocessors each controls different devices when activated;
  the control circuit compares the signals received with at least a threshold value or a preset range and generates a result of a comparison of the signals; wherein the control circuit determines, based on the comparison, whether to respond to the signals received;
wherein
the control circuit receives signals from the at least one sensor, and the control circuit compares the signals received from the at least one sensor, and determines which signal is dominant based on a preset algorithm, and the control circuit sends control commands to the power controller or the drive circuit in response to the dominant signal determined.

* * * * *